(12) United States Patent
Lee et al.

(10) Patent No.: US 11,670,103 B2
(45) Date of Patent: *Jun. 6, 2023

(54) MULTI-SEGMENT TEXT SEARCH USING MACHINE LEARNING MODEL FOR TEXT SIMILARITY

(71) Applicant: Cognition IP Technology Inc., San Francisco, CA (US)

(72) Inventors: Bryant Lee, San Francisco, CA (US); Andrew Tjang, Moraga, CA (US); Andrew Perry Chu, San Francisco, CA (US); Uday Pulleti, Hyderabad (IN)

(73) Assignee: Cognition IP Technology Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,449

(22) Filed: Apr. 18, 2022

(65) Prior Publication Data

US 2022/0245959 A1  Aug. 4, 2022

Related U.S. Application Data

(63) Continuation of application No. 16/718,081, filed on Dec. 17, 2019, now Pat. No. 11,308,320.

(60) Provisional application No. 62/787,640, filed on Jan. 2, 2019, provisional application No. 62/780,582, filed on Dec. 17, 2018.

(51) Int. Cl.
    *G06F 17/00*       (2019.01)
    *G06V 30/414*      (2022.01)
    *G06F 40/226*      (2020.01)
    *G06V 30/413*      (2022.01)
    *G06V 30/418*      (2022.01)

(52) U.S. Cl.
    CPC .......... *G06V 30/414* (2022.01); *G06F 40/226* (2020.01); *G06V 30/413* (2022.01); *G06V 30/418* (2022.01)

(58) Field of Classification Search
    CPC .......... G06K 9/00463; G06K 9/00456; G06K 9/00483; G06F 40/226; G06F 40/194; G06F 40/30; G06V 30/414; G06V 30/413; G06V 30/418
    See application file for complete search history.

(56) References Cited

U.S. PATENT DOCUMENTS

| | | |
|---|---|---|
| 9,460,076 B1 | 10/2016 | Barba |
| 10,268,668 B1 | 4/2019 | West et al. |
| 2005/0210009 A1 | 9/2005 | Tran |

(Continued)

OTHER PUBLICATIONS

Okamoto, Masayuki, Zifei Shan, and Ryohei Orihara. "Applying information extraction for patent structure analysis." Proceedings of the 40th International ACM SIGIR Conference on Research and Development in Information Retrieval. 2017 (Year: 2017).*

(Continued)

*Primary Examiner* — Andrew T McIntosh
(74) *Attorney, Agent, or Firm* — Cognition IP, P.C.; Edward Steakley; Schiller Hill

(57) ABSTRACT

Systems and methods may be provided for performing a search on an input text block. The input text block may be split into a plurality of input text segments. A text similarity algorithm may be used to find similar stored text segments to each of the plurality of input text segments.

18 Claims, 34 Drawing Sheets

(56) References Cited

U.S. PATENT DOCUMENTS

| | | |
|---|---|---|
| 2005/0234738 A1 | 10/2005 | Hodes |
| 2010/0005094 A1 | 1/2010 | Poltorak |
| 2013/0144799 A1 | 6/2013 | Lee et al. |
| 2014/0304579 A1 | 10/2014 | Foster et al. |
| 2015/0206260 A1 | 7/2015 | Lundberg |
| 2015/0278349 A1* | 10/2015 | Speier .................. G06Q 10/10 707/722 |
| 2016/0042460 A1 | 2/2016 | Hudak et al. |
| 2017/0046393 A1* | 2/2017 | Pedersen ............. G06Q 50/184 |
| 2018/0240209 A1 | 8/2018 | Malherek |

OTHER PUBLICATIONS

Ma, Chunyan, Tong Zhao, and Hao Li. "A method for calculating patent similarity using patent model tree based on neural network." Advances in Brain Inspired Cognitive Systems: 9th International Conference, BICS 2018, Xi'an, China, Jul. 7-8, 2018, Proceedings 9. Springer International Publishing, 2018 (Year: 2018).*

Lu et al., Unlocking Office Action Traits, USPTO, dated 2017, p. 1-40 (dated Year: 2017).

Immordino, Comparing Similarity of Patent Textual Data Through the Application of Machine Learning, NI, 2019, p. 1-255 (Year: 2019).

* cited by examiner

| ID | Text | Encoding | Doc ID | Location |
|---|---|---|---|---|
| 2314 | In one example embodiment, the biometric monitoring device may... | [(0.7,0.2,0.15), (0.23,0.51,0.93),...] | 12082312 | Col. 2, ll. 58 - 60 |
| 2516 | In one example embodiment, a user's heart rate measurement may be... | [(0.03,0.59,0.40), (0.39,0.78,0.26),...] | 12082312 | Col. 2, l. 61 to Col. 3, l. 5 |
| 23894 | FIG. 12A illustrates an example of a portable biometric monitoring... | [(0.98,0.83,0.59), (0.19,0.58,0.09),...] | 12082312 | Col. 3, ll. 6 - 12 |
| ... | | | | |
| 634248 | The portable fitness monitoring device 102 may be a device such as, for... | [(0.49,0.87,0.67), (0.24,0.89,0.49),...] | 15923093 | Paragraph 64 |
| 432053 | The portable fitness monitoring device 102 may communicate with one... | [(0.86,0.35,0.69), (0.39,0.42,0.45),...] | 15923093 | Paragraph 65 |

| Doc ID | Reference ID | Title | Priority Date | Publication Date |
|---|---|---|---|---|
| 12082312 | US8920332 | Wearable Heart Rate Monitor | 2012-06-22 | 2014-12-30 |
| 15923093 | US20120235821A1 | Methods and Program... | 2009-05-18 | 2014-10-07 |
| 18232900 | US6277398B1 | Analgesic Drug Composition... | 1997-05-27 | 2001-08-21 |
| 23901820 | Tie, P.T.P., et al. "Comparison of Effect Sizes..." British Journal of Clinical Pharm. 83.11 (2017):2347-2355 | Comparison of Effect Sizes.... | - | 2017-11-01 |
| ... | | | | |

FIG. 2A

| ID | Text 1 | Encoding 1 | Text 2 | Encoding 2 | Comparison Doc ID | Sim |
|---|---|---|---|---|---|---|
| 84021 | In one example embodiment, the biometric monitoring device may ... | [(0.7,0.2,0.15), (0.23,0.51,0.93), ...] | A screen on a biometric monitoring device may display heartrate ... | [(0.32,0.49,0.58), (0.33,0.77,0.32), ...] | 5883292 | 0.89 |
| 23144 | In one example embodiment, the biometric monitoring device may ... | [(0.7,0.2,0.15), (0.23,0.51,0.93), ...] | The analgesic effectiveness of a capsaicinoid such as capsaicin is potentiated ... | [(0.11,0.52,0.32), (0.67,0.54,0.02), ...] | - | 0.05 |
| 35332 | The portable fitness monitoring device 102 may communicate with one ... | [(0.86,0.35,0.69), (0.39,0.42,0.45), ...] | The smart watch may have a Wi-Fi controller for transmitting wireless.... | [(0.34,0.02,0.52), (0.77,0.43,0.32), ...] | 2359290 | 0.78 |

230

| Comparison Doc ID | Application ID | Prior Art Doc IDs | Date |
|---|---|---|---|
| 5883292 | US14295144 | [2315423, 59923] | 2015-10-02 |
| 2359290 | US13486801 | [13251923, 302002] | 2013-05-20 |

Application/Control Number: 14/335,908 Page 2
Art Unit: 3661

DETAILED ACTION

700

1. The present application, filed on or after March 16, 2013, is being examined under the first inventor to file provisions of the AIA.

a. Claims 1-20 are pending.

*Information Disclosure Statement*

2. The information disclosure statements (IDSs) submitted on 7/20/2014 and 7/21/2014 have been considered by the examiner.

701

*Claim Rejections - 35 USC § 103*

3. The following is a quotation of 35 U.S.C. 103 which forms the basis for all obviousness rejections set forth in this Office action:

703

> A patent for a claimed invention may not be obtained, notwithstanding that the claimed invention is not identically disclosed as set forth in section 102 of this title, if the differences between the claimed invention and the prior art are such that the claimed invention as a whole would have been obvious before the effective filing date of the claimed invention to a person having ordinary skill in the art to which the claimed invention pertains. Patentability shall not be negated by the manner in which the invention was made.

704

702

4. Claims 1, 5, 8, 12, 15 and 19 are rejected under 35 U.S.C. 103 as being

705

706 unpatentable over Pinkus et al. (US 2013/0061044 A1) [hereinafter Pinkus] in view of Minami (JP 2002-099983 A) with respect to the English translation [hereinafter Minami].

5. The citations of Pinkus applied below may also be found in the Applicant's Examination support document filed 7/20/2014.

711 *Claims 1, 8 and 15*

712

712

6. Pinkus discloses the claimed method for controlling an autonomous vehicle (see at least ¶0093; Fig. 1), the autonomous vehicle comprising:

b. an engine (see at least ¶0093; Fig. 1);

Application/Control Number: 14/335,908 Page 3
Art Unit: 3661 c.    one or more wheels (see at least ¶0093; Fig. 1);

d.    one or more sensors for detecting objects in a surrounding environment (see at least ¶0093; Fig. 1);

e.    a navigation system for planning a path from a present location of the autonomous vehicle to a destination location (see at least ¶0093-0094; Fig. 1);

f.    wherein the autonomous vehicle is for carrying one or more customers who have paid a fare to a customer-selected location (see at least Abstract; ¶0006; ¶0093; Fig. 1);

g.    the method comprising:

i.    storing an indication of a waiting location for the autonomous vehicle to drive to when not carrying a paying customer and not traveling to service a pick up request (see at least ¶0107);

ii.    selecting a new waiting location for the autonomous vehicle to drive to when not carrying a paying customer and not traveling to service a pick up request (see at least ¶0107);

iii.    determining that the autonomous vehicle is not presently carrying a paying customer and does not presently have a pick up request (see at least ¶0093-0094; ¶0099; ¶0104);

iv.    determining the present location of the autonomous vehicle (see at least ¶0093; Claim 13);

FIG. 7B

Application/Control Number: 14/335,908 Page 4
Art Unit: 3661 v.    the navigation system planning a path from the present location of the autonomous vehicle to the newly selected waiting location (see at least ¶0093-0094; 0107);

723 —→     vi.    the autonomous vehicle driving to the newly selected waiting location (see at least ¶0107). ← 724

740 —→ 7.    However, Pinkus does not clearly disclose that the vehicle drives to a newly selected waiting location that is within the scope of a rain event received from a server. Minami is applied to disclose this feature.

725 —→ 8.    Minami discloses receiving weather information from a server (see at least ← 726
727 —→ ¶0077; ¶0085) the weather information indicating a rain event that is presently occurring or will occur in the future at a geographic location (see at least ¶0072; ¶0077), ← 728
based on the weather information, selecting a new waiting location within the scope of the rain event, for the vehicle to drive to when not carrying a paying customer and not traveling to service a pick up request (see at least ¶0074; ¶0083-0085; It is inherent that the taxi is not carrying a paying customer and not traveling to service a pick up request when the allocation-of-cars instruction is performed by the operator.), and updating the stored indication of the waiting location for the autonomous vehicle to drive to when not carrying a paying customer and not traveling to service a pick up request to the newly selected waiting location that is within the scope of the rain event (see at least ¶0080-0085).

9.    It should be noted that Minami's vehicle is not autonomous. However, Minami is not applied to teach its system incorporated into Pinkus's autonomous vehicle. Minami

FIG. 7C

Application/Control Number: 14/335,908 Page 6
Art Unit: 3661

13. The citations of Urmson applied below may also be found in the Applicant's Examination support document filed 7/20/2014.

Claims 2, 9 and 16

14. While the combination of Pinkus and Minami discloses the claimed invention, the combination of Pinkus and Minami does not clearly disclose that the autonomous vehicle switches from a first control strategy to a second control strategy when driving in inclement weather.

15. Urmson discloses the claimed autonomous vehicle having a first control strategy for driving in good weather conditions (see at least ¶0094); detecting that the autonomous vehicle is driving in inclement weather (see at least ¶0004; ¶0093-0094); the autonomous vehicle switching to a second control strategy when driving in inclement weather (see at least ¶0094).

16. It would have been obvious to one of ordinary skill in the art at the time of the invention to have switched from a first control strategy to a second control strategy when driving in inclement weather, as in Urmson, in the system executing the method of Pinkus with the motivation of providing for the safe operation of the autonomous vehicle, as taught by Urmson (¶0003) over that of Pinkus.

17. Claims 3, 10 and 17 are rejected under 35 U.S.C. 103 as being unpatentable over Pinkus in view of Minami, and in further view of Hurpin (US 8306833) [hereinafter Hurpin].

18. The citations of Hurpin applied below may also be found in the Applicant's Examination support document filed 7/20/2014.

FIG. 7D

Input text block

| 1. A system for determining a user's physical condition, the system comprising: |
|---|

| a wearable device, comprising: |
|---|

| a bio sensor that measures biometrics; | 1011 |
|---|---|

| a motion sensor that monitors activity; | 1012 |
|---|---|

. . .

1015  Similar Stored Text Segments and Corresponding Reference  1013  1016  1017

| US20155208321 (Smith) | Bio sensors may be used for measuring parameters . . . | 0.92 |
|---|---|---|
| US7239200 (Jones) | A sensor may be placed on a mammal to measure . . . | 0.85 |
| US8902830 (Percy) | Biometric information may include retinal scans . . . | 0.76 |
| . . . | | |
| US20108329200 (Alex) | Data collection of health information from humans . . . | 0.55 |

1014

| US20136940039 (Black) | A motion sensor embodiment monitor activities . . . | 0.97 |
|---|---|---|
| US8930200 (Maya) | Motion sensors may be triggered by activity . . . | 0.90 |
| US7239200 (Jones) | Motion may be detected by a sensor attached on . . . | 0.87 |
| . . . | | |
| US20108329200 (Alex) | Data collection of health information from humans . . . | 0.43 |

FIG. 10B

MULTI-SEGMENT TEXT SEARCH USING MACHINE LEARNING MODEL FOR TEXT SIMILARITY

CROSS-REFERENCE TO RELATED APPLICATIONS

This application is a continuation of U.S. application Ser. No. 16/718,081, filed on Dec. 17, 2019, which claims the benefit of U.S. Provisional Patent Application No. 62/780,582, filed Dec. 17, 2018 and U.S. Provisional Patent Application No. 62/787,640, filed Jan. 2, 2019, which are hereby incorporated by reference in their entirety.

BACKGROUND

Traditional search engines operate based on a principle of searching for keywords. The user must enter keywords into the search engine and the search engine returns results related to the keywords. A disadvantage of this approach is that the user must determine the right keywords to use to perform their search. Moreover, these traditional search engines are not suited to the task of finding content similar to an entire block of text.

SUMMARY

One embodiment relates a computer-implemented method and system for performing a search for a textual input.

In one embodiment, the textual input is a text block. The system may split the text block into a plurality of input text segments. A text similarity algorithm may be used to find similar text segments for one or more of the input text segments from a document storage comprising a plurality of stored text segments.

In some embodiments, the textual input is a patent claim.

One embodiment relates to receiving a textual input comprising a patent claim. The system may split the patent claim into input text segments. A search engine may automatically identify text segments from prior art references that are similar to one or more of the input text segments.

In some embodiments, the system may automatically generate a claim chart or office action based on the stored text segments of prior art reference that are identified as similar to the input text segments of the textual input.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

FIG. 2A illustrates an exemplary embodiment of a document storage.

FIG. 2B illustrates an exemplary embodiment of a text similarity storage.

FIGS. 7A-7D illustrate an exemplary comparison document.

FIG. 10B illustrates exemplary operation of a combination generation algorithm.

DETAILED DESCRIPTION

Figure 1:
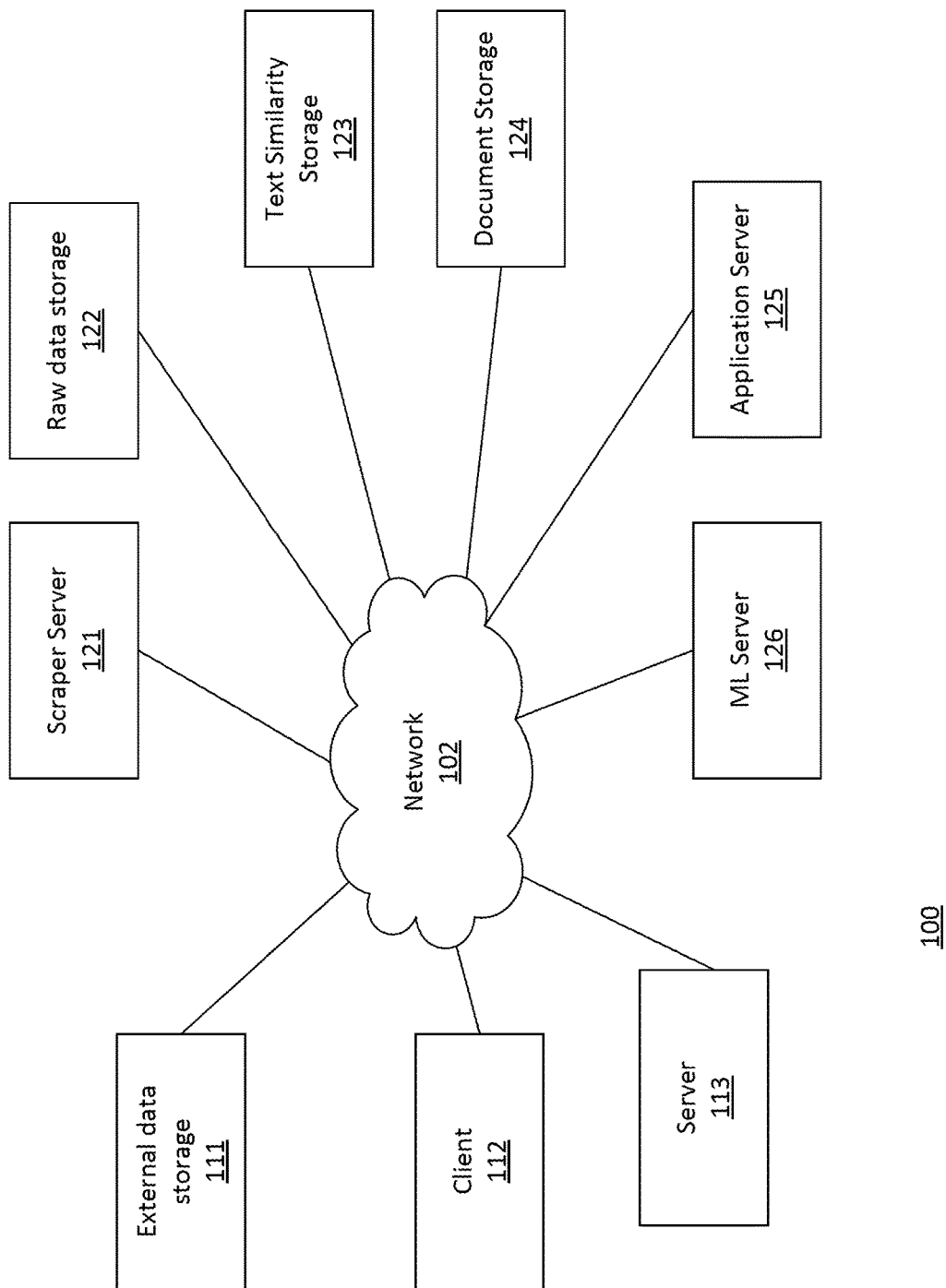
FIG. 1 illustrates an exemplary network architecture that may be used in some embodiments.

One embodiment relates to a search engine on a computer system for performing a search based on a textual input in order to find one or more stored portions of text that are similar to the textual input or portions of the textual input. The textual input may be divisible into portions of text ("text portions"). For each of the portions of the textual input, one or more stored portions of text may be returned that are similar to the portion of the textual input.

In one embodiment, the search engine may be used to find prior art references for a patent claim. In an embodiment, the exact portions (such as lines, columns, paragraphs, pages, figures, or other excerpts) of the prior art references that may be used to invalidate or render unpatentable the patent claim, such as for lack of novelty or obviousness, may be automatically identified by the search engine. Lack of novelty may also be referred to as anticipation and, in the U.S., is a rejection currently codified in 35 U.S.C. § 102. Obviousness, in the U.S., is currently codified in 35 U.S.C. § 103. The statutory citations may change in the future, but the concepts of novelty and obviousness are currently embodied in those statutory provisions.

Foreign countries may refer to the concepts of novelty and obviousness using different language and have their own laws and statutes for the novelty and non-obviousness requirements. For example, in written opinions by the International Searching Authority ("ISA"), these concepts may be referred to as novelty and inventive step, respectively. The lack of novelty or obviousness of a claim may be referred to as lack of novelty or lack of inventive step in the terminology of the ISA.

Some embodiments of a search engine may return the exact combination of disclosures, such as citations of excerpts, that render the patent claim invalid or unpatentable for lack of novelty or obviousness. This distinguishes from existing search engines for patent prior art, which only return entire reference documents, without identifying the exact portions or combinations or text from prior art references that invalidate or render unpatentable a patent claim. Moreover, existing patent search engines do not search based on a patent claim and instead most typically perform searches based on keywords.

In an embodiment, the textual input to the search engine is a patent claim. The patent claim may be any text in the form of a patent claim. For example, the patent claim may have been filed in a patent application or issued in a granted patent, or it may be a draft of a new patent claim that a user has generated during the patent drafting process. After receiving the textual input, the search engine may algorithmically split the textual input into text segments. These text segments of the input may be referred to as input text segments.

Text segments may be any portions of contiguous or non-contiguous text and may include words, characters, abbreviations, punctuation, white space, and so on. Text segments may also be referred to as clauses. In some embodiments, the text segments may be delimited by punctuation such as semicolons or commas, or, in other cases, they may be any groupings of one or more words without being delimited by punctuation.

The search engine may perform a search over stored text segments, which are stored portions of text, to identify and return one or more stored text segments that are similar to one or more of the input text segments. The similar stored text segments and input text segments may then be displayed together for review. In some embodiments, the stored text segments are portions of text from documents, such as patents, patent application publications, and non-patent literature. The names or identifiers of the reference documents that the identified stored text segments come from may be displayed.

In some embodiments, the search engine may return an exact combination of the stored text segments to render the textual input patent claim invalid or unpatentable, and it may identify the combination of reference documents used in the combination.

In some embodiments, the search engine is implemented using and comprises a machine learning computer program. The machine learning program may be trained based on a training set of positive and negative examples. The positive examples may include pairs of text segments, comprising a patent claim text segment and an associated stored text segment from a prior art document that is identified as similar. The negative examples may include pairs of text segments, comprising a patent claim text segment with an associated stored text segment from a prior art document that is identified as not being similar. The positive and negative examples may be generated by humans or through automated techniques.

Machine learning is one example of a broader class of applications referred to as artificial intelligence (AI). Machine learning and AI may be implemented using software, hardware, or combinations of both.

The output of the search engine may be in various forms. In one embodiment, the output may display an input patent claim, the division of the patent claim into input text segments, the stored text segment that has been identified as similar to each of the input text segments, and the identity of each reference document that each stored text segment comes from. The search engine may perform a search on multiple claims and may display output for multiple claims in the same output document.

In one embodiment, the output may take the form of a claim chart. In one embodiment of a claim chart, the chart is divided into columns and rows. One column may display the patent claim and each text segment of the claim may be displayed in a separate row. An adjacent column may display the corresponding similar stored text segments. The cell next to each text segment of the patent claim may display one or more text segments from prior art references that are similar to that text segment of the patent claim. In some embodiments, the claim chart may be generated for multiple claims.

In one embodiment, the output of the search engine may take the form of an office action, such as in the format of office actions generated by the U.S. Patent & Trademark Office or by the patent offices of foreign countries or the International Bureau (TB) of the World Intellectual Property Organization (WIPO). Office actions may include reasons for rejection, such as for lack of novelty or obviousness. Office actions are currently written by human patent examiners.

The search engine may generate office actions. An office action generated by the search engine may be a textual document that identifies a reason for rejection of an input patent claim based on lack of novelty or obviousness. The office actions may be natural language documents that are human readable. The office actions may include the text of the input claim and also text identifying the stored text segments that are similar to each input text segment of the claim. In some embodiments, the text of the claim may be included in the office action and, next to each input text segment, the text of similar stored text segments may be displayed and optionally may be delimited such as by parentheses or other punctuation. In some embodiments, the office action may include output, such as described above, for multiple claims.

FIG. 1 illustrates an exemplary network architecture 100 that may be used in some embodiments. Network architecture 100 may include a network 102. The network 102 may be, for example, the Internet, an intranet, a private network, a public network, an internet, a wireless or wired network, or any other kind of network. On the network, there may be clients, such as client 112, and servers, such as server 113. Computers on the network 102 may communicate with each other by sending and receiving messages. An external data storage 111 may be on the network 102. A scraper server 121 may run a scraping computer program to access data stored on the external data storage 111 and download it. The scraper server 121 may store the downloaded data in raw data storage 122. Optionally, the scraper server 121 may store the downloaded data in raw form in the raw data storage 122 meaning that the data is stored in the form it is downloaded without transforming it. Text similarity storage 123 may store data identifying similar and dissimilar text segments. In an embodiment, the text similarity storage 123 comprises a database of relationships, such as in the form (text1, text2, sim) where text1 is a first text segment, text2 is a second text segment, and sim is an indication of whether text1 is similar or not to text2. In some embodiments, sim may be a binary value such as 0 for dissimilar or 1 for similar. In some embodiments, sim may be a floating or real value representing the degree of similarity between text1 and text2. For example, sim may take values between 0 and 1 where values closer to 1 indicate a higher degree of similarity and values closer to 0 indicate a lower degree of similarity. Document storage 124 may store electronic documents. Application server 125 may serve an online application to clients. For example, application server 125 may serve a web application or a mobile application. Machine learning server 126 may perform machine learning functionality. In some embodiments, the application server 125 may perform application programming interface (API) calls to machine learning server 126 to request the machine learning server 126 to perform machine learning tasks. The machine learning server 126 may return results of the API call that the application server 125 may incorporate in results returned to clients.

In an embodiment, the storage elements 111, 122, 123, and 124 may comprise databases. A database comprises any kind of structured data and may comprise a relational database, a non-relational database, SQL database, no-SQL database, distributed database, non-distributed database, flat file, text file, binary file, spreadsheet, data stored in memory, and any other kind of structured data.

Although some of the systems on network 102 are illustrated as single computers or servers, any of these computers or servers may comprise a plurality of computers or servers operating in coordination. For example, server farms or networks of servers may be used. Likewise, although single databases are illustrated, a plurality of databases may be used, such as networked databases in a master-slave relationship or other arrangements.

FIG. 2A illustrates an exemplary embodiment of document storage 124. In an embodiment, document storage 124 may store the text of a plurality of reference documents. The entire text of each of the reference documents may be stored in the document storage 124. In an embodiment, the text of each of the reference documents may be divided into text segments, where each text segment is stored as an individually indexable element. The text segments may be looked up and retrieved from the document storage 124 as individual units without having to retrieve the entirety of the reference document. This may enable faster processing when a specific portion of the reference document is needed because it may allow the system to look up and retrieve one or more text segments more quickly and also without having to retrieve the entire reference document with all of its text.

In this embodiment, the document storage may store a plurality of stored text segments, where the plurality of stored text segments collectively aggregate to form the reference documents. Each of the plurality of stored text segments may be stored in text form and an encoded form that may be used for processing. Moreover, each of the stored text segments may include an identifier of the reference document that it comes from and bibliographic information about that reference document. Each stored text segment may also include location information to identify where in the reference the stored text segment appears. Although illustrated in FIG. 2A using database tables, the document storage 124 may be any kind of storage and data may be stored in any format.

In an embodiment, the document storage 124 comprises a database comprising stored text segment table 210 and stored reference table 220, which are database tables. The stored text segment table 210 may store individual text segments from a plurality of reference documents and collectively comprise the entire text of the reference documents. Each text segment element 216 of the table may include data in a plurality of fields. An ID field 211 may provide a unique identifier for the text segment element to enable quick indexing and retrieval. The ID of the text segment element may be used as an identifier of the text segment element by other parts of the system. The text field 212 may comprise the natural language text of the text segment. This may be in formats such as ASCII or Unicode. The encoding field 213 may comprise a computer encoding of the text of field 212.

The computer encoding may be a feature representation of the text, where a feature representation is computer data representing the underlying element (in this case a text segment) in a different form than the raw element itself. The computer encoding may capture and condense the information in the raw text into a format that is more suitable for certain forms of computer processing.

The document ID field 214 may comprise an identifier of the reference document that the text segment 212 comes from. In some embodiments, the document ID may be an arbitrarily assigned identifier, such as an index number. In other embodiments, the document ID 214 may have a human-readable meaning. For example, the document ID 214 in some embodiments may comprise a U.S. or foreign patent number, U.S. or foreign patent application number, U.S. or foreign patent publication number, title, citation in various forms such as APA (American Psychological Association) or MLA (Modern Language Association), URL (uniform resource locator), or other information.

The location field 215 may comprise an identifier of a location in the reference document where the text segment 212 is located. For example, it may comprise a paragraph number, column and line number, line number, page and line number, page and paragraph number, x and y coordinates, or other information for identifying the location of the text segment within a document. In some embodiments, the location may comprise a range of any of the foregoing such as a range of paragraph numbers, range of column and line numbers, range of line numbers, range of page and line numbers, range of page and paragraph numbers, range of x and y coordinates, and so on.

Stored reference table 220 may comprise information about the reference documents that have their text stored in the document storage 124. In an embodiment, each reference element 226 corresponds to a single reference document whose text is in the document storage 124. The text of the reference documents is stored in the stored text segment table 210 and the stored reference table 220 comprises the bibliographic information about the references.

In an embodiment, each reference element 226 includes a plurality of fields. The document ID field 221 stores document IDs and corresponds to document ID field 214 of the stored text segment table 210. These fields 221, 214 link the data in the two tables together and allows looking up text segments based on a reference document and looking up a reference document based on one or more text segments. For example, for a given reference document, all of the text segments of the reference document may be retrieved from the stored text segment table 210 based on the document ID. Vice versa, for a given text segment in the stored text segment table 210, the reference that the text segment comes from may be retrieved from the stored reference table 220 based on the document ID.

Reference ID field 222 comprises a human-readable identifier of the reference document. Reference ID 222 may comprise a U.S. or foreign patent number, U.S. or foreign patent application number, U.S. or foreign patent publication number, title, citation in various forms such as APA (American Psychological Association) or MLA (Modern Language Association), URL (uniform resource locator), or other information.

Title field 223 may comprise a title of the reference document.

Priority date field 224 may comprise a priority date of the reference document. In some embodiments, the priority date comprises the effective priority date of a patent, patent application, or patent publication, where the priority date comprises the first date that the reference document qualifies as prior art. In some embodiments, the priority date may comprise an earliest effective filing date, which may be the date of first filing of a predecessor patent application in the chain of claim of priority. In some embodiments, the priority date may be the date that a non-patent literature reference became prior art, such as a publication date or sale date.

Publication date field 225 may comprise an identification of the date of first publication of the reference document. The publication date field 225 may include the publication date for patents, patent applications, patent publications, websites, articles, presentations, and so on.

The aforementioned description describes just one embodiment and the stored text segment table 210 and stored reference table 220 may include more or fewer fields of information. In some embodiments, a single database table may be used instead of multiple database tables. A single table may associate text segment information with bibliographic information about the reference, such as a reference ID, title, priority date, publication date, and other information. In one embodiment, the stored text segment table 210 may comprise reference ID field 222, title field 223, priority date field 224, and publication date field 225.

FIG. 2B illustrates an exemplary text similarity storage 123. In an embodiment, the text similarity storage 123 stores data about the similarity of text segments. The data may be organized as associations between pairs of text segments and a label identifying the level of similarity between the two text segments. The pairs of text segments may be individually indexable so that any given pair may be looked up and retrieved by the system without having to retrieve any other pairs. The pairs of text segments may be stored in a natural language form and an encoded form that may be used for processing. Moreover, information about one or more comparison documents where similarity data is derived from may also be stored in the text similarity storage 123.

The similarity data stored by the text similarity storage 124 may be of various types. In some embodiments, the text similarity data is data about the disclosure, in the patent law sense, of one text segment by another. For example, the text segments may be pairs of text segments identified in office actions where the first text segment is a portion of claim text and the second text segment is a text portion of a prior art document that the office action identifies as disclosing the first text segment. In this embodiment, disclosure may be for novelty purposes, where the second text segment discloses each and every aspect of the first text segment or for obviousness purposes, where the second text segment does not necessarily disclose each and every aspect of the first text segment but renders it obvious.

In an embodiment, text similarity storage 123 comprises a database comprising similarity table 230 and comparison document table 240, which are database tables. The similarity table 230 may store pairs of text segments and a similarity label. Each similarity pair 238 may include data in a plurality of fields. An ID field 231 may provide a unique identifier of the pair to enable quick indexing and retrieval. The ID of the similarity pair may be used as an identifier of the pair by other parts of the system. A first text segment of the pair may comprise first text field 232 and first encoding field 233. The first text field 232 may comprise the natural language text of the first text segment. This may be in formats such as ASCII or Unicode. The first encoding field 233 may comprise a computer encoding of first text field 232.

A second text segment of the pair may comprise second text field 234 and second encoding field 235. The second text field 234 may comprise the natural language text of the second text segment. This may be in formats such as ASCII or Unicode. The second encoding field 235 may comprise a computer encoding of the text of second text field 234.

Comparison document ID field 236 may identify a comparison document that the pair was identified from. This field is optional because not all text segment pairs may be derived from a document. For example, some pairs may be added to the similarity table 230 based on user feedback during use of the system. However, if the pair was extracted or parsed from a comparison document, then the comparison document ID field 236 may comprise an identifier of the comparison document.

Similarity field 237 may comprise a similarity label for the pair. The similarity label may comprise a score identifying the level of similarity between the first text segment (fields 232, 233) and second text segment (234, 235). In one embodiment, the similarity label may be a binary value such as 0 for dissimilar and 1 for similar. In some embodiments, the similarity label may have a real, floating point, or integral value. In one embodiment, the similarity label may take a value between 0 and 1, where values closer to 0 mean more dissimilar with 0 being completely dissimilar and values closer to 1 meaning more similar with 1 being completely identical.

Additional optional fields in similarity table 230 may include a claim field to identify the claim that an office action was responding to in associating the first text segment and second text segment. One of the text segments may correspond to a portion of a claim and the other text segment may correspond to a portion of a prior art document that the office action alleges to disclose the claim portion.

Comparison document table 240 may comprise information about a plurality of comparison documents from which some of the similarity pairs have been extracted and stored in similarity table 230. In an embodiment, each comparison document element 245 corresponds to a single comparison document whose similarity pairs are in the similarity table 230. The comparison document elements 245 may comprise bibliographic information about the comparison documents.

In some embodiments, comparison documents comprise office actions from the U.S. patent office, foreign patent offices, or WIPO. The office actions are documents and may contain text segment pairs that are associated by similarity. The office action may identify a first text segment from a claim and a second text segment of a prior art document and associate the two text segments by an allegation that the second text segment discloses the first text segment. The allegation may be a text statement and may or may not include reasoning about why the two text segments are similar. The office action may contain a plurality of statements in this form associating text segments of a claim and text segments from prior art documents.

Comparison documents may also include documents that are not office actions. For example, a spreadsheet or table of similarity pairs identified by a human reviewer may also be a comparison document. In an embodiment, a comparison document may comprise a claim chart from a patent validity search or litigation which associates one or more first text segments from the claims of a patent with one or more second text segments from a prior art document, product description, or other reference document. In an embodiment, a comparison document may comprise a search report from freedom-to-operate or patentability search which associates one or more first text segments from a draft claim or product description with one or more second text segments from a prior art document.

Comparison documents may also include a database or other data repository containing similarity pairs identified by a human reviewer. In an embodiment, a comparison document may comprise a database output by a data tagging software. The data tagging software may present a user with one or more text segment pairs. For each text segment pair, the user may label the pair as similar or not similar. The user labels and text segment pairs may be stored in a database. Optionally, the user may also be prompted to provide an explanation of their selection. The explanation may also be stored in the database.

In an embodiment, each comparison document element 245 comprises a plurality of fields. The comparison document ID field 241 stores a comparison document ID and corresponds to comparison document ID field 236 of the similarity table 230. These fields 236, 241 link the data in the two tables together and allows looking up similarity pairs based on a comparison document and looking up a comparison document based on one or more similarity pairs. For example, for a given comparison document, all of the similarity pairs from the comparison document may be retrieved from the similarity table 230 based on the comparison document ID. Vice versa, for a given similarity pair in the similarity table 230, the comparison document that the similarity pair comes from may be retrieved from the comparison document table 240 based on the comparison document ID.

Application ID field 242 may comprise an identifier of a patent application that the comparison document comes from. The application ID field 242 may be used in embodiments where the comparison document is an office action. The application ID may comprise an identifier of the patent application to which the office action applies and for which the office action was generated during prosecution the patent application. The office action may be extracted from the file history or prosecution history of the patent application. In some embodiments, the application ID may comprise the patent application number. In other embodiments, the application ID may be other identifiers of a patent application, such as an arbitrarily assigned numerical index.

Prior art document IDs field 243 is an optional field that may comprise the document IDs of reference documents that were cited in the comparison document. For example, where the comparison document is an office action, the prior art document IDs may comprise document IDs of the reference documents cited in the office action. The document IDs may correspond to document IDs that may be used to index document ID field 214 and document ID field 221.

Date field 244 may comprise the date of the comparison document. Where the comparison document is an office action, the date field 244 may comprise the date that the office action was issued or mailed.

Additional optional fields in comparison document table 240 may include a rejection field to identify all rejections made in an office action, a prior art combinations field to identify all the prior art combinations in an office action, a rejected claims field to identify all the claims that were rejected in an office action, an allowed claims field to identify all claims that were allowed in an office action, an examiner field to identify the examiner that drafted or issued the office action, and other fields.

The aforementioned description describes just one embodiment, and the similarity table 230 and comparison document table 240 may include more or fewer fields of information. In some embodiments a single database table may be used instead of multiple database tables. A single table may associate similarity pair data with bibliographic information about the corresponding comparison document, such as comparison document ID, application ID, prior art document IDs, and date. In one embodiment, the similarity table 230 may comprise application ID field 242, prior art document IDs field 243, and date field 244, and other fields of comparison document table 240.

As described above, the text similarity storage 123 may comprise a plurality of pairs of text segments and similarity labels indicating the level of similarity of each pair. In one embodiment, the text similarity storage 123 may comprise a training data set for a text similarity machine learning model, including both positive and negative training examples.

Figure 3A:
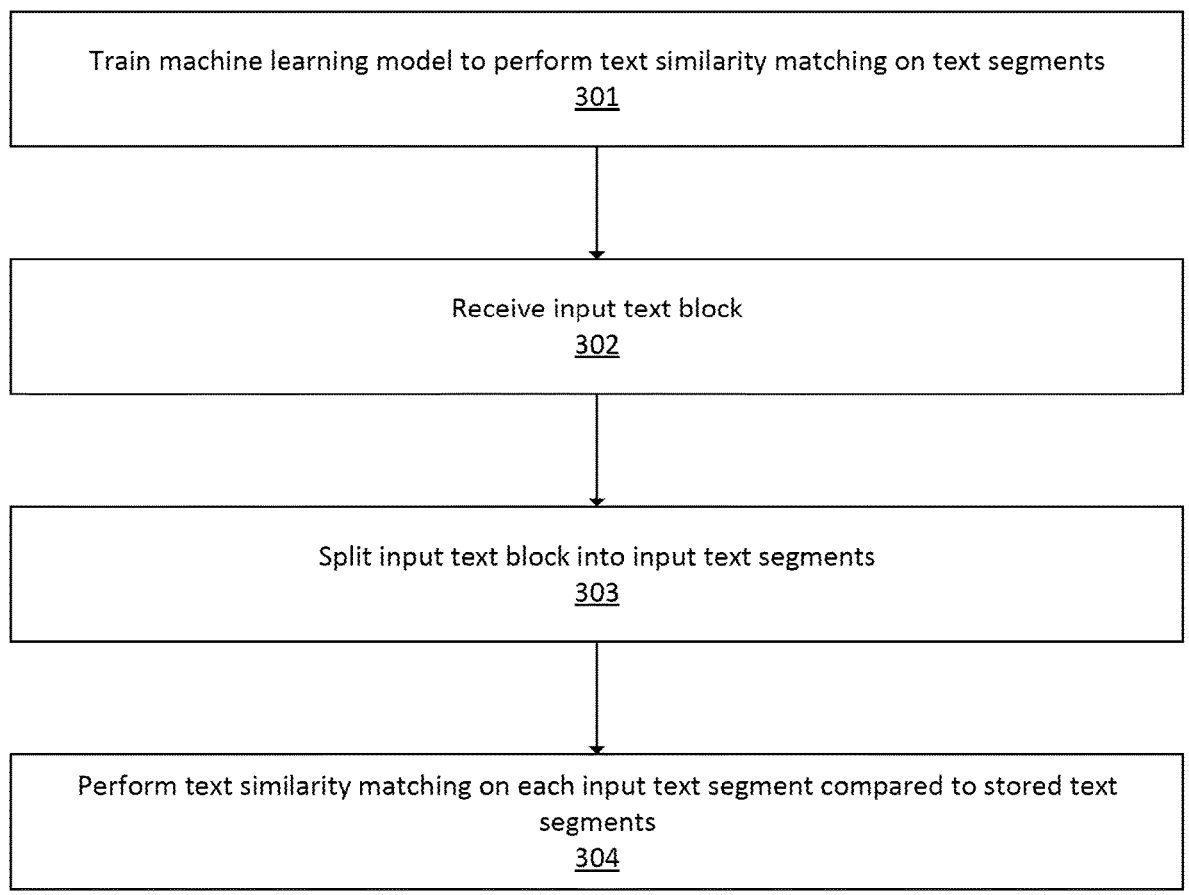
FIG. 3A illustrates an exemplary method that may be performed by a search engine in some embodiments.

FIG. 3A illustrates an exemplary method 300 that may be performed by a search engine in some embodiments.

In step 301, a machine learning model may be trained to perform text similarity matching on text segments by using training examples. The machine learning model may determine for an input text segment, which stored text segments are most similar to it. In one embodiment, this is performed by training a machine learning model to accept as input two text segments and output a similarity score. A similarity score may comprise any score of the similarity between the two text segments. In one embodiment, the similarity score may take a value between 0 and 1 indicating the likelihood that the text segments are similar. The similarity score is determined in part by the training of the machine learning model.

In step 302, an input text block may be received from a user.

In step 303, the input text block may be split into input text segments.

In step 304, text similarity matching may be performed on each input text segment using the machine learning model. The machine learning model may identify for each input text segment one or more similar stored text segments from the document storage 124 or may determine that there is no similar stored text segment.

In an embodiment, the input text segments may be considered query text segments and the stored text segments in document storage 124 may be considered candidate text segments. The trained machine learning model may be run to compare a query text segment with all candidate text segments. The trained machine learning model may be run once for every candidate text segment to compare the candidate to the query text segment. Although this may require many runs, these processes may be performed in parallel. In some embodiments, with sufficient processing power, the processes may be performed completely in parallel so that the time to compare the query text segment with each candidate text segment takes approximately the same amount of time it takes to compare the query text segment to a single candidate text segment. The candidate text segment with the highest similarity score to the query text segment may be identified as the most similar. In some embodiments, the candidate text segments may be ranked by their similarity score.

Machine learning models that may be used in method 300 and in other aspects herein may include, for example, neural networks, recurrent neural networks (RNNs), convolutional neural networks (CNNs), fully-connected neural networks, attention models, and transformer models. These models may be combined. For example, neural networks may include one or more layers, where the layers may be the same or different types of neural networks. Any of the aforementioned machine learning models may be used to implement machine learning models 433, 505, 1033 and any other machine learning model in this disclosure.

Figure 3B:
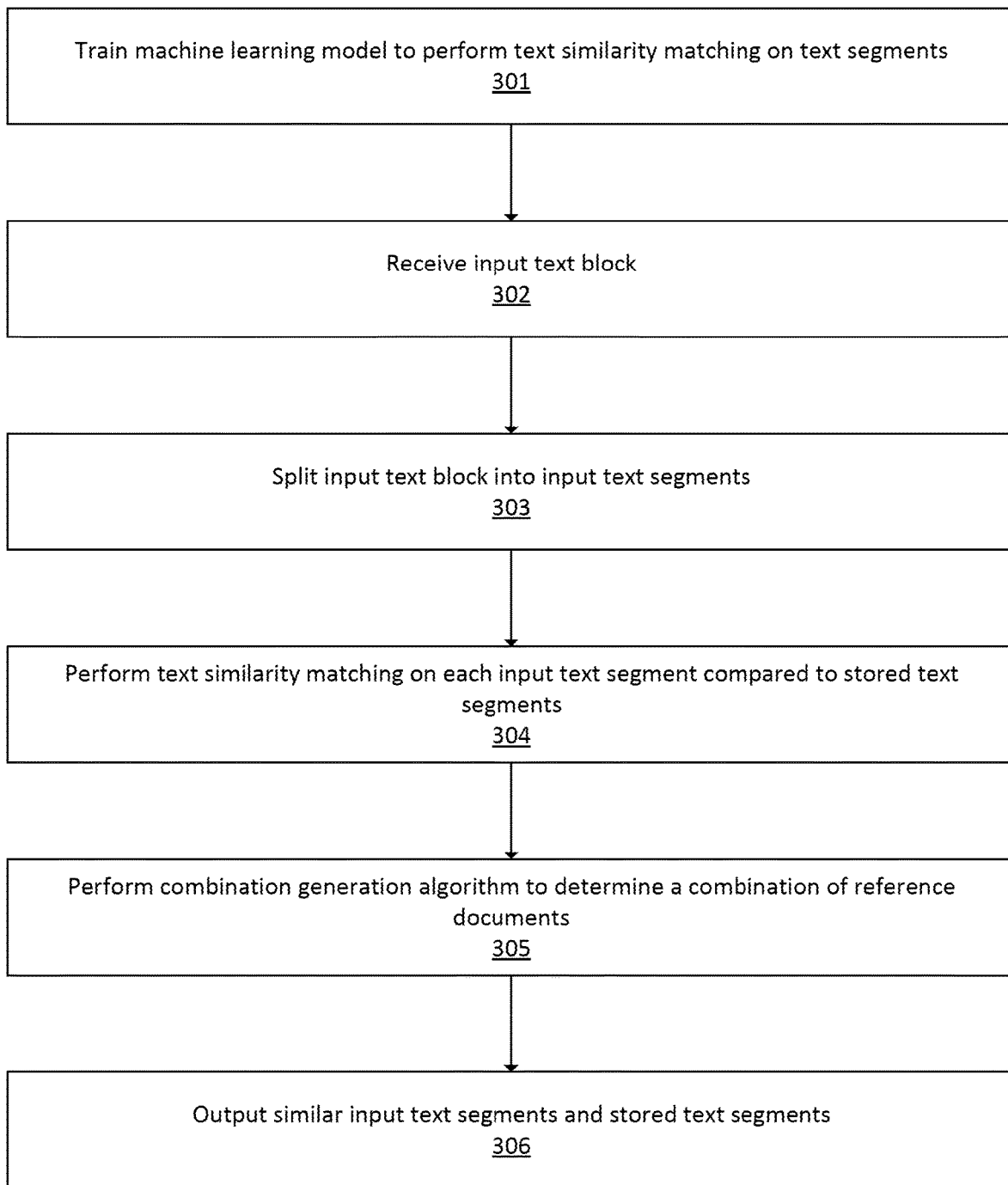
FIG. 3B illustrates another exemplary method that may be performed by a search engine in some embodiments.

FIG. 3B illustrates an exemplary method 310 that may be performed by a search engine in some embodiments. Method 310 may include steps 301-304 as described herein. In step 305, a combination generation algorithm may be performed to identify a combination of text segments and associated reference documents from document storage 124. The combination of text segments include at least one text segment that is similar to each of the input text segments generated in step 303, and the combination of references and text segments meets a selection criteria.

In an embodiment, for each input text segment, at least one of the reference documents includes one text segment that is similar to it. In some embodiments, the required level of similarity is defined by a similarity threshold. In some embodiments, the threshold is a number between 0 and 1 where numbers closer to 1 indicate a higher degree of similarity and numbers closer to 0 indicate lower degree of similarity. In step 306, the search engine may output the input text segments and the corresponding similar stored text segments found in the reference documents. The output may also include identification of the reference documents, such as by name.

Figure 4A:
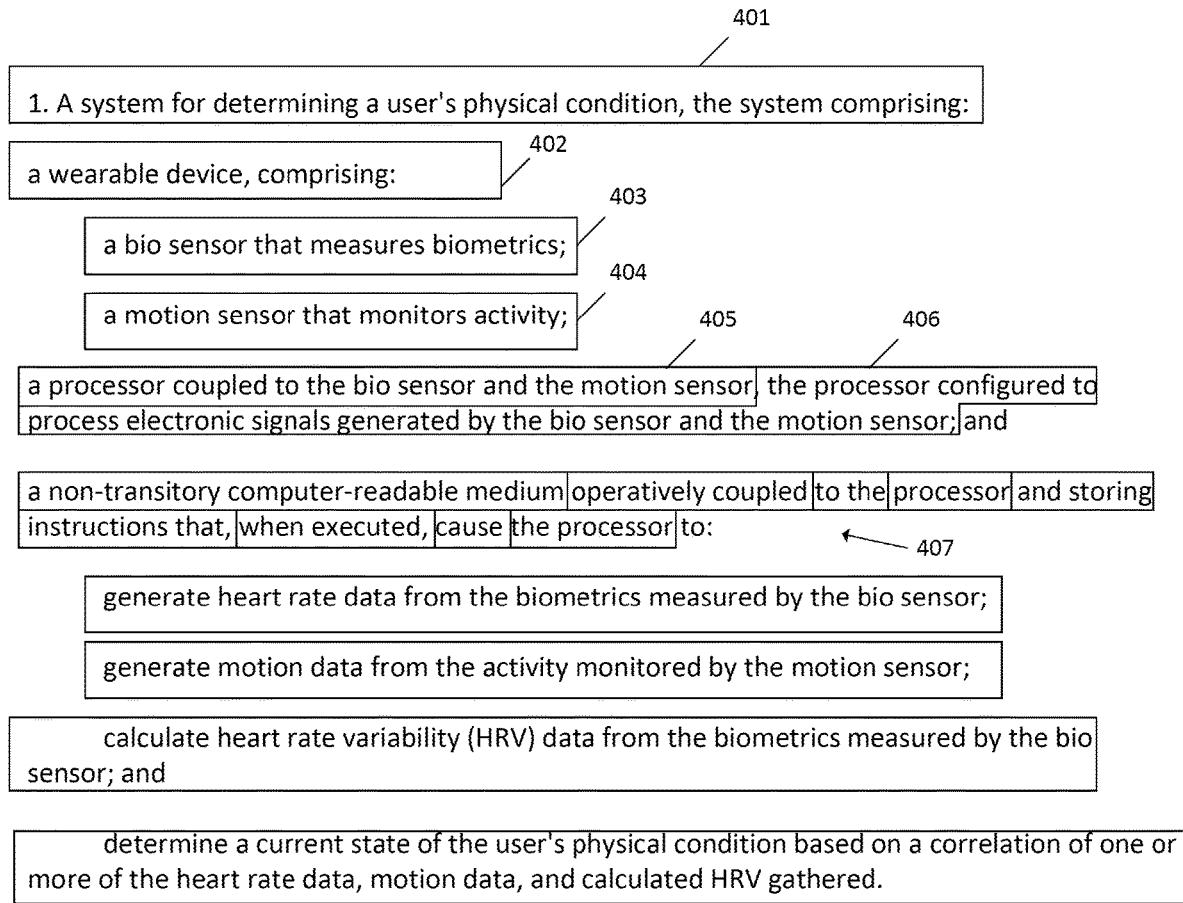
FIG. 4A illustrates an exemplary input text block.

FIG. 4A illustrates an exemplary input text block 400. An input text block 400 may be any portion of text. No particular length is required for a text portion to be an input text block. Moreover, no particular shape of text is required and the term "block" does not imply that the text must be in the shape of a block. In some embodiments, the input text block 400 may take the form of a patent claim. In other embodiments, the input text block 400 may be arbitrary text and need not be a patent claim.

As described in step 303, the input text block 400 may be split into input text segments. The term split refers to the division of the input text block 400 into smaller component portions. Splitting may also be referred to as extracting, and the split process may also be referred to as extracting input text segments from the input text block. The input text segments generated from the splitting process may comprise all or less than all of the text of the input text block 400.

Splitting may be performed by a variety of methods. In one embodiment, input text segments may be identified based on specified punctuation such as a colon (":"), semi-colon (";"), comma (","), or period ("."). A list of punctuation marks may be defined for splitting. The input text block 400 may then be split on the punctuation so that a separate input text segment is created between each of the specified punctuation marks. The input text block may be cut at the specified punctuation marks to create the separate input text segments. In some embodiments, the split text segments include the punctuation marks, and, in other embodiments, they do not.

In an embodiment, the preamble text segment 401 is split from the input text block 400 by splitting on the first colon in the input text block 400. Additional input text segments may also be created by splitting on punctuation typically denoting individual lines of a patent claim, such as colons and semi-colons. Input text segments 402, 403, 404 may be created by splitting the input text block on colons and semi-colons. Input text segment 402 is not split based on the comma in this embodiment but could be in other embodiments.

Input text segments 405 and 406 are created by splitting on commas and semi-colons. Commas in a patent claim typically do not start a new line in the claim but may still indicate the start of a new concept. In some embodiments, input text segments are split based on commas.

Input text segments may also be created by splitting even when there is no punctuation. It may be desirable to isolate individual concepts such as nouns, entities, adjectives, modifiers, verbs, or actions into an input segment. Input text segments 407 are shown illustrating splitting based on factors other than punctuation. The input text segments 407 are split based on the semantic meaning of the words and grouping words into units that comprise, for example, a noun, entity, adjective, modifier, verb, or action. Machine learning algorithms for entity recognition may be used to split the input text block 400 based on semantic concepts rather than punctuation.

In some embodiments, various forms of splitting based on punctuation and not based on punctuation may be mixed used together, such as illustrated in FIG. 4A. In other embodiments, only one type of splitting is used on a single input text block. Moreover, splitting of the input text block 400 may also be performed by a splitter machine learning model.

Figure 4B:
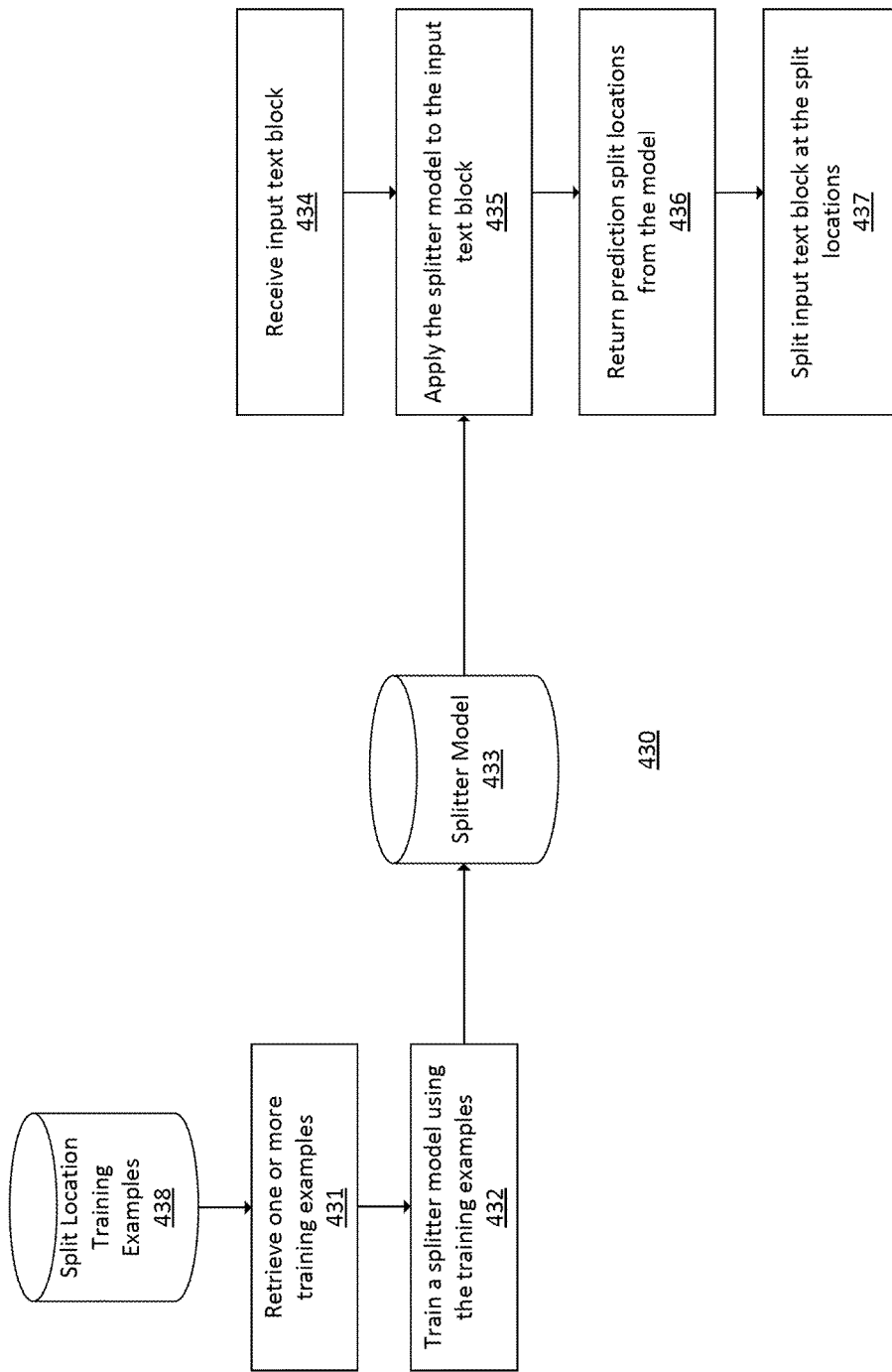
FIG. 4B illustrates an exemplary method for training a splitter machine learning model and applying the splitter machine learning model to split an input text block.

FIG. 4B illustrates an exemplary method 430 for training a splitter machine learning model and applying the splitter machine learning model to split input text block 400.

In step 431, one or more training examples are retrieved from storage, such as a database of training examples 438. Each training example may comprise a text block and the desired, or target, split points for the text block. In step 432, a splitter machine learning model is trained using the training examples. Any form of machine learning model may be used. As a result, a trained splitter machine learning model 433 is generated.

During the inference process, at a potentially later time than training, in step 434, an input text block is received from a user. In step 435, the splitter machine learning model 433 is applied to the input text block. Based on input of the input text block to the splitter machine learning model, the splitter machine learning model outputs one or more predicted split locations for the input text block. The predicted split locations may be locations in the input text block where a split should be made to create separate input text segments. The predicted split locations may be identified in various ways, such as by the number of characters from the beginning of the input text block, the number of characters from the end of the input text block, a column and line number, an x and y coordinate, or by other location identifiers.

In step 437, the system may split the input text block at the predicted split locations generated in step 436 in order to split to input text block into a plurality of input text segments. The resulting input text segments may be of varying lengths. Some of the split locations may be at punctuation marks while others may not correspond to any punctuation, as illustrated in FIG. 4A.

Figure 4C:
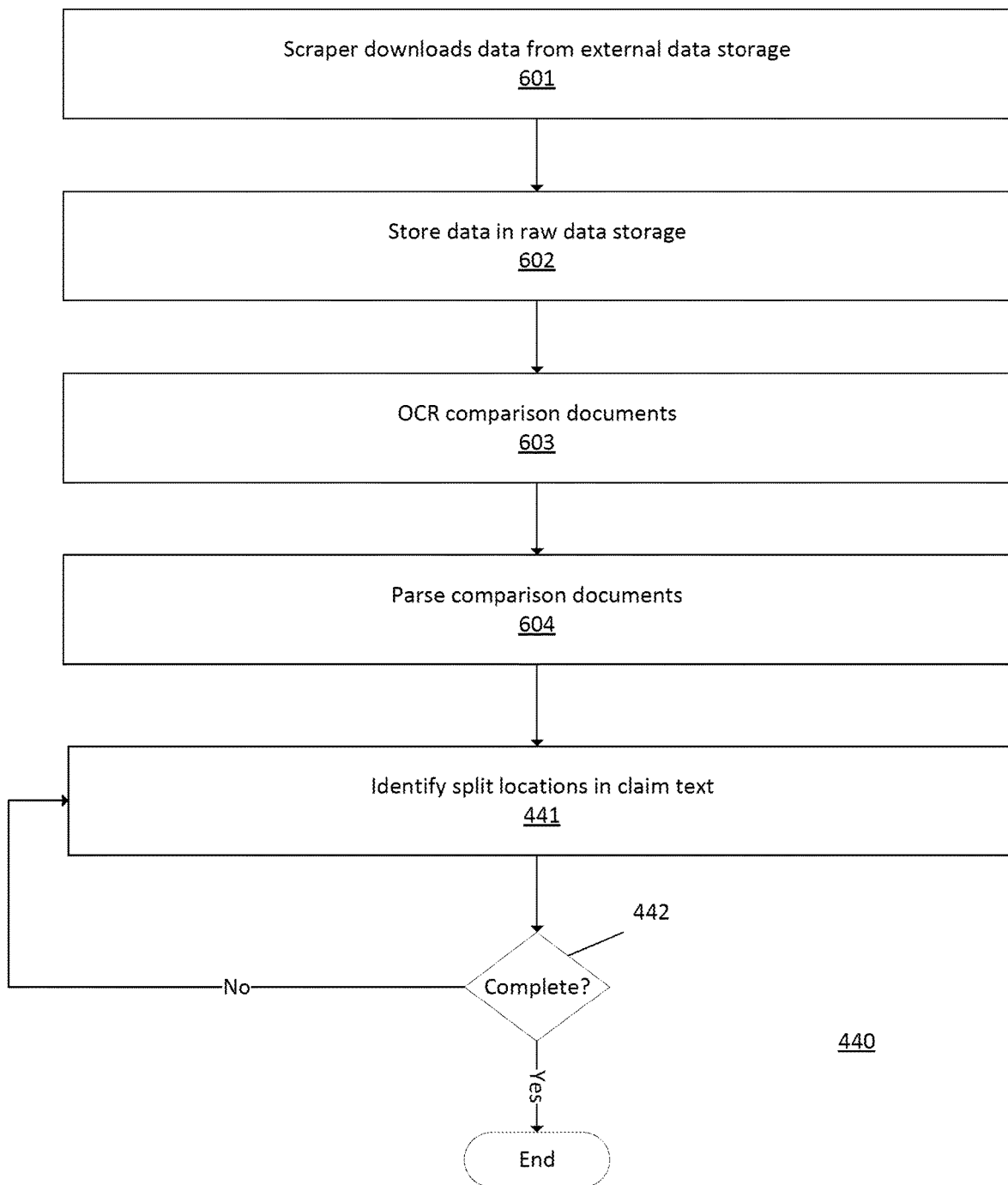
FIG. 4C illustrates an exemplary method for obtaining split location training examples.

FIG. 4C illustrates an exemplary method 440 for obtaining the split location training examples 438.

In method 440, the steps 601-604 may be used, which are described in more detail in the context of method 600. Through steps 601-604, a scraper may download data from external data storage 111, and the scraper may store the data in raw data storage 122. In some embodiments, the data may comprise comparison documents, such as office actions. The comparison documents may be processed using optical character recognition (OCR) and parsed.

In step 441, the comparison document, such as an office action, may be parsed to identify split locations in claim text. The split locations may comprise the locations where a claim is split into text segments in the office action, where each of the text segments has a separate citation. In an office action, the split locations may correspond to locations where a citation is present, since in many office actions the citation directly follows the claim text that it corresponds to and, often, the citation is unrelated to text that follows it.

As illustrated in FIGS. 7A-D, in office action 700, a claim text segment 713 is followed by a citation statement 714 that corresponds to it. In the text of the entire claim starting from the preamble at claim text segment 711 and ending with the claim text segment 723 and citation statement 724, the locations of the citations may be identified as the split locations. In this illustration, the citations are enclosed in parentheses, but in other examples they may be denoted in different ways. A subset of the citation statements are labeled in the diagram, such as citation statements 712, 714, 716, 718, 720, 722, 724.

Therefore, the parser may identify the split locations in a claim by identifying the citations. It may identify the citations by identifying text enclosed in parentheses.

A training example for the splitter model 433 may be created by using the claim text as the training data and the split locations from the office action as the split locations. This trains the splitter model 433 to split claim text as it would be split by citations in an office action.

In step 442, the process may be repeated to identify additional claims in the office action and their split locations, until the office action has no further claims to process. The training examples created may be stored as split location training examples 438.

In one embodiment, the method 440 may be performed while also gathering training data for the text similarity machine learning model using methods 600 and 610. For example, step 441 may be performed in parallel or interspersed with steps 605-607 in method 600 or in parallel or interspersed with steps 616-613 of method 610.

Figure 5A:
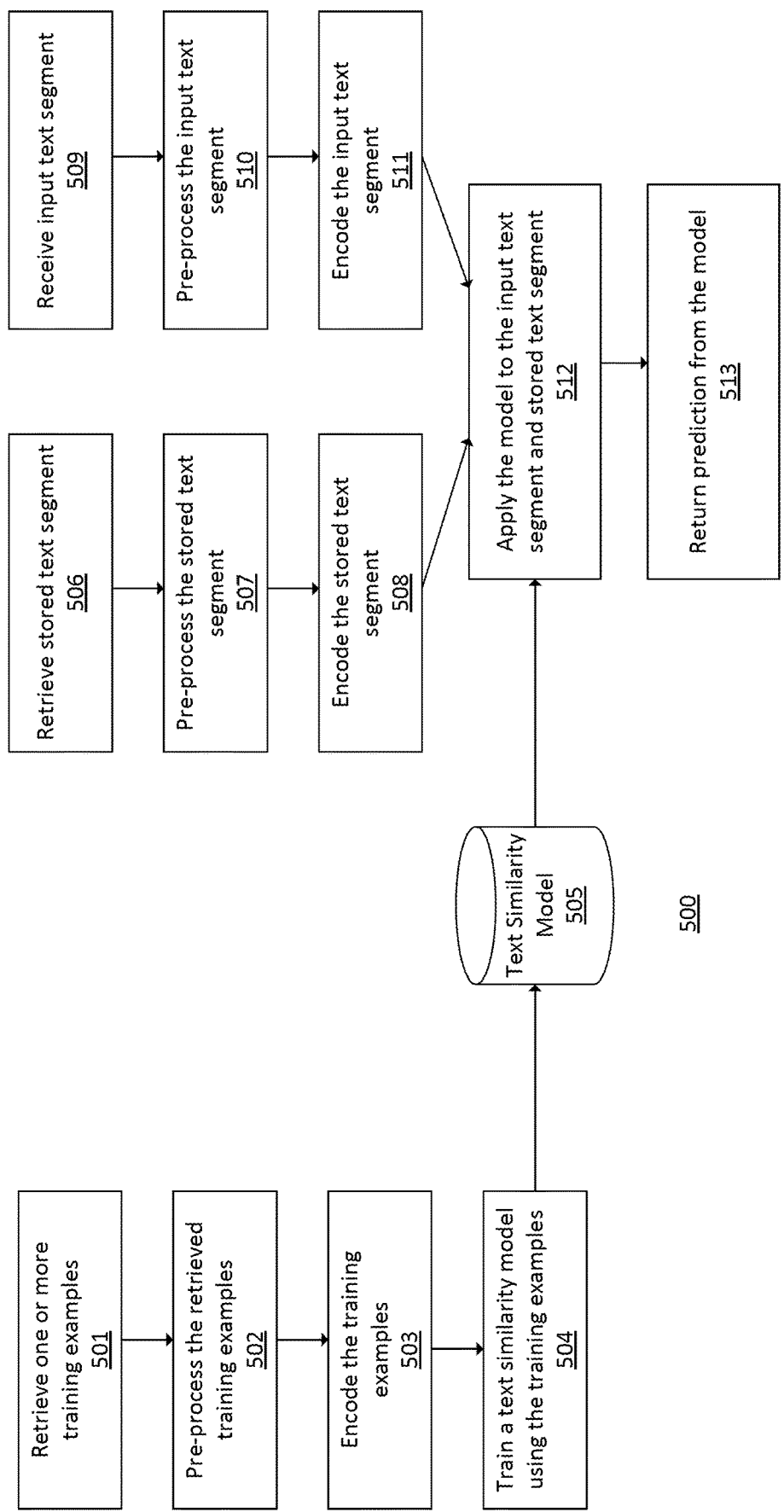
FIG. 5A illustrates an exemplary method for training a text similarity model and applying it to generate a similarity score.

FIG. 5A illustrates an exemplary method 500 for training a text similarity model 505 and applying it to generate a similarity score. In step 501, one or more training examples are retrieved. In an embodiment, training examples may be retrieved from text similarity storage 123 and may comprise text segment pairs with a similarity label. For example, each training example may comprise a similarity pair 238.

In step 502, the retrieved training examples may be pre-processed. Pre-processing may comprise removing punctuation, addressing abbreviations by removing them or replacing them with the corresponding full word based on lookup in a dictionary of abbreviations, removing unknown words or rare words, removing stop words, which may comprise words that are so common as to be unhelpful in text processing, lemmatization, stemming, or other processing.

In step 503, the pre-processed training examples may be encoded into feature representations. The pre-processing and encoding of steps 502 and 503 are optional if the training examples have already been pre-processed and encoded as illustrated in similarity table 230. In similarity table 230, the pre-processing and encoding have already been performed to generate encoded first and second text segment fields 233, 235 containing encoded versions of the corresponding text.

In step 504, the text similarity model is trained based on the training examples to generate the text similarity machine learning model 505.

During inference, which may occur at a later time than training, an input text segment 509 may be received. The input text segment may be received as a result of splitting an input text block 400, and the input text segment may be one of the input text segments extracted from the input text block in step 303.

In step 510, the input text segment may be pre-processed using the same pre-processing procedures as described in step 502. In step 511, the input text segment may be encoded into a feature representation.

In step 506, a stored text segment is retrieved. In an embodiment, the stored text segment is retrieved from document storage 124 and the stored text segment comprises a text segment of a prior art reference document. For example, step 506 may occur as part of the retrieval of a plurality of stored text segments in, for example, steps 811, 824.

In step 507, the retrieved stored text segment is pre-processed using the same pre-processing procedures as described in step 502. In step 508, the pre-processed stored text segment is encoded into a feature representation. The pre-processing and encoding of steps 507 and 508 are optional if the stored text segments have already been pre-processed an encoded as illustrated in stored text segment database table 210. The stored text segments 216 are already pre-processed and encoded and stored in encoding field 213.

In step 512, the input text segment and retrieved stored text segment are input to the text similarity model 505. In an embodiment, the encoded versions of these text segments are input to the text similarity model 505 and the text similarity model 505 is configured to process the encoded versions.

In step 513, the text similarity model returns a prediction comprising a similarity score that measures the similarity between the input text segment and retrieved stored text segment.

Figure 5C:
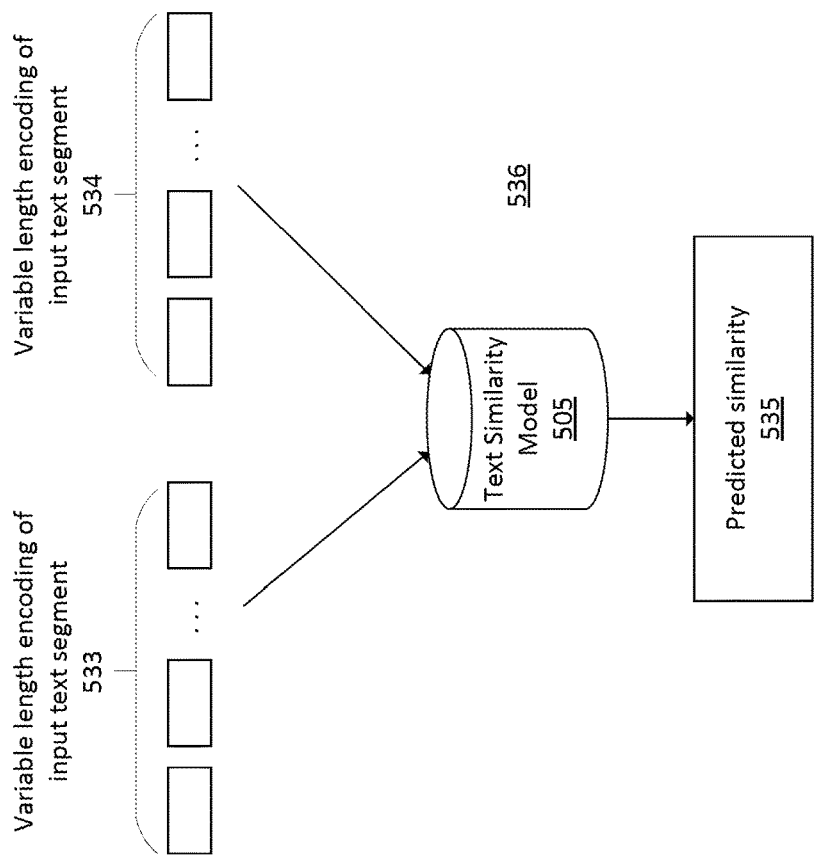
FIGS. 5B and 5C illustrate exemplary encodings.
Figure 5B:
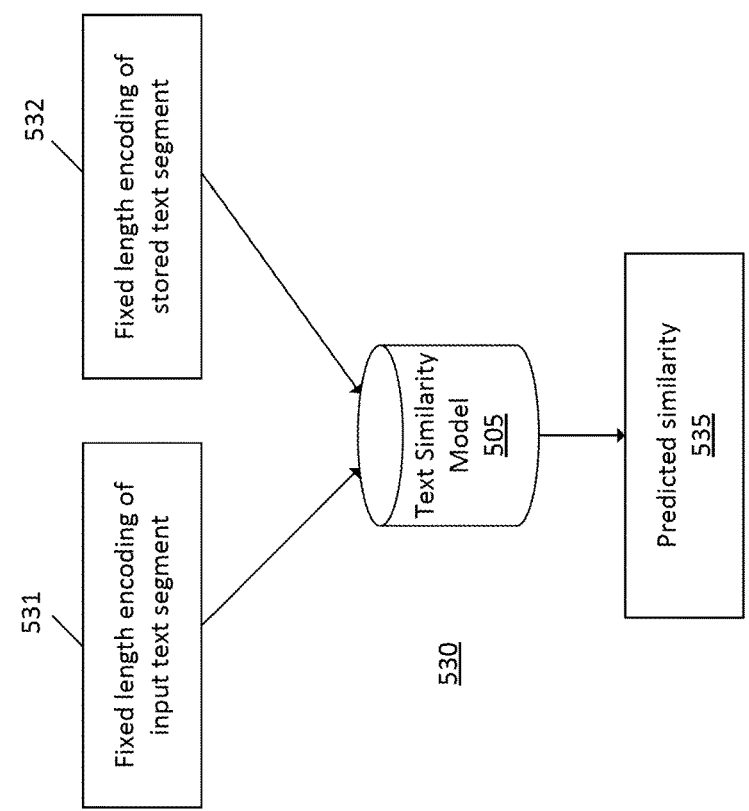

FIGS. 5B and 5C illustrate exemplary encodings that may be used in some embodiments. In embodiment 530, the input text segment and stored text segment are encoded as fixed length encodings 531, 532. By fixed length, it is meant that the length of the encoding does not change with the length or size of the text segment. In one embodiment, the fixed length encoding is a tensor. The term tensor is used to refer to a vector or matrix of any number of dimensions. A tensor may have dimension 0 (scalar), dimension 1 (vector), dimension 2 (2-dimensional matrix), or any higher number of dimensions such as 3, 4, 5, and so on. The multi-dimensional property of some tensors makes them a useful tool for representing machine learning models and their parameters and also the data representations input and output from machine learning models and internal data passed within a machine learning model.

Fixed length tensors may be created using supervised or unsupervised artificial intelligence algorithms. For example, a fixed length tensor encoding for a text segment may be created using techniques such as sentence embedding or document embedding. Sentence embeddings algorithms that may be used include Skip-Thoughts, Quick-Thoughts, DiscSent, InferSent, Universal Sentence, and other algorithms.

The fixed length encodings that are created from a text segment may be referred to as text segment embeddings. In some embodiments, the fixed length encodings are generated such that text segments with similar semantic meanings are mapped by the encoding process to encodings that are close together in tensor space. That is, when the encodings are graphed in multi-dimensional space, the points appear relatively closer to each other as compared to the encodings of unrelated sentences.

The distance between different tensors or encodings may be measured using a distance metric. For example, distance metrics that may be used include cosine similarity, dot product, Euclidean distance, Manhattan distance, Minkowski distance, and others. The encoding algorithm may be designed so that it encodes text segments with similar semantic meanings to encodings that are close together, as measured by the distance metric, relative to encodings generated from text segments that are not semantically similar.

In some embodiments, the encoding algorithm to convert text segments into encoded text segments is a machine learning model. Embodiment 530 accepts as input two fixed length encodings 531, 532 and produces a predicted similarity score 535.

In embodiment 536, the input text segment and stored segment are encoded as variable length encodings 533, 534. By variable length, it is meant that the length of the encoding may change with the length or size of the text segment. In one embodiment, the variable length encodings comprise sequences of word embeddings, where each word embedding in the sequence corresponds to a word of the natural language text segment after pre-processing (for example, after removing stop words and punctuation and stemming or lemmatization as applicable).

In one approach, the encoding for a text segment may be generated by pre-processing the text segment and iterating over the words of the pre-processed text segment and looking up the corresponding word embedding for each word of the pre-processed text segment from a dictionary of word embeddings. The dictionary of word embeddings may be created through a supervised or unsupervised artificial intelligence or machine learning algorithm. A word embedding is a kind of encoding of a word. In some embodiments, each word embedding may comprise a fixed length tensor. The variable length encoding is then the sequence of word embeddings created by looking up each word of a text segment in the word embedding dictionary.

Word embeddings may be created using word embedding algorithms such as skip-gram, continuous bag of words (CBOW), Word2Vec, GloVe, ELMo, or other algorithms. In some embodiments, the word embedding algorithm is designed to generate word embeddings for related or semantically similar words that are close together in the tensor space of word embeddings, while generating word embeddings for words that are not related or semantically similar to be distant from each other in the tensor space of word embeddings. That is, when the word embeddings are graphed in multi-dimensional space, the points for similar words appear relatively closer to each other as compared to the word embeddings of semantically unrelated words. The distance between word embeddings may also be measured using a distance metric. The distance metrics described above may also be used here for word embeddings. Words that are similar may be mapped by the word embedding algorithm to word embeddings that are close together as measured by the distance metric, relative to word embeddings of semantically unrelated words, which may be farther away as measured by the distance metric.

In some embodiments, the encoding algorithm to convert text segments into variable length encodings is a machine learning model. Embodiment 536 accepts as input two variable length encodings 533, 534 and produces the predicted similarity score 535.

The text segment encodings described above and illustrated in embodiments 530, 536 may be used, for example, in encoding field 213, first encoding field 233, second encoding field 235, encoding steps 503, 508, 511, 621, 814, 823, 826, and everywhere else in this disclosure where encodings are used.

Figure 5D:
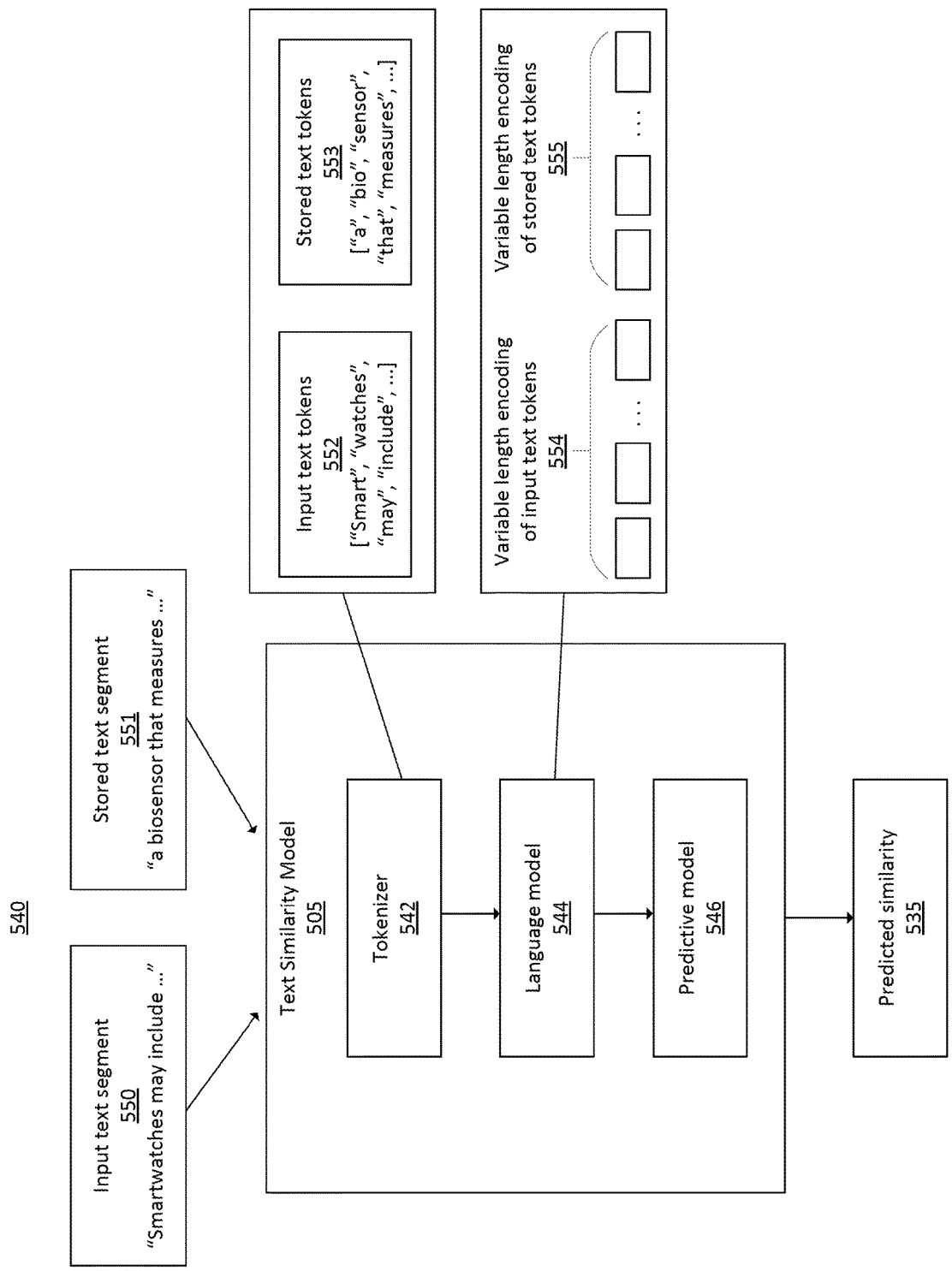
FIG. 5D illustrates an exemplary embodiment of a text similarity model.

FIG. 5D illustrates an exemplary embodiment of a text similarity model 505 where the input text segment and stored text segment are not encoded. Embodiment 540 accepts as input two text segments comprising sequences of characters. Each text segment is tokenized using tokenizer 542 and encoded using language model 544. Then predictive model 546 is applied to the encoded text segments to produce predicted similarity 535. For illustration, an example input text segment 550 and stored text segment 551 are shown.

Tokenizer 542 takes as input a sequence of characters representing an unknown number of words and unlimited vocabulary and transforms the sequence of characters into a sequence of tokens with a fixed size vocabulary. The sequence of characters may comprise a text segment such as input text segment or stored text segment. Each token may comprise a subset of the character sequence representing a word or part of a word. The vocabulary may comprise a set of unique tokens. The number of unique tokens, also called vocabulary size, may be finite. The vocabulary size may be specified as a parameter. The resulting list of tokens is more easily processed by other parts of the model than raw text. For example, input text tokens 552 and stored text tokens 553 may be generated by tokenizer 542 from input text segment 550 and stored text segment 551 respectively.

Tokenizer 542 may be trained to perform the transformation using large amounts of training text which may be representative of inputs to text similarity model 505. In some embodiments, tokenizer 542 may be trained by splitting the training text using a heuristic or regular expression such as splitting on white space. The resulting text fragments may be scanned. The most common fragments up to the vocabulary size may be recorded as tokens, while less common fragments may be discarded or replaced with a placeholder token. In other embodiments, algorithms such as Sub Word tokenization or WordPiece tokenization may be trained on the training text in order to produce tokenizer 542. In some embodiments, complex, compound, or uncommon words may be split into one or more tokens representing parts of the word in order to satisfy the vocabulary size limit. For example, compound words may be split into tokens representing each component word, or prefixes and suffixes may be split as separate tokens from the root word.

In an embodiment, multiple tokenizers may be trained using different training text. For example, tokenizers may be trained on text from different patent classifications. Then, when input is given to embodiment 540, one or more of the tokenizers may be selected to tokenize the inputs. For example, a tokenizer trained on the same patent classification as the input may be selected. In addition, when the input text segment and stored text segment are from different patent classifications, tokenizers trained on each respective patent classification may be used to tokenize each respective text segment.

Language model 544 takes as input a sequence of tokens produced by tokenizer 542 and returns a variable length encoding. In an embodiment, the variable length encoding may comprise a sequence of word embeddings, where each word embedding is the corresponding word embedding for each token in the sequence of tokens. For example, variable length encodings 554 and 555 may be generated by language model 544 from input text tokens 552 and stored text tokens 553 respectively.

Language model 544 may be trained to generate word embeddings using large amounts of training text. The training text may be representative of inputs to text similarity model 505. The training text may be tokenized using tokenizer 542 to generate a sequence of training tokens. A word embedding algorithm may be trained on the sequence of training tokens to generate word embeddings for each token. The word embedding algorithm may comprise skip-gram, continuous bag of words (CBOW), Word2Vec, GloVe, ELMo, or other algorithms.

In an embodiment, multiple language models may be trained using different training text. For example, language models may be trained on text from different patent classifications. Then, when input is given to embodiment 540, one or more of the language models may be selected to encode the inputs. For example, a language model trained on the same patent classification as the input may be selected. In addition, when the input text segment and stored text segment are from different patent classifications, tokenizers trained on each respective patent classification may be used to tokenize each respective text segment.

Predictive model 546 takes as input two variable length encodings and returns a score. The score may comprise predicted similarity 535. For example, predictive model 546 may take as input variable length encodings 554 and 555, and the output of predictive model 546 may be returned as predicted similarity 535.

Figure 5E:
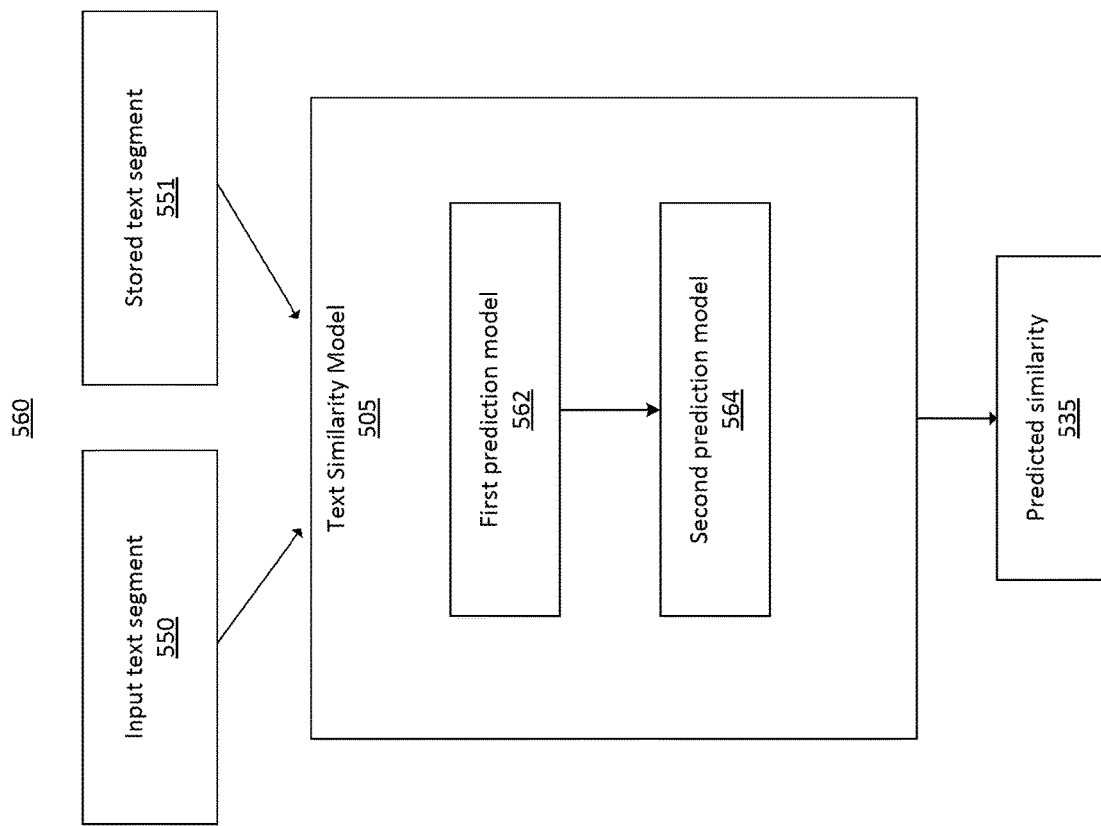
FIG. 5E illustrates an exemplary embodiment of a text similarity model.

FIG. 5E illustrates an exemplary embodiment of a text similarity model 505 which includes cascaded first and second prediction steps. A first prediction is performed by a first prediction model 562 and a second prediction is performed by a second prediction model 564. The second prediction may depend on the outcome of the first prediction. For example, the second prediction model may use the first prediction as an input. In another example, the second prediction model may be selected from a set of prediction models based on the first prediction. In another example, the second prediction model may be activated or deactivated depending on the first prediction.

In an embodiment, the first prediction model predicts a patent classification for the input. Then, the second prediction model may be selected based on the predicted patent classification. For example, the second prediction model may be selected by picking a model with highest performance on the predicted classification or by picking a model which was trained on training data from the predicted patent classification. The second prediction model selected may then be applied to the input to generate predicted similarity 535.

In another embodiment, the first prediction model acts as a coarse-grained filter which predicts when the inputs are unrelated, while the second prediction model is fine-tuned to predict degree of similarity between related inputs. The first prediction model may be trained on a first training set, while the second prediction model may be trained on a second training set. The first and second training set may be constructed to specialize the first and second prediction models to their respective tasks.

The first prediction model may be applied to the inputs. When the first prediction model predicts inputs are not similar, the result may be returned as predicted similarity 535. When the first prediction model predicts inputs are similar, the second prediction model may be applied to the inputs. Then, the results of the second prediction model may be returned as predicted similarity 535.

The first prediction model may be trained on a first training set wherein negative or non-similar training examples are from less related technologies. For example, the first training set may include a comparison between a text segment describing purchasing software and a text segment describing computer memory. In an embodiment, negative training examples in the first training set may be produced by matching a claim from a patent with a description paragraph from a random patent in a different patent classification. The first prediction model would have high accuracy in predicting when the inputs are likely to be unrelated but have lower accuracy when predicting inputs which are in the same technology area.

The second prediction model may be trained on a second training set wherein negative training examples are from more related technologies. For example, the second training set may include a comparison between a first text segment describing a first purchasing software with a first set of features and a second text segment describing a second purchasing software with a second set of features. The first and second set of features may be different such that the first and second text segments are not similar. In another example, the second training set may include a comparison between a third text segment describing a first feature of the first purchasing software such as user interface and a fourth text segment describing a second feature of the first purchasing software such as database storage. The first and second feature may be unrelated such that the third and fourth text segments are not similar. The second prediction model would have higher accuracy when discriminating between inputs which are in the same technology area but lower accuracy on inputs which are less related.

Figure 6A:
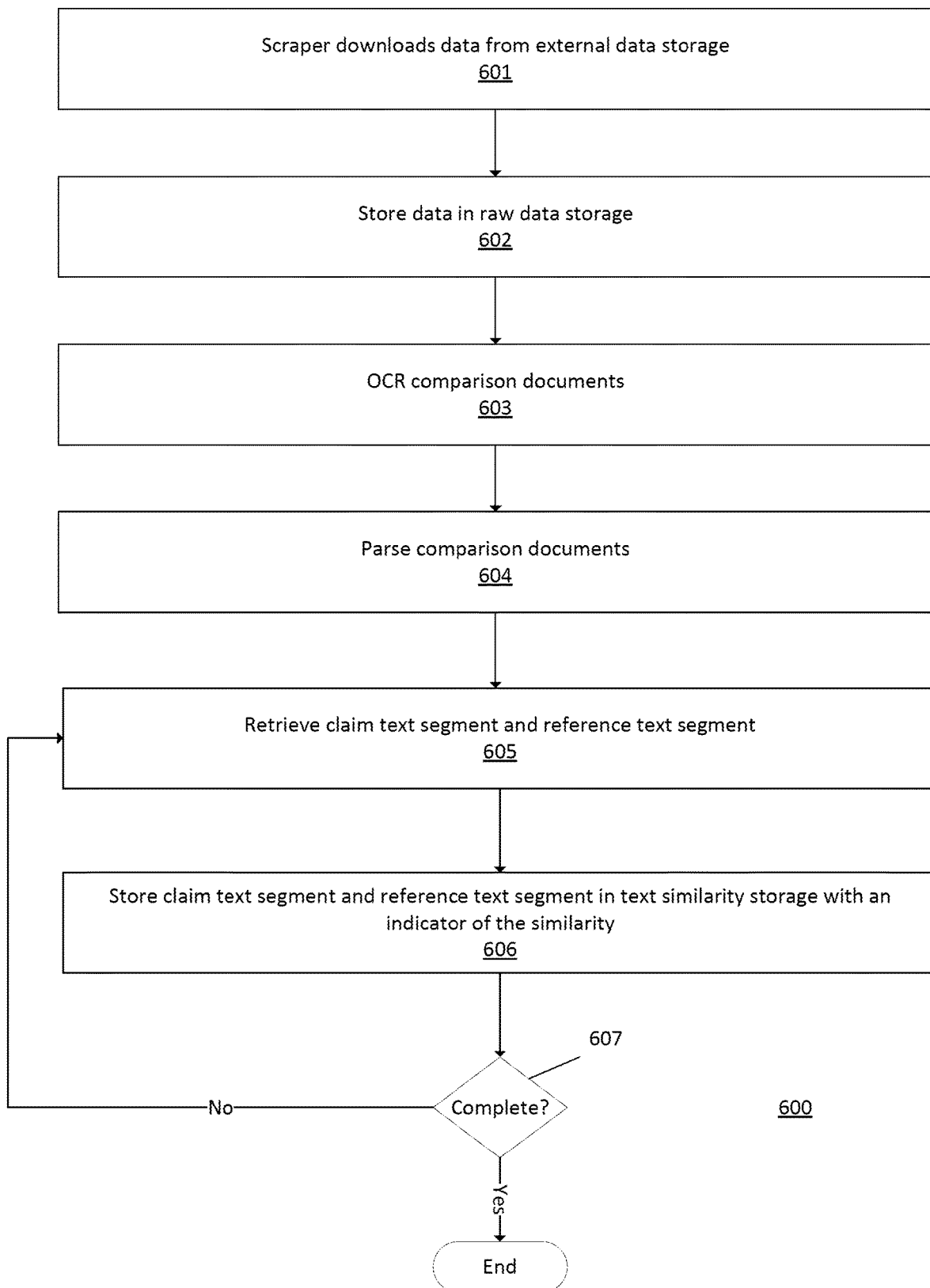
FIG. 6A illustrates an exemplary method for obtaining and preparing data for a search engine.

FIG. 6A illustrates an exemplary method 600 for obtaining and preparing data for the search engine, including for training the text similarity machine learning model 505.

In step 601, the scraper server 121 runs a scraper program to access the external data storage 111. The external data storage 111 may be, for example, a website, database, FTP server, or other data storage. In some embodiments, the external data storage 111 is storage of an external entity that is not operating the scraper program or search engine, and the scraping process comprises data collection for the search engine. In some embodiments, the external data storage 111 includes data from the U.S. Patent & Trademark Office (USPTO). For example, the external data storage 111 may be the Patent Application Information Retrieval (PAIR) system of the USPTO. In some embodiments, data being scraped may comprise patents and patent applications and also the file histories of patent applications, including office actions. In some embodiments, the data being scraped may comprise non-patent literature such as scientific articles, magazine articles, websites, images, video, and other reference documents.

In step 602, the scraper server 121 may store the data in raw data storage 122. In one embodiment, the scraper server 121 stores the data as-is without transforming it with processing. In one embodiment, the data retrieved by the scraper server 121 comprises comparison documents, where the comparison documents comprise office actions. In one embodiment, the data retrieved by the scraper server 121 also includes the text of documents, such as patents, patent applications, patent publications, scientific articles, magazine articles, and websites, such are stored as reference documents and associated text segments in document storage 124.

In step 603, OCR may optionally be performed on the comparison documents, such as office actions, stored in raw data storage 122. OCR may be used where the comparison documents are not in a computer-readable format, such as in non-OCRed PDFs (Portable Document Format). If the downloaded comparison documents or other data are already in a computer-readable form, then OCR step 603 may be skipped.

In step 604, the comparison documents, such as office actions, are parsed. The text of some of the office actions may include rejections for lack of novelty or obviousness. When these rejections are present, the office actions may include the text of the claims of the patent application and a citation to text of a reference document that the patent examiner considered to disclose (anticipate or render obvious) the same or a similar concept to the text of the claim. As shown in FIGS. 7A-D, this may be present in the office action by having a text segment of a claim (for example, text 731, 732) followed by a citation to a reference (for example, text 733, 734) that is delimited by characters, such as by open and closed parentheses. The parser parses the text of these pairs including the claim text segment and the corresponding citation. The citation enclosed by, for example, parentheses does not necessarily include an identifier of the reference document, but the reference document identity can be determined from elsewhere in the office action, for example the reference most recently referred to prior to the citation (for example, text 735). Therefore, the parser may access the citations and identifiers for the reference documents that they come from.

The text parsed from the comparison documents may be modified to remove irregularities or improve training performance. For example, irregularities such as non-ASCII characters may be removed or replaced with placeholder characters and common errors from OCR such as confusion between lower-case letter and the number '1' may be corrected. In another example, in order to optimize training performance, a spell-checking algorithm may be applied, or text which is too short or too long for optimal training may be removed, expanded, or trimmed.

Comparison documents other than office actions may be parsed. Claim charts and freedom to operate or patentability search reports may be parsed based on common formats such as recognizing a two-column table wherein one column contains a text segment of a claim and another column contains a text segment of a reference or a citation to text of a reference document. Databases or other repositories containing similarity pairs may be parsed by retrieving data from columns corresponding to the claim text segment and reference text segment.

In step 605, the parser uses the identifiers of the reference document and citations to retrieve text corresponding to the citation from the document storage 124. In some embodiments, the document storage 124 is a queryable database that accepts as input a citation and identifier of a reference and returns the text that is present at the cited portion of the reference. For example, the reference information may be used to index reference ID field 222 and document ID fields 221, 214 and the citation may be used to index into the location field 215, which may allow retrieving one or more text segments from stored text segment table 210.

Reference documents may be, for example, patents, patent application publications, or non-patent literature. Citations to patents may comprise line and column numbers. Citations to patent application publications may comprise paragraph numbers. Citations to non-patent literature may comprise page and paragraph identifiers.

In step 606, after retrieving the text from the document storage 124, the parser stores the claim text segment together with the text segment of the reference document (from document storage 124) in the text similarity storage 123 and an indicator that these two portions of text are similar. For example, the claim text segment may be used to populate first text field 232 and a pre-processed and encoded version of the claim text segment may stored in first encoding field 233. The reference text segment may be stored in second text field 234 and a pre-processed and encoded version may be stored in second encoding field 235. A similarity label may be stored in similarity field 237. In some embodiments, the value 1 may be stored in similarity field 237 to indicate that the text segments are similar. Other values may be used in other embodiments.

In some embodiments, the text portions themselves need not be stored and instead only identifiers are stored, which link to other locations where the text portions themselves are stored, such as in document storage 124 including stored text segment table 210. In step 607, the process may be repeated for each of the pairs of claim text segment and citation that are found in the office action.

In some embodiments, rather than a citation being provided for the claim text segment, the office action may include a quote from a reference document or other text. For example, this may occur if the patent examiner decides to directly insert a quote from the reference document rather than provide a citation. In this case, the portion of text from the reference document may not need to be retrieved from document storage 124 based on the citation. The quoted text from the office action may be directly used as the reference text segment, and this reference text segment may be stored with the claim text segment in the text similarity storage 123 with an indicator that the two portions of text are similar.

In some embodiments, a human-in-the-loop system may be used, wherein one or more human reviewers may manually review and annotate at least a portion of the claim text segment, reference text segment, and similarity label collected from the comparison documents in order to create the text similarity storage 123. For example, the human reviewers may review the text segments to confirm whether the similarity label is correct. In another example, the human reviewers may review the text segments to confirm the captured text is correct and free of spelling, formatting, or other errors. When the human reviewers indicate an error, a correction may be issued or the error may be flagged for further review. In an embodiment, errors flagged by human reviewers may be saved and used as input for further machine learning models such as an automatic error detection model.

Method 600 generally creates positive examples of similar text segments based on comparison documents, such as office actions. Negative similarity examples may also be created. A claim text segment may be selected and a reference text segment of a reference document that is believed to not be similar may be selected. The reference text segment may be chosen by randomly selecting a text segment in a random reference document, or it may be chosen by randomly selecting a text segment that was not cited in an office action for the particular claim text segment even though other text segments from the same reference document were cited for that claim text (for example, this would make sense if it is assumed that the examiner cited the most relevant parts of the reference and that parts that were not cited are not relevant to the claim). Additional methods of finding negative examples may also be performed. For each negative example, the two text segments may be stored in the text similarity storage 123 with an indicator that they are not similar. In this way, a training data set of negative examples may be added to the overall training set.

In some embodiments, two sets of negative similarity examples may be created. Far negatives or negative-different examples may comprise examples wherein the claim text segment and reference text segment are from different technology areas such as different patent classifications. For example, a claim text segment from a patent on airplanes and a reference text segment from a patent on shopping carts may be a negative-different example. Negative-different examples may also be formed from text of technology areas which are tangentially related. For example, a claim text segment from a patent on purchasing software and a reference text segment from a patent on computer memory may be a negative-different example.

Close negatives or negative-same examples may comprise examples where in the claim text segment and reference text segment are from the same or similar technology areas such as the same patent classification. For example, a claim text segment describing a purchasing software with a first set of features and a reference text segment describing a purchasing software with a second set of features wherein the first set and second set of features are not similar may be a negative-same example. In another example, a claim text segment describing a first feature of a software program such as user interface and a reference text segment describing a second feature of a software program such as database storage wherein the first and second features are not similar may be a negative-same example.

In an embodiment, negative similarity examples may be generated then classified as negative-different or negative-same. In another embodiment, separate processes may be used to generate negative-different and negative-same examples.

Figure 6B:
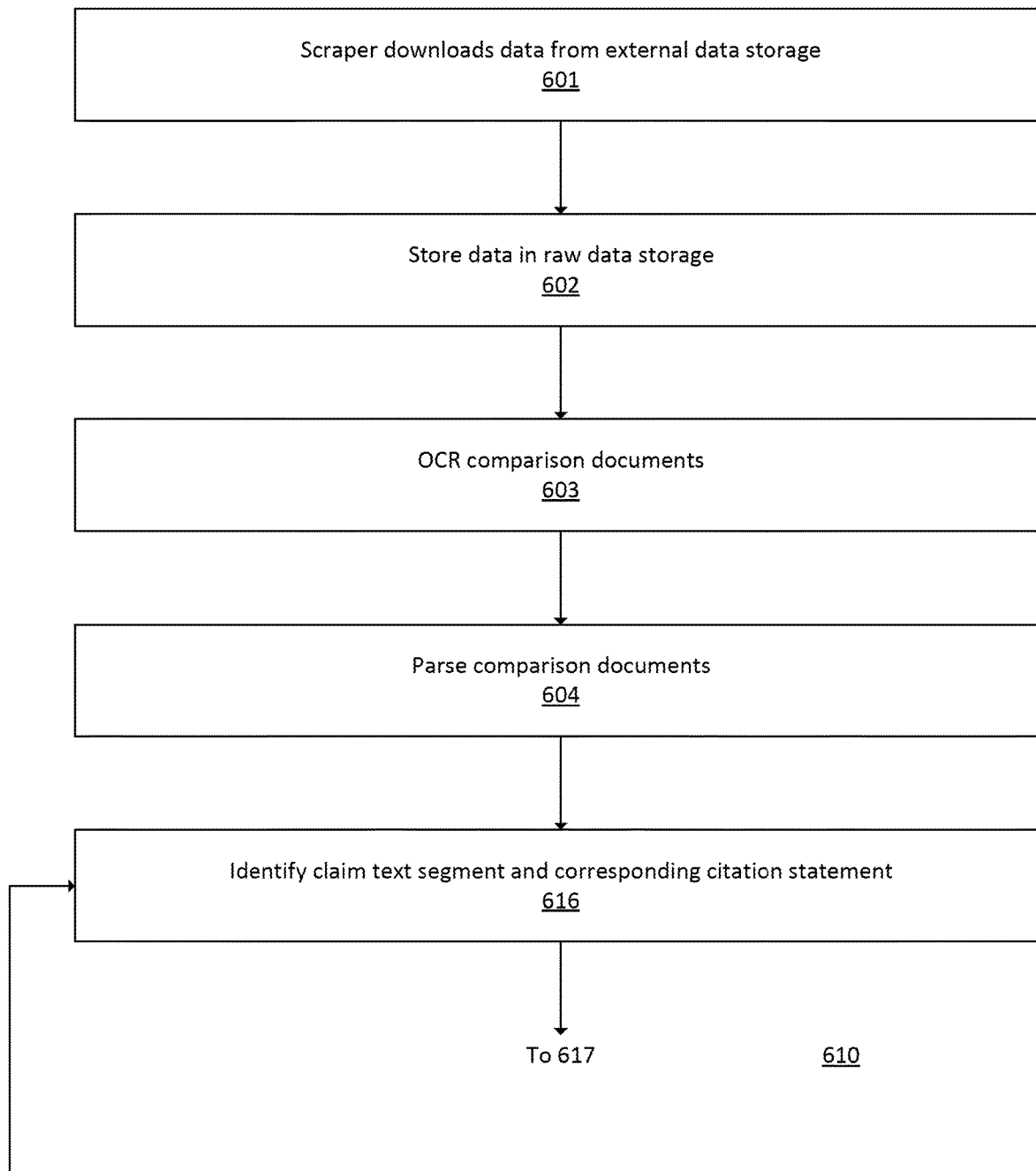
FIGS. 6B-6C illustrate another exemplary method for obtaining and preparing data for a search engine.
Figure 6C:
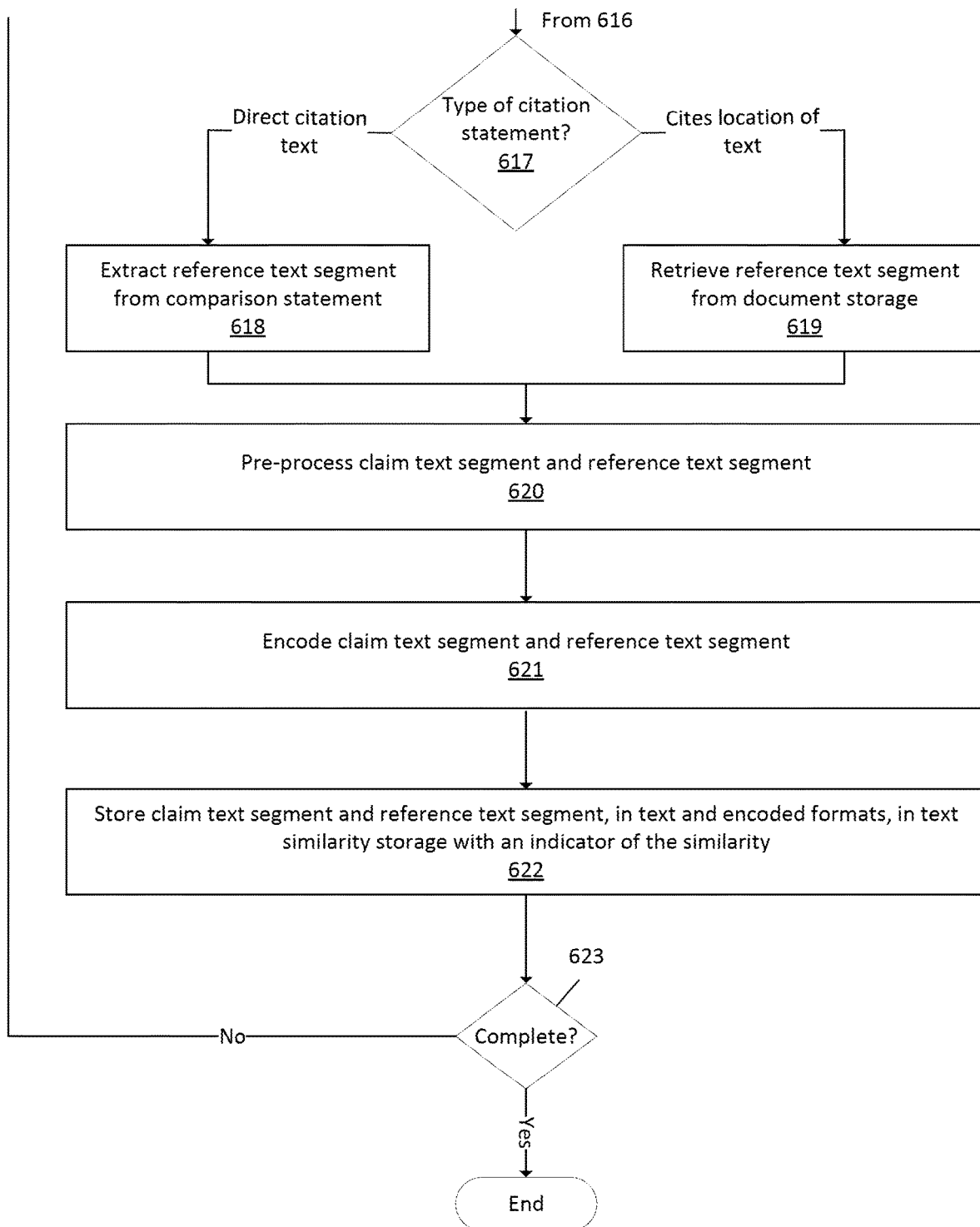

FIGS. 6B-C illustrate an exemplary method 610 for obtaining and preparing data for the search engine, including for training the text similarity machine learning model 505.

Steps 601-604 are performed as in method 600. During the parsing step 604, performed by a parser computer program, various pieces of information in the comparison document are identified and tracked. Rejection heading sections 701 may be identified, by the parser, that identify an overall rejection type that is being applied in the office action in that section. For example, the rejection heading section may identify a novelty or obviousness rejection type or other rejection type such as for enablement or written description (35 U.S.C. § 112) or patent eligibility (35 U.S.C. § 101). In an embodiment, the parser may identify the novelty and obviousness rejection sections and enter a detailed parsing mode to perform more detailed parsing in those sections to identify and extract text similarity pairs. Outside of those sections, the parser may operate in a high-level parsing mode where text similarity pairs are not extracted.

In some embodiments, the parser may ignore sections that are not novelty or obviousness rejections by passing over them without performing processing. For example, the parser may choose not to extract any text similarity pairs from sections that are not novelty or obviousness rejection sections.

After rejection heading section 701, the parser may parse and identify a claim set rejection segment 702. From the claim set rejection segment 702, the parser may identify a set of one or more claims being rejected 703, a reason for rejection 704, and reference information 705, 706 that names one or more reference documents that are being applied in the rejection. The reference information 705, 706 may include a reference identifier for the document, such as a patent number, patent publication number, patent application number, citation, title, or other identifying information and a short name by which the office action refers to the reference document (such as "Pinkus" for US 2013/0061044 based on reference information 705 and "Minami" for JP 2002-099983 based on reference information 706). In some embodiments, the reference identifier may be used to index into the document storage 124, such as stored reference table 220. The reference information may also include other information such as the names of the authors or inventors of the reference document.

The parser may create a data structure associating the reference short names to the reference identifier and other bibliographic information of the reference. For example, the data structure may be indexed by the short name and return the reference identifier and, optionally, other bibliographic information. This allows the parser to identify the full reference information when it processes the remaining text of the office action, where only the short name may be present. The data structure may be, for example, a database, hash, tree, dictionary, index, table, or other data structure.

In step 616, the parser may identify in the comparison document text a claim text segment and corresponding citation statement, which together comprise a comparison statement. The comparison statement compares the claim text segment and corresponding citation statement and identifies that they are similar or dissimilar. In office actions, claim text segments and corresponding citation statements may be identified by claim text followed by a parenthetical, where the text in the parenthetical is the citation statement associated with the preceding claim text. The parenthetical may be delimited by an opening and closing parenthesis. In an office action, this may denote that the claim text segment and corresponding citation statement are similar. For example, claim text segment 711 and citation statement 712 may comprise a first comparison statement. Additional comparison statements may comprise, for example, claim text segment 713 and citation statement 714; claim text segment 715 and citation statement 716; claim text segment 717 and citation statement 718; claim text segment 719 and citation statement 720; and claim text segment 721 and citation statement 722. The parser may extract the identified claim text segment and citation statement. In step 617, the parser may determine how to obtain the reference text segment based on the type of citation statement that has been identified. The parser may analyze the citation statement using one or more text patterns, where a first set of one or more text patterns corresponds to a direct quote and a second set of one or more text patterns corresponds to a citation to a location. In this disclosure, a text pattern may be, for example, a regular expression. When the parser determines that the citation statement matches a direct quote text pattern then it may proceed to step 618. When the parser determines that the citation statement matches a citation to a location text pattern then it may proceed to step 619. Some citation statements may include both a direct quote and a location (e.g., "The heart rate monitor includes a sensor, ¶26."), in which case the direct quote portion may be processed according to step 618 and the location portion may be processed according to step 619.

When the citation statement includes a direct quote of text, then the direct quote itself may be extracted from the citation statement as the reference text segment (step 618). When the citation statement includes a citation to the location of the text, then the text segment may be retrieved from the document storage 124 (step 619). In step 619, the parser identifies from the citation statement a text segment location, such as a paragraph number, column and line number, or page number. In addition, the parser may track and store a current reference referred to in the office action by storing a current reference variable. For example, in claim text segment 711 the parser may identify the text "Pinkus" as a short name for a reference based on looking up the text "Pinkus" in a data structure storing all of the references (as described above) by their short name. The parser may set the value of the current reference variable to Pinkus. Until the current reference is changed, the parser may assume that further citations, for example, in citation statements 712, 714, 716, and 718 all refer to locations in Pinkus.

However, the current reference variable is changed when the parser identifies a new short name during its parse, such as Minami in the claim text segment 719. Upon reading the text "Minami," the parser may change the current reference variable to Minami and citations encountered after this change will be presumed, by the parser, to refer to locations in Minami.

Returning to step 619, when the parser has identified a citation statement with a location identifier, it may retrieve the current reference variable. The current reference variable may include the reference identifier from the data structure of references in the parser described above. Alternatively, the short name of the current reference may be used to retrieve the reference identifier from the data structure of references in the parser. Thus, the parser obtains both location information and a reference identifier. Using these two items, the parser may index into the document storage 124 to retrieve a reference text segment.

For example, the parser may index stored reference database table 220 based on reference ID field 222 and stored text segment database table 210 based on location field 215 to obtain the reference text segment. In an embodiment, these fields may be in different tables and may be joined on a field such as document ID fields 214, 221 to allow look up across the two tables. Alternatively, the document ID field 221 may be looked up based on the reference identifier, in an intermediate step, and used to index into stored text segment database table 210.

After steps 618, 619, the parser has obtained a citation text segment and reference text segment. In step 620, the parser may pre-process the citation text segment and reference text segment. The same pre-processing may be performed as described in step 502. In step 621, the claim text segment and reference text segment may be encoded using an encoding algorithm. If the reference text segment is already stored in a pre-processed and encoded form, such as in stored text segment table 210 of document storage 124, then the encoded form may be retrieved from document storage 124 and pre-processing and encoding need not be performed on the reference text segment.

In step 622, the claim text segment and reference text segment may be stored, in both text and encoded formats, in the text similarity storage 123 with an indicator of their similarity. In step 623, it is determined whether the process is complete and all comparison statements of the comparison document have been identified and processed. If so, then the process may end. If not, then the process may repeat at step 616.

The parser may also identify from comparison document 700 negative training examples. During the parsing of the document 700, the parser may identify and parse negative disclosure statement 740. The parser may identify the negative disclosure statement by text matching, regular expressions, machine learning, or other methods. These methods may be applied to identify the negative disclosure statement based on, for example, the text pattern "[reference] does not clearly disclose that" and other similar text patterns. The parser identifies the short name of the reference for which the statement 740 describes a lack of disclosure ("Pinkus"). Moreover, the parser also identifies a claim text segment that the statement 740 says is lacking from the reference ("vehicle drives to a newly selected waiting location that is within the scope of a rain event received from a server.").

Based on the aforementioned, the parser may determine that the office action is stating that the reference does not disclose the claim text segment. The parser may generate negative training examples based on the observation that Pinkus does not disclose the claim text segment. In one embodiment, the parser may retrieve all stored text segments of Pinkus from the document storage 124. In an embodiment, this is performed by obtaining the reference identifier of the Pinkus short name from the reference data structure and using the reference identifier to index into the stored reference database table 220. The stored reference database table 220 may be joined with the stored text segment database table 210 in order to retrieve all stored text segments from the Pinkus reference. The parser may then generate a plurality of negative training examples by creating a negative text similarity pair for each stored text segment of Pinkus and the claim text segment. The negative training examples may be negative-same, negative-different, or a combination. Each of these negative training examples may be stored in the text similarity storage 123 with similarity labels indicating that the text segment pairs are not similar.

In some embodiments, the human-in-the-loop system described in step 606 may be used in step 622, either before or after storing the claim text segment, reference text segment, and similarity indicator in text similarity storage 123.

FIGS. 7A-D illustrate an exemplary comparison document 700. In some embodiments, the comparison document 700 comprises an office action from a patent application file history. The elements of comparison document 700 have been described with respect to exemplary data scraping and parsing method 600.

Figure 8A:
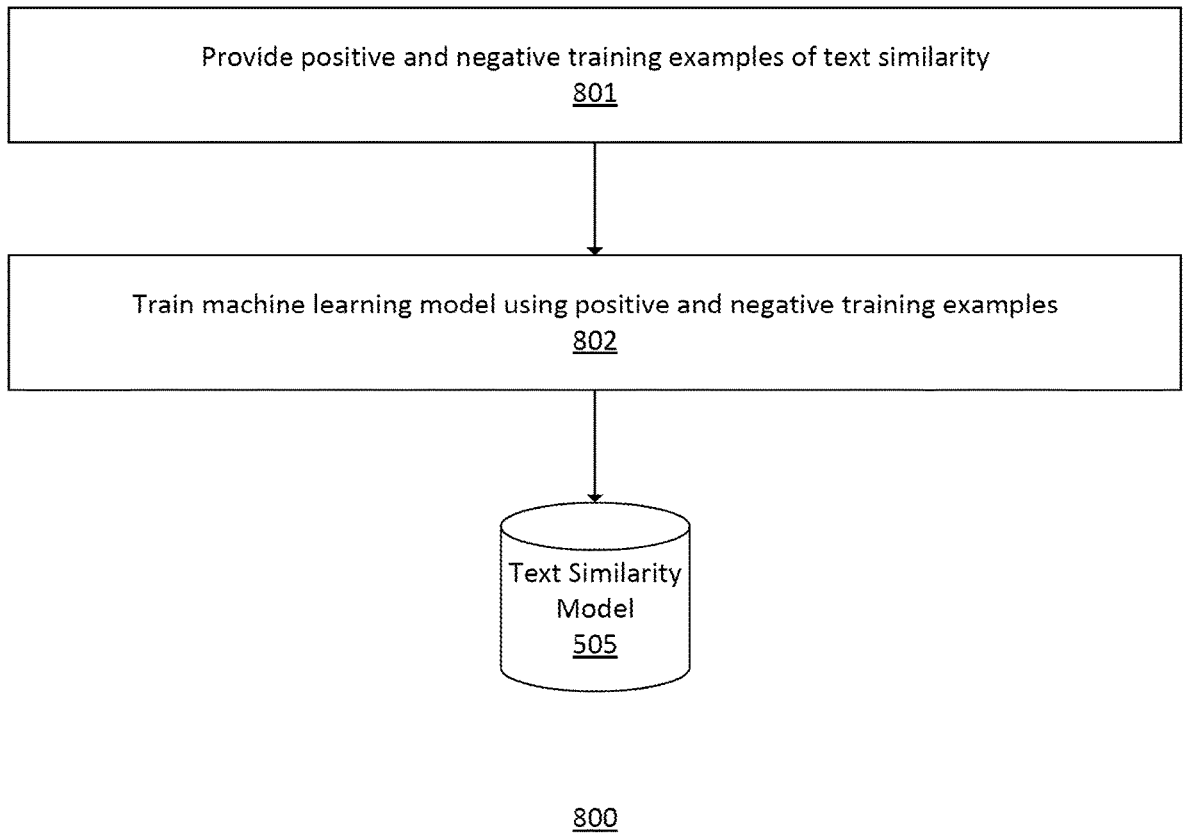
FIG. 8A illustrates an exemplary method for training a text similarity machine learning model.

FIG. 8A illustrates an exemplary method 800 for training the text similarity machine learning model 505.

In step 801, positive and negative training examples of text similarity are provided in text similarity storage 123.

In step 802, a machine learning model is trained on positive and negative examples.

In step 803, a trained machine learning model 505 is produced for performing text similarity.

Figure 8B:
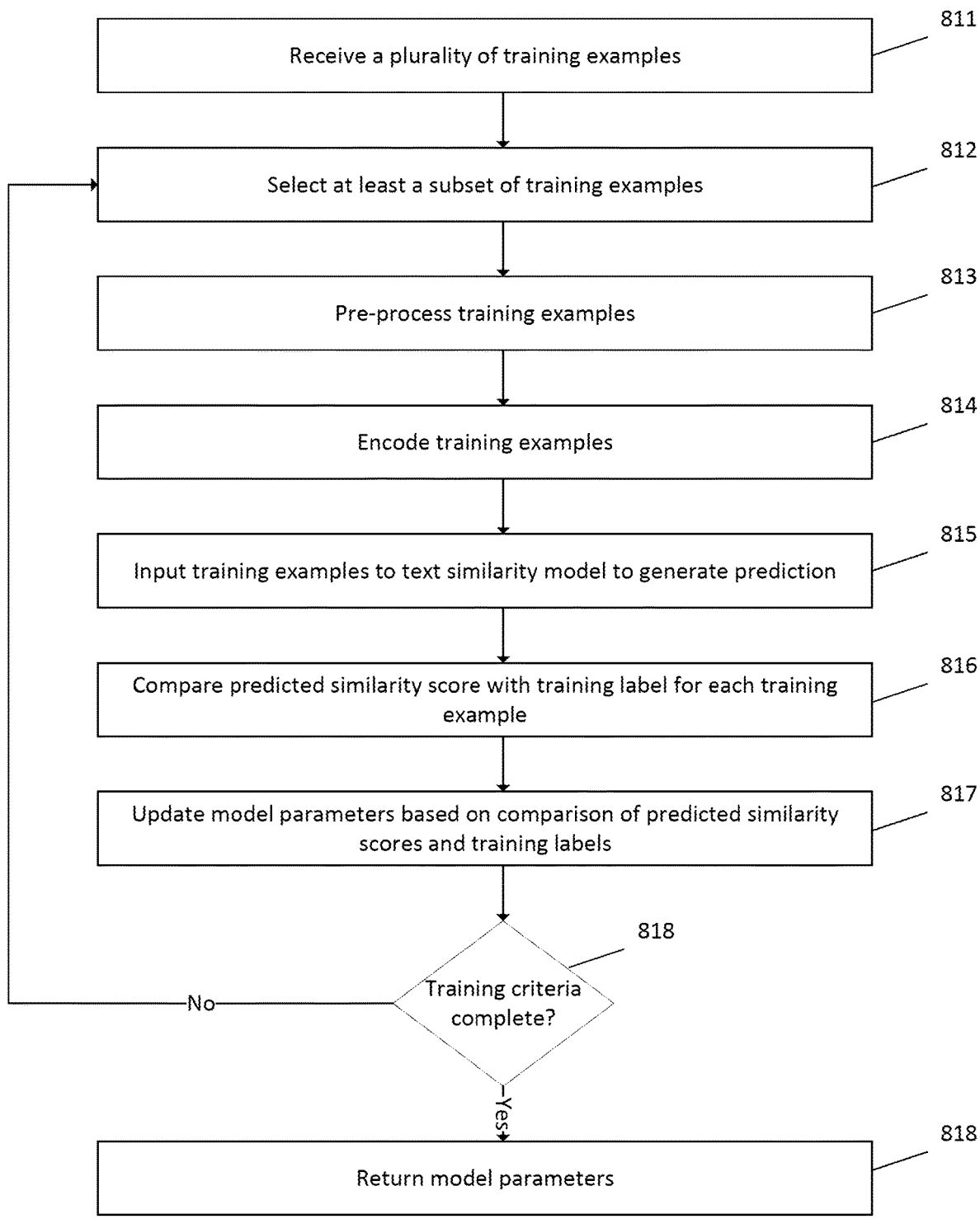
FIG. 8B illustrates another exemplary method for training a text similarity machine learning model.

FIG. 8B illustrates an exemplary method 810 for training the text similarity machine learning model.

In step 811, a plurality of training examples is received. In an embodiment, the training examples are text similarity pairs retrieved from text similarity storage 123. Each training example may comprise a first text segment, a second text segment, and a similarity label. The similarity label may comprise the training label representing the desired outcome of the training example. In some embodiments, the training examples are similarity pairs 238.

In step 812, at least a subset of the training examples is selected for training. In some embodiments, it may be preferable to use a subset of the training examples rather than all training examples. For example, it may be desired to balance the number of positive and training examples used. Moreover, it may be desired for the training algorithm to explore the space of training examples, which may be referred as the training space, to train the text similarity model 505 to the highest accuracy, and this may involve training on fewer than all of the training examples.

In some embodiments, the subset of training examples is selected as a mix of positive, negative-same, and negative-different examples. For example, the subset may comprise positive and negative-same examples, positive and negative-different examples, or positive, negative-same and negative-different examples. Varying the proportion of negative-same and negative-different examples in the training space may optimize the performance of text similarity model 505 for certain use cases or enable multiple versions of text similarity model 505 to be trained and ensembled to maximize overall accuracy.

In step 813, the training examples are optionally pre-processed. The pre-processing techniques described in step 502 may also be used here. In step 814, the training examples may optionally be encoded into feature representations.

In some embodiments, the training examples in text similarity storage 123 are already pre-processed and encoded, such as in similarity table 230. In these embodiments, the pre-processing step 813 and encoding step 814 may be skipped.

In step 815, the training examples may be input to the text similarity model to generate, for each training example, predictions of the similarity of the first text segment and second text segment of the training example. The result of the application of the text similarity model may comprise a text similarity score.

In step 816, for each training example, the predicted similarity score may be compared with the training label retrieved from the text similarity storage 123. In step 817, the parameters of the machine learning model may be updated based on the comparison of the predicted similarity score and the training label. The parameters of the machine learning model affect the behavior of the machine learning model and the predictions that it outputs. In step 818, it is determined whether a set of training criteria has been completed. If not, then training may continue at step 812. If so, then in step 818, the current parameters of the machine learning model may be returned. These parameters may represent the trained machine learning model.

As a result of training process 810, the behavior of the text similarity machine learning model 505 is affected and determined by the training examples that are provided. The text similarity machine learning model 505 learns a function for performing a regression or classification to generate a similarity score. The function is defined by the model parameters that are updated as a result of training and comparing the output of the machine learning model with the training label.

Because the behavior of the text similarity machine learning model 505 is determined by the training examples, the machine learning model 505 may be trained to learn a variety of functions. In one embodiment, the text similarity machine learning model 505 is trained, at least in part, based on comparison statements from office actions. The training examples may comprise a claim text segment and a reference text segment that are extracted from an office action that alleges that the claim text segment is disclosed by the reference text segment. Based on these training examples, the text similarity machine learning model 505 learns a function for determining when a first text segment is disclosed, for purposes of patent examination by the patent office, by the second text segment. The text similarity machine learning model 505 may return a prediction of "similar" when disclosure for patent law purposes is found and "not similar" when the first segment would not be considered to be disclosed by the second text segment for patent law purposes. This is a specific kind of text similarity, where what is being evaluated is disclosure for patent law purposes. For example, in some embodiments, if the first text segment is a subset of the second text segment then these text segments may be considered to be similar. In addition, in some embodiments, if the relationship between the second text segment and the first text segment is one of genus and species, where the second text segment discloses a more specific version of what is generally described in the first text segment, then again these may be considered to be similar. In general forms of text similarity, such as used in some text similarity datasets like SICK (Sentences Involving Compositional Knowledge) and GLUE (General Language Understanding Evaluation), two text segments may not be considered to be entirely similar if one is a strict subset of the other or the relationship is genus-species. When the training data set used is office action data, then the text similarity machine learning model may learn a specific type of text similarity matching that has not been used elsewhere in the art, and this type of text similarity matching may be referred to as "patent law disclosure similarity," "patent law similarity," or "novelty and obviousness similarity."

Figure 8C:
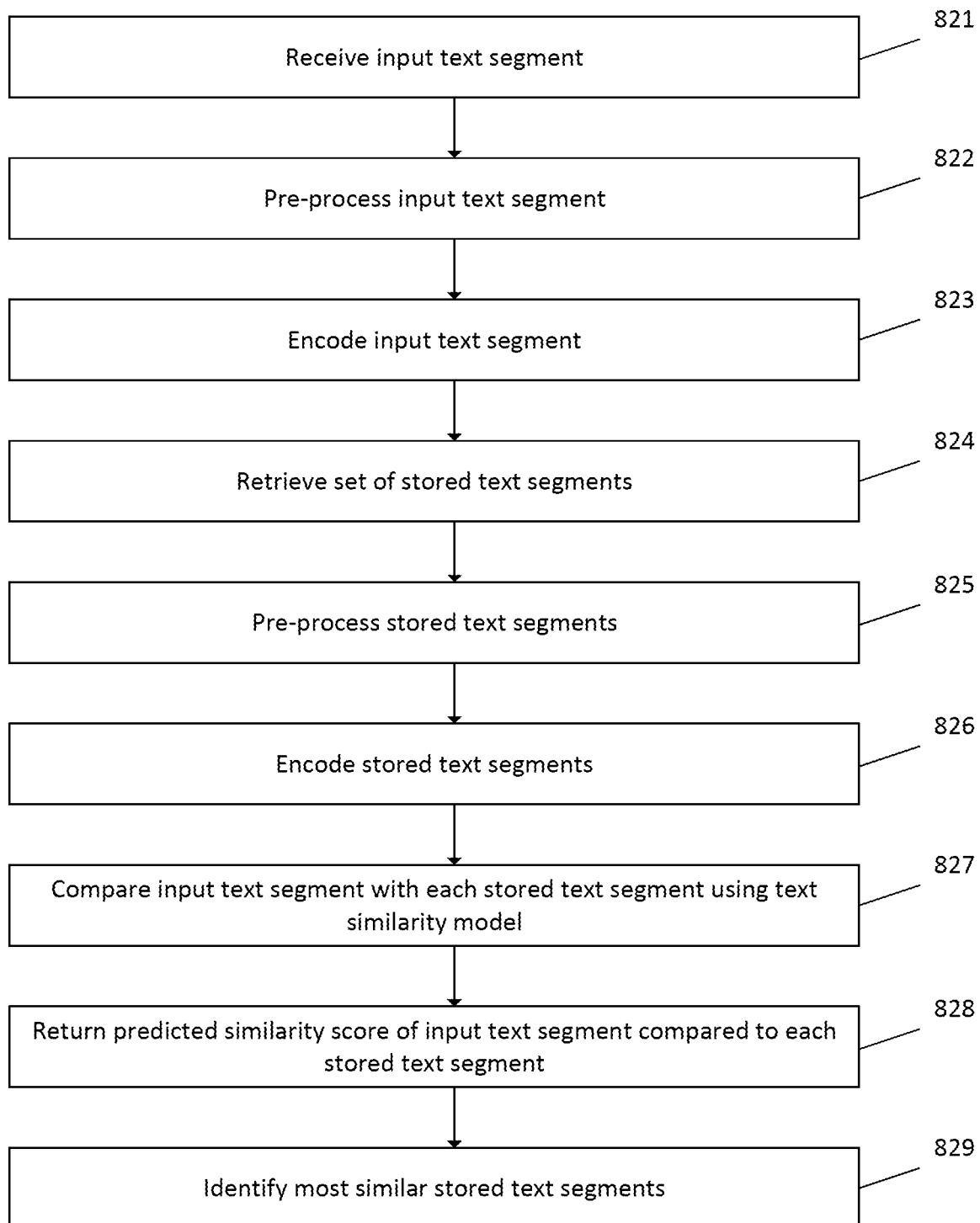
FIG. 8C illustrates an exemplary method for performing inference using a text similarity machine learning model.

FIG. 8C illustrates an exemplary method 820 for performing inference using the text similarity machine learning model 805. In step 821, an input text segment is received. In some embodiments, the input text segment may be obtained from splitting the input text block 400 in step 303 of methods 300, 310.

In step 822, the input text segment may be pre-processed. The pre-processing techniques described above in step 502 may be used here.

In step 823, the input text segment may be encoded into a feature representation.

In step 824, a set of stored text segments may be retrieved for performing comparison to the input text segment. In one embodiment, all of the stored text segments from document storage 124 may be retrieved and used for comparison. In other embodiments, only a subset of the stored text segments from document storage 124 may be retrieved and used for comparison.

In one embodiment, stored text segments are filtered based on the effective prior art date of the reference that the stored text segment comes from. The effective prior art date may be the priority date for patents, patent applications, and patent publications and may be a publication date or sale date for other non-patent prior art. In one embodiment, a prior art cut-off date is received as input. The document storage 124 is queried by the prior art cut-off date to retrieve stored text segments having a prior art date that is earlier than (or at least as early as) the prior art cut-off date. In one embodiment, the stored reference database table 220 is queried to identify references having a priority date or publication date earlier than (or at least as early as) the prior art cut-off date. For the references returned by the query, the stored text segment database table 210 is queried to retrieve all text segments of those references.

In one embodiment, stored text segments are filtered based on the category, such as technology field, of the reference that the stored text segment derives from. By filtering the text segments by category, the quality of results may be increased in some embodiments by limiting the potential outputs to references that are known to be in the same technology area. Moreover, filtering by category may also reducing the processing requirements and time needed for processing.

In one embodiment, the stored text segments may be retrieved based on patent classification codes. Patent classification systems include the international patent classification (IPC), cooperative patent classification (CPC), and United States Patent Classification (USPC) systems. Each of these systems have their own codes that are associated with specific areas of technology. In this embodiment, one or more input classifications codes are provided, representing the classification of the input text block 400 or its associated invention or patent. The input classification codes may be provided by a human user, may be generated by a deterministic algorithm, or may be generated by a machine learning model that is trained to perform classification. In the latter case, the machine learning model may be trained as a classifier by providing text blocks and training labels identifying the correct classification codes. By training on enough training examples, the classification machine learning model may learn the appropriate function to perform classification automatically. An input text block 400 may be input to the classification machine learning model, and it may predict one or more classification codes.

Based on the input classification codes, an algorithm may be used to determine a set of candidate classification codes to search. In one embodiment, the set of candidates classifications codes is identical to the input classification codes. In other words, the same classifications that the input text block 400 was classified into are also used for the search. In other embodiments, it may be desirable to search more broadly than just the identical classification codes of the input, since some classification codes may be narrow. Some patent classification systems are hierarchical, with more broad classes narrowing into narrower sub-classes over several levels. In an embodiment, the candidate classification codes are determined by starting with the input classification codes and moving up one or more levels in the classification hierarchy to more general classifications. By using more general classifications, a more comprehensive set of reference documents may be searched using the text similarity machine learning model 505.

In an embodiment, document storage 124 may include patent classification information for one or more of the stored text segments. Patent classification may comprise an identification of one or more classes in which the reference was categorized, where the reference is the document from which the text segments were extracted. The document storage 124 may be queried based on the candidate classification codes, to return a set of stored text segments in desired classifications.

In other embodiments, references, and their associated text segments, in the document storage 124 may be tagged with labels identifying their category, such as vehicles, memory, RAM, biologics, and so forth. These categories may be applied to non-patent literature as well. Upon receiving an input text segment, a set of candidate categories for search may be determined. The document storage 124 may then be queried based on the candidate categories to return all text segments from reference documents in those candidate categories.

In step 825, the stored text segments may optionally be pre-processed. The pre-processing techniques described above in step 502 may be used here.

In step 826, the stored text segments may optionally be encoded into feature representations.

In some embodiments, text segments stored in document storage 124 are already pre-processed and encoded, such as in the encoding field 213 of stored text segment database table 210. In these embodiments, the pre-processing step 825 and encoding step 826 may be skipped.

In step 827, the input text segment may be compared with each of the retrieved stored text segments using the text similarity model 505. In an embodiment, the comparison is performed by inputting the encoded input text segment and one of the encoded stored text segments into the text similarity model 505 to perform a pairwise comparison and output a similarity score. The comparison is performed pairwise to compare the input text segment with every stored text segment retrieved in step 824. The comparisons may be performed partly or completely in parallel to enable a fast processing time. In some embodiments, the parallel processing may be performed by a GPU (Graphics Processing Unit).

In step 828, the predicted similarity scores may be returned for the input text segment compared to each stored text segment.

In step 829, the most similar stored text segments may be identified. In some embodiments, the stored text segments may be ranked based on similarity to the input text segment. In some embodiments, a threshold is applied to eliminate stored text segments with a similarity score below a threshold or below a specified rank to reduce memory and processing requirements.

Figure 9:
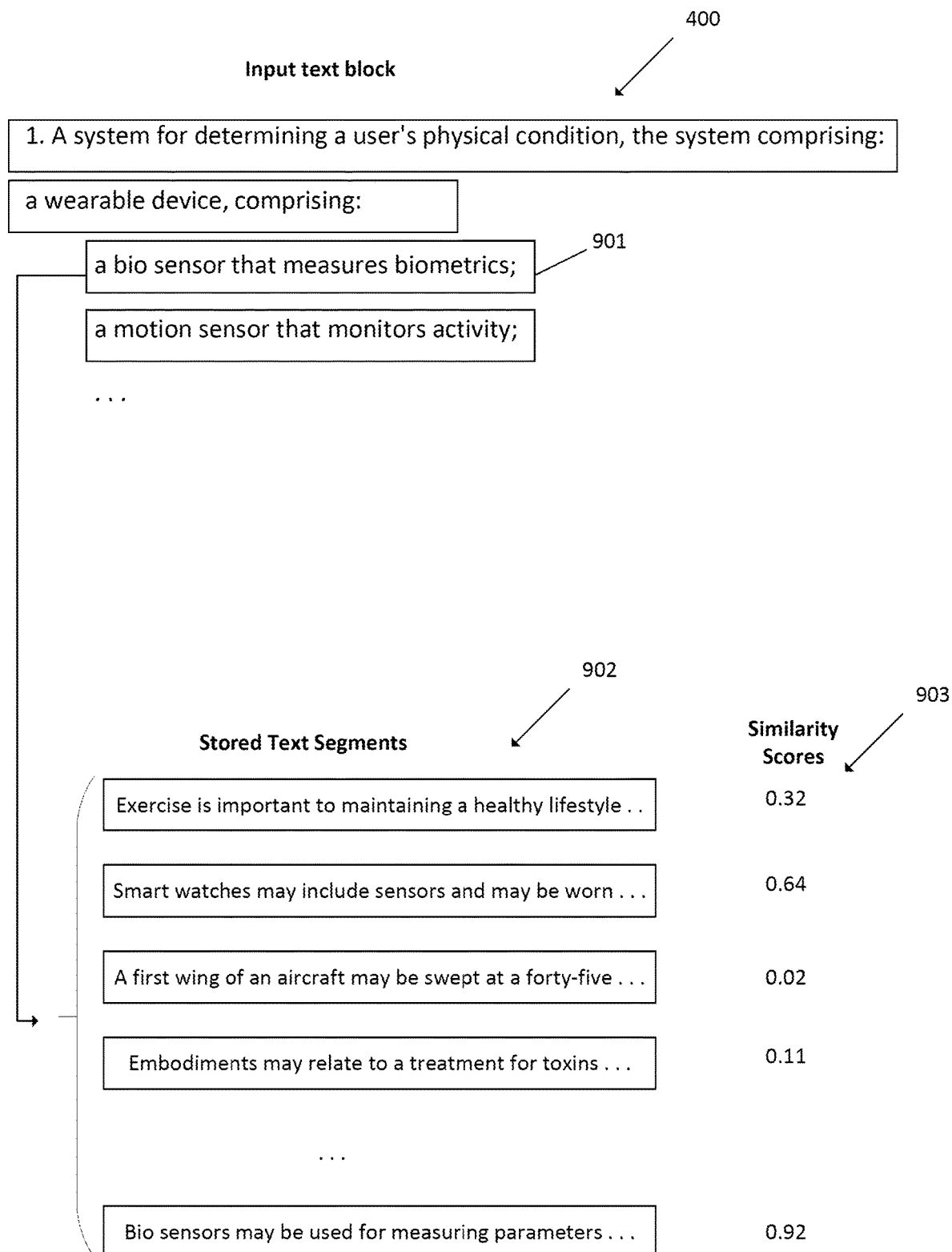
FIG. 9 illustrates an exemplary method by which input text segments from an input text block are compared to stored text segments.

FIG. 9 illustrates an exemplary method by which input text segments from input text block 400 are compared to stored text segments from document storage 124. As shown, the input text block 400 is split into input text segments as described in step 303.

Method 820 may be performed for each input text segment of the input text block 400 to identify the most similar stored text segments. In the illustrated embodiment, text segment 901 is one of the input text segments extracted from text block 400. Stored text segments 902 are retrieved from the document storage 124 in step 824. Input text segment 901 is then compared against all of the stored text segments 902 in parallel, using the text similarity model 505, to produce similarity scores 903 that measure the similarity between input text segment 901 and each of the stored text segments 902. In this illustration, the similarity scores are values between 0 and 1, where values closer to 1 indicate more similar and values closer to 0 indicate less similar.

The process for identifying similar stored text segments may also be performed for all other input text segments of the input text block 400. In one embodiment, all or some of the input text segments are processed in parallel to identify their similar stored text segments. For example, the method 820 may be performed on all or some of the input text segments in parallel. It is not required to wait for one input text segment to complete (or even begin) text similarity processing to perform text similarity processing on the other input text segments. In some embodiments, the parallel processing may be performed by a GPU (Graphics Processing Unit).

Figure 10A:
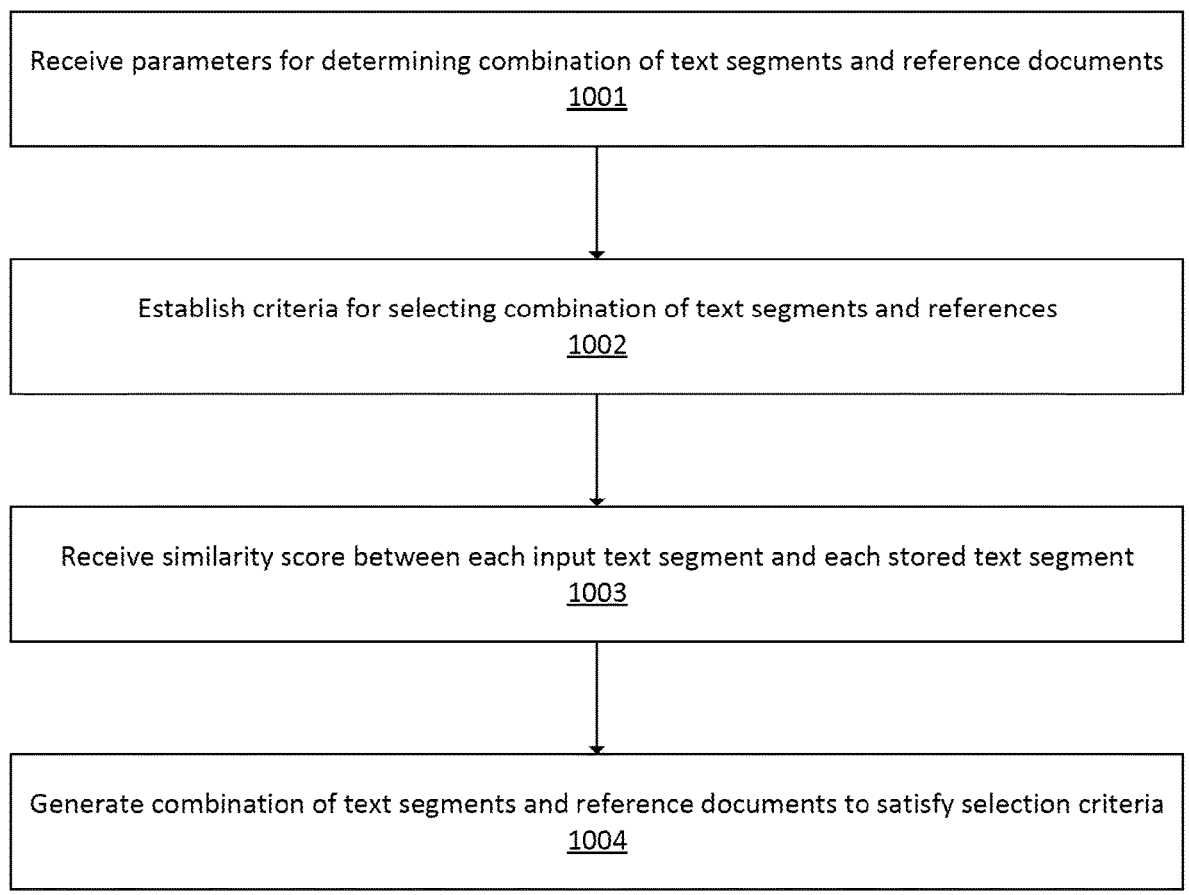
FIG. 10A illustrates an exemplary method for generating a combination of stored text segments, and associated references, that are similar to one or more input text segments of an input text block.

FIG. 10A illustrates an exemplary method 1000 for generating a combination of stored text segments, and associated references, that are similar to the input text segments of the input text block. Method 1000 may be used in step 305, for example.

Methods herein have been described for identifying the most similar stored text segments for a sequence of input text segments and determining similarity scores for each stored text segment. For a patent law invalidity or rejection argument, it is often desirable to use fewer reference documents to support the rejection. An invalidity or rejection argument based on a single reference can be a novelty, which is ideal in some circumstances, or single reference obviousness argument. Even for multi-reference obviousness arguments, it is often preferable to use fewer rather than more references.

In an embodiment directed to identifying stored text segments that, in combination, disclose a patent claim, it may be desirable to select stored text segments so that they tend to come from the same reference document or small number of reference documents. In this manner, a stored text segment may be found that is similar to each of the input text segments, but the stored text segments used in the combination come from a relatively small number of reference documents. This may be more desirable than simply choosing the most similar stored text segment for each input text segment, which could lead to a combination comprising a stored text segment from a different reference document for every input text segment and the number of reference documents used would equal the number of input text segments.

Method 1000 may be used to balance the selection of high-quality matches for each input text segment, so that a stored text segment with a high similarity score is chosen for each input text segment, with the desire for the stored text segments to come from a single or relatively smaller number of reference documents. In some embodiments, the combination generation algorithm used in method 1000 is an optimization algorithm that optimizes across two or more variables, where for example one of the variables is the text similarity scores for the individual input text segments and another is the number of reference documents used.

In step 1001, optionally, parameters may be received from a user to customize the operation of the combination generation algorithm. One parameter may be a similarity threshold that must be met or exceeded for two text segments to be considered similar. One parameter may be the number of references, or maximum number of references, that may be used in the combination. One parameter may be the type of references that may be used, such as patents, patent publications, patent applications, non-patent literature, scientific articles, magazine articles, websites, foreign or non-foreign references, references that are translated or are not translated, references in English or not in English, and so on.

In step 1002, the combination generation algorithm may establish selection criteria for selecting the combination of text segments and associated reference documents. Criteria may be required criteria, which are criteria that must be met for a combination to be a valid output of the algorithm, and scoring criteria, which are criteria for ranking the combinations that meet the required criteria. Some criteria may be directly provided from the user parameters received in step 1001, such as, for example, required criteria of the similarity threshold that must be achieved or number of references that are used. Other criteria may be automatically determined by the algorithm, retrieved based on stored values, or retrieved from prior configurations.

Required criteria may comprise, for example, a similarity threshold that must be met or exceeded for two text segments to be considered similar; a number of references, or maximum number of references, that may be used in the combination; or the type of references that may be used in the combination. In some embodiments, separate similarity thresholds may be used for different input text segments, so that some input text segments must be matched with a higher degree of similarity than others. These specific similarity thresholds for particular input text segments may be received as user input. Each similarity threshold may be a value, such as between 0 and 1.

Scoring criteria may comprise one or more scoring functions for determining how to rank combinations meeting the required criteria. In some embodiments, a scoring criteria may be summing up the text similarity scores of each of the input text segment and stored text segment pairs in the combination. In some embodiments, the text similarity scores may be weighted to give more precedence to some input text segments over others, and the operation thus becomes a linear combination of the text similarity scores with a coefficient per text similarity score. In some embodiments, the coefficients are associated with a particular input text segment, and the text similarity scores for that text segment are multiplied by the coefficient in a linear combination. Higher scoring combinations may be ranked more highly than lower scoring combinations.

In step 1003, a similarity score between each input text segment and a plurality of stored text segments in document storage 124 may be provided by the text similarity machine learning model. These similarity scores may be provided through operation of method 820 as performed on each input text segment.

In step 1004, combination generation algorithm may be performed. The combination generation algorithm may be an optimization algorithm that optimizes across a plurality of variables. The combination generation algorithm may determine a set of matching stored texts segments from the document storage and associated reference documents that satisfy the selection criteria. In an embodiment, the combination generation algorithm may generate a plurality of combinations that satisfy the required criteria to create a set of candidate combinations. The candidate combinations may then be scored based on the scoring criteria so that a highest scoring candidate combination is selected as the final combination. In some embodiments, multiple candidate combinations may be output rather than selecting a single combination for output, in order to provide more options to the user.

FIG. 10B illustrates the exemplary operation of combination generation algorithm 1000. Input text block 400 is split into a plurality of input text segments in step 303. The input text segments are compared to a plurality of stored text segments in the document storage 124 using the text similarity machine learning model 505, such as by application of method 820.

For text segment 1011, a plurality of stored text segments are retrieved and compared against the text segment 1011. A set of candidate of text segments 1013 are identified that may be used for matching against input text segment 1011. In some embodiments, the set of candidates may include all the text segments that were compared. In other embodiments, the set of candidates may be reduced, such as by requiring a threshold level of similarity or only choosing candidates above a threshold rank when the candidates are ranked by similarity score. The candidate text segments are illustrated with their reference document 1015, text 1016, and similarity score 1017. Similarly, for text segment 1012, a set of candidate text segments 1014 is identified.

The combination generation algorithm may select among the candidate text segments by balancing the desire for high similarity scores in the matched text segments and the desire for having fewer reference documents. The combination generation algorithm may perform these trade-offs according to the required criteria and scoring criteria.

In the exemplary candidate text segment sets 1013, 1014, the highest ranking text segment in candidate set 1013 comes from Smith and the highest ranking text segments in candidate set 1014 come from Black and Maya. However, in the example, each of these references only appears once and does not overlap with the other candidate set. A text segment from Jones appears in both candidate sets with similarity scores of 0.85 and 0.87, which may be high enough in some embodiments. In some embodiments, it may be desirable to select the text segments from Jones as the match for input segments 1011, 1012 since the similarity scores may exceed a threshold score needed and the single reference is able to cover multiple input segments. In other embodiments, there may be other criteria that would not make Jones the best choice. For example, some embodiments may include criteria requiring higher similarity scores or requiring that the highest similarity score possible be chosen.

Figure 10C:
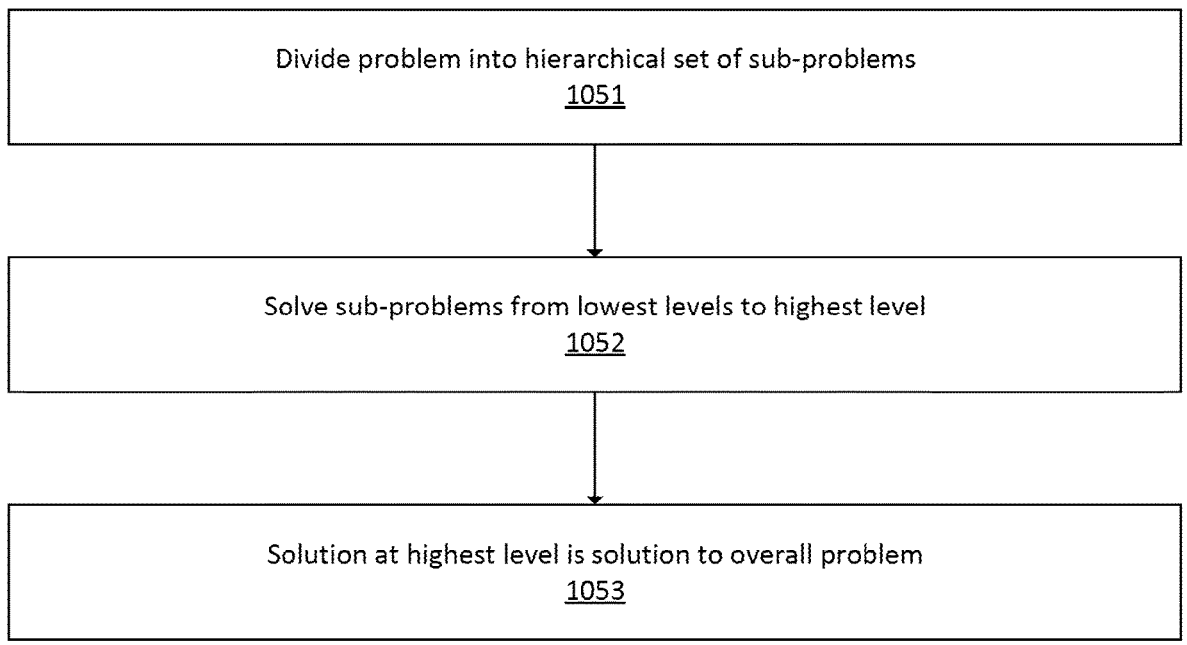
FIG. 10C illustrates an exemplary method for combination generation using dynamic programming.

FIG. 10C illustrates an exemplary method 1050 for combination generation using dynamic programming. Dynamic programming in this context refers to a method of solving a complex problem by breaking it down into a collection of simpler subproblems, solving each of those subproblems just once and storing their solutions in an indexable data structure. Some of these solutions are then retrieved from the data structure to solve the overall problem.

Method 1050 may be used to perform step 1004 and generate a combination of text segments and references documents to satisfy selection criteria.

In step 1051, the overall problem of selecting a combination of text segments and reference documents to satisfy selection criteria may be divided into a hierarchical set of sub-problems. In an embodiment, the sub-problems may correspond to sub-sets of the input text segments and selecting a combination of text segments and reference documents to satisfy a set of sub-selection criteria. These sub-problems may be easier to solve than the overall problem because fewer than all of the input text segments may be involved and the sub-selection criteria may optionally be easier to satisfy than the overall selection criteria. The sub-problems may be organized into levels where lower levels are easier to solve.

In step 1052, the combination generation algorithm solves the sub-problems from the lowest levels to the highest levels. It may retrieve and use the solutions from sub-problems at lower levels to help solve sub-problems at higher levels.

In step 1053, the solution at the highest level may be a solution of the overall problem. The program may end at step 1053 having solved the desired problem.

Figure 10D:
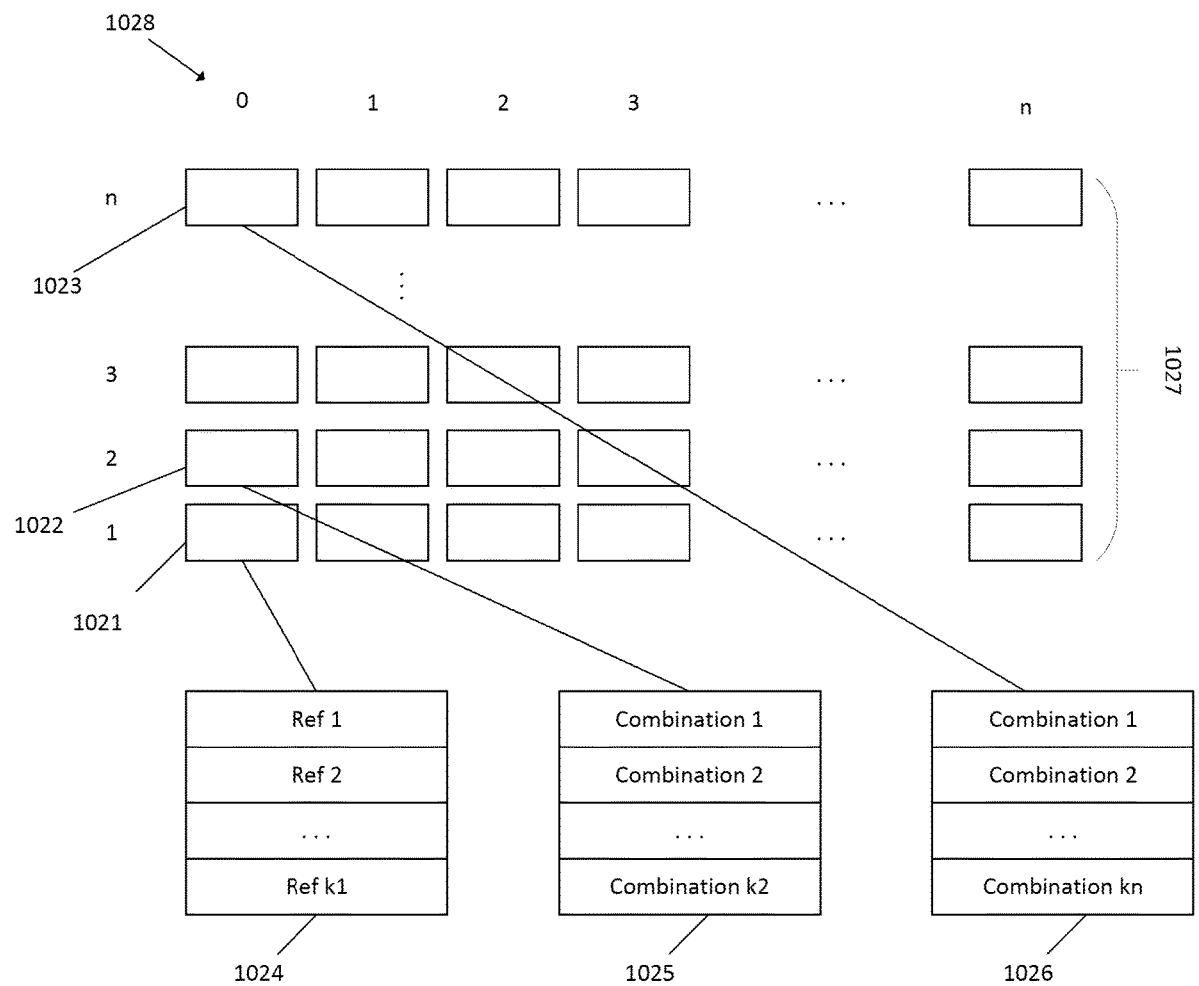
FIG. 10D illustrates an exemplary method for combination generation using dynamic programming.

FIG. 10D illustrates a more detailed embodiment of using dynamic programming for combination generation, such as in step 1004. In an embodiment, the combination generation algorithm has overall required criteria and overall scoring criteria for the combinations that it outputs. The combination generation algorithm may break the problem of finding a combination of text segments and associated references to satisfy the overall required criteria and overall scoring criteria into the smaller sub-problems of finding stored text segments and associated references that satisfy the criteria for subsets of the input text segments. The solutions found for subsets of the input text segments may then be combined to arrive at the overall solution.

In one embodiment, the problem of finding combinations is performed for subsets of the input text segments, starting with 1 input text segment, then incrementally increasing the number of input text segments to 2, 3, and so on in the subset until all of the input text segments are in the subset. Each of these subsets is a sub-problem to be solved. The dynamic programming algorithm may find a set of combinations for each sub-problem that satisfy sub-problem criteria, which include sub-problem required criteria, which are required for all combinations that are proposed as solutions, and sub-problem scoring criteria, which are used for scoring and ranking the combinations that meet the sub-problem required criteria. In some embodiments, the sub-problem criteria are identical to the overall criteria. The sub-problem required criteria may be identical to the overall required criteria, and the sub-problem scoring criteria may be identical to the overall scoring criteria. In other embodiments, the sub-problem criteria may be different than the overall criteria. For example, in some embodiments, the sub-problem criteria may be more lenient to allow for more combinations to be tried without pruning them too early, even if they appear to not be promising at first. Alternatively, in other embodiments, the sub-problem criteria may be more strict in some ways to reduce the number of combinations and arrive at results more quickly.

The boxes, such as boxes 1021, 1022, 1023 represent the sub-problems being solved by the dynamic programming algorithm. The sub-problems are organized by level and may be organized in a table 1027. Sub-problems at level 1 include a single input text segment. Sub-problems at level 2 include two contiguous input text segments. Sub-problems at level 3 include three contiguous input text segments. The levels continue until level n, where n is the number of input text segments, where all of the input text segments are included in the subset, so that the solution at this level is the solution of the entire problem. The sub-problems may be indexed on the Y axis by level and on the X axis by indices 1028.

For each of the sub-problems, a set of candidate combinations is generated that are proposed solutions to the sub-problem meeting the sub-problem required criteria and ranked by the sub-problem scoring criteria. Candidate combination set 1024 are candidate combinations for sub-problem 1021, candidate combination set 1025 are candidate combinations for sub-problem 1022, and candidate combination set 1026 are candidate combinations for sub-problem 1023.

For the sub-problems in level 1, the combinations may comprise just a single text segment from a single reference. These combinations may be ranked primarily based on the similarity score since the number of references at this level is always one.

For the sub-problems in level 2, the sub-problems may comprise the problem of identifying a combination for two contiguous input text segments. The two contiguous input text segments may comprise the two text segments found by moving down one level and including the level 1 sub-problem directly beneath (same index) and directly to the right (index+1). The combination generation algorithm may solve the level 2 sub-problem by accepting as input the candidate combinations from the level 1 sub-problems. It then generates its own candidate combinations for the level 2 sub-problem. Some combinations may comprise a plurality of references and some combinations may comprise text segments from a single reference.

For the sub-problems in level 3, the process is similar. The sub-problems may comprise the problem of identifying a combination for three contiguous input text segments and may be solved by using the combinations generated from the level 2 and level 1 sub-problems.

The combination generation algorithm may build up a solution by solving the level 1 sub-problems and storing their solutions, solving the level 2 sub-problems and storing their solutions, solving the level 3 sub-problems and solving their solutions, and so on until the overall problem is solved. This process of solving smaller problems and storing their solutions to solve more complex problems may be referred to as tabulation. The overall solution generated by this dynamic programming algorithm is heuristic and is not a guaranteed optimal solution.

Figure 10E:
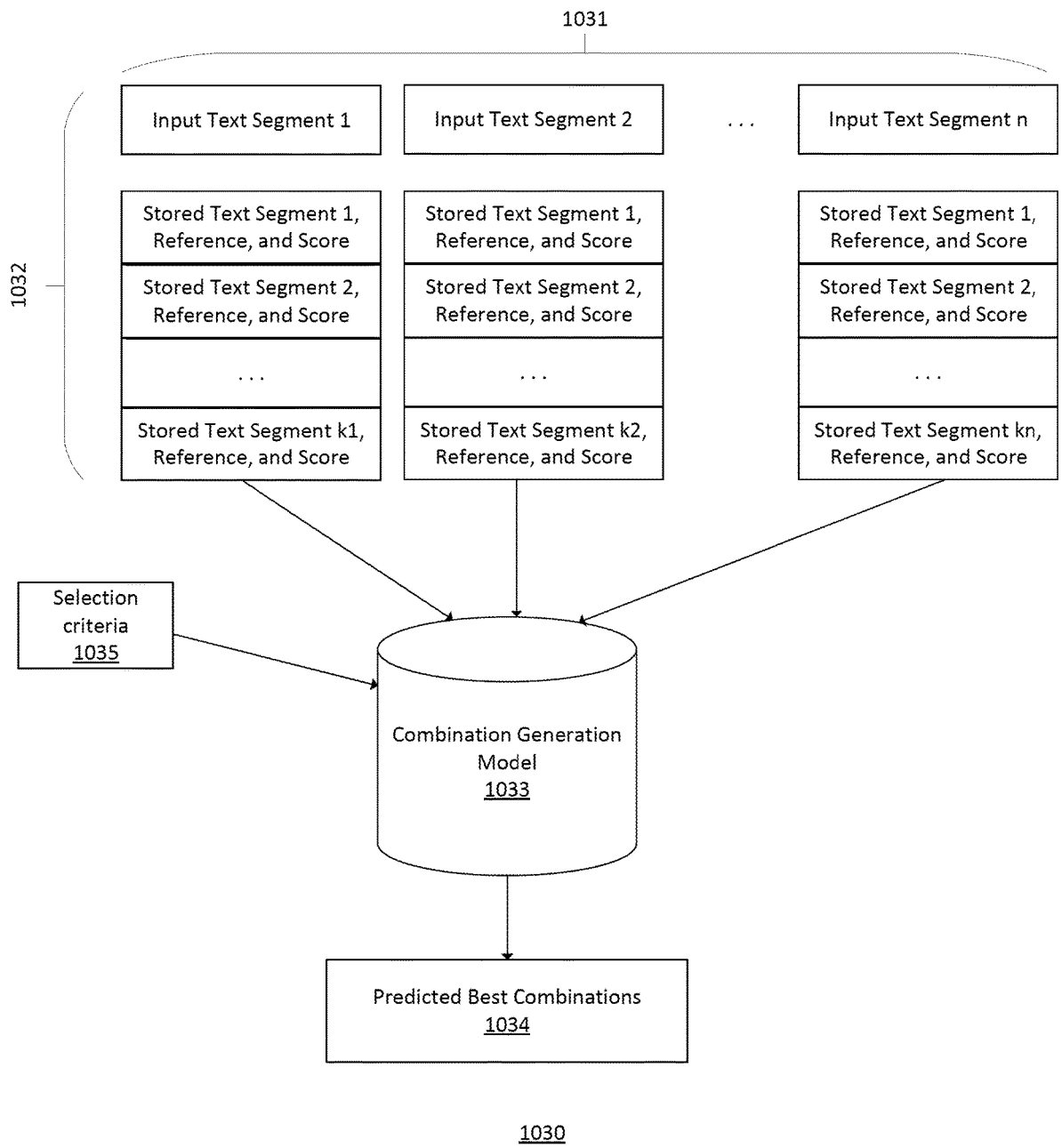
FIG. 10E illustrates an exemplary method for combination generation using a machine learning model.

FIG. 10E illustrates an exemplary method 1030 for combination generation using a machine learning model. Method 1030 may be used to perform step 1004.

In an embodiment, input text segments 1031 are provided along with candidate stored text segments 1032 that have been compared to each input text segment 1031. The input text segments 1031 may comprise each input text segment extracted from input text block 400.

For each stored text segment there is a similarity score and reference document information to identify the reference they come from. The candidate stored text segments 1032 may comprise all of the stored text segments compared against the input text segment 1031 or may comprise a shortened list of the stored text segments to include only the higher ranking text segments. For example, the lists of candidate stored text segments 1032 may be shortened by eliminating candidate text segments that fall below a threshold required similarity score or fall below a threshold rank when the candidate text segments are ranked by similarity score.

The data may be input to a combination generation machine learning model 1033 along with optional selection criteria 1035 to provide the criteria for the selected combinations. Selection criteria 1035 may comprise required criteria and scoring criteria. The combination generation machine learning model 1033 outputs its prediction of the best combination or combinations 1034 for meeting the selection criteria 1035.

Figure 10F:
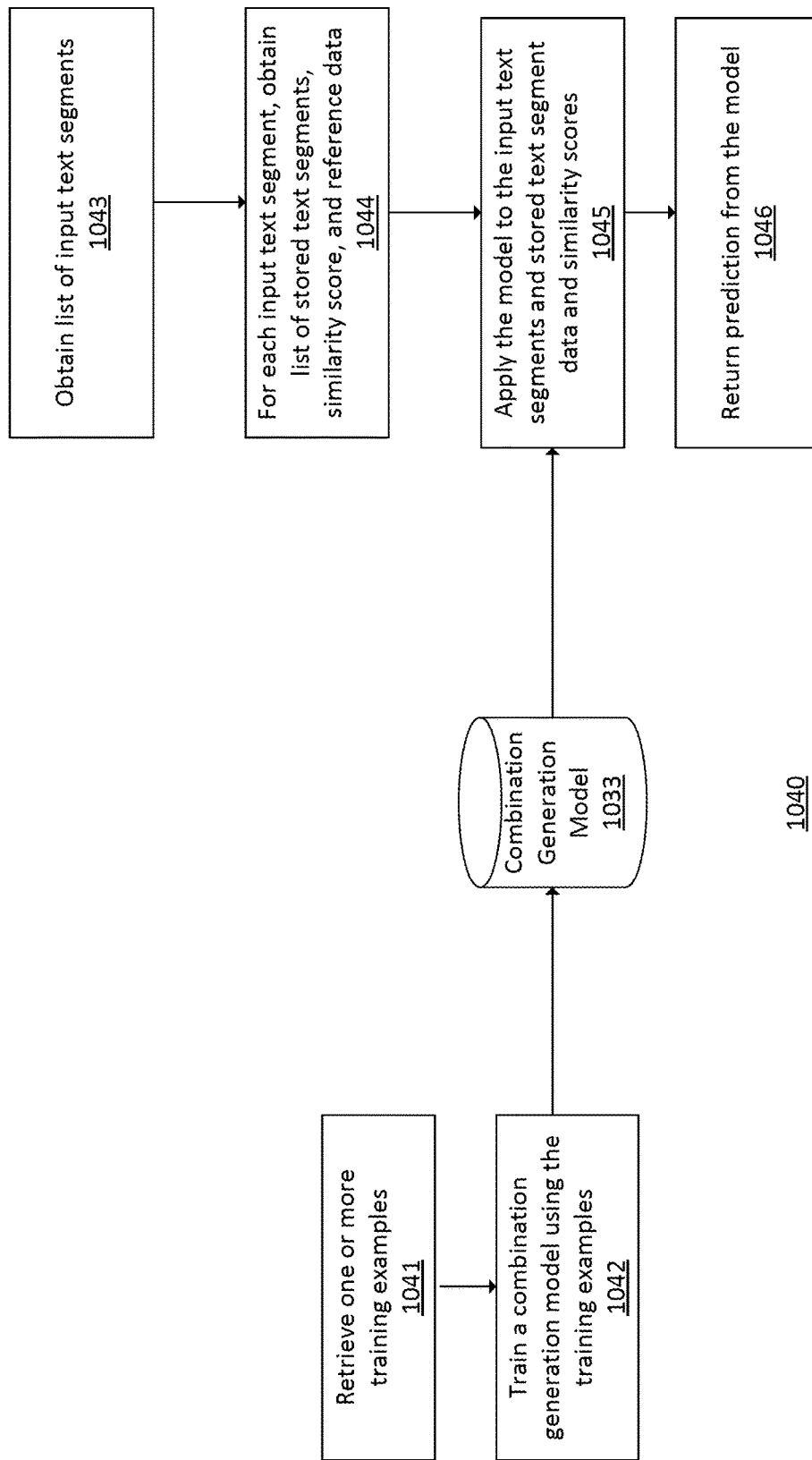
FIG. 10F illustrates an exemplary method for training a combination generation model and performing inference.

FIG. 10F illustrates an exemplary method 1040 for training the combination generation model 1033 and performing inference.

In step 1041, one or more training examples are retrieved. The training examples may comprise training data comprising a set of input text segments, the corresponding candidate stored text segments for each input text segment, and the selection criteria. The training data may be associated with a training label comprising an output combination and a score of the quality of the output combination.

In step 1042, the combination generation model is trained using the training examples to generate a trained combination generation model 1033.

During the inference process, which may occur at a later time, in step 1043, a list of input text segments is obtained. The list of input text segments may be obtained from splitting an input text block 400 in step 302.

In step 1044, for each input text segment, a list of stored text segments may be retrieved and compared with the input text segment such as by method 820 to generate similarity scores. The stored text segments may also include information about which reference document that come from. The list of stored text segments may be reduced to a candidate set of stored text segments based on the similarity scores, by choosing the best matches.

In step 1045, the input text segments, stored text segments, and similarity scores may be input to the combination generation model 1033. Specified selection criteria for the combination may also be input to the combination generation model 1033.

In step 1046, the combination generation model 1033 may output one or more combinations of text segments and associated reference documents that are considered to be good solutions to the optimization problem.

The search engine may produce output including the input text block and an identification of one or more associated stored text segments found to be similar to each input text segment of the input text block. The output may be generated as a claim chart or office action or other forms.

The user interface presented to the user may include components for allowing the user accept or reject the portions of text presented as similar. Acceptance indicates that the user agrees that the portion of text identified by the search engine is in fact similar to the portion of text that the user had entered. Rejection indicates that the user does not think that the portions of text are similar. The acceptances and rejections from the user may be used to train and improve the machine learning model for text similarity. When an acceptance is received, the value of the association between the two portions may be increased and the machine learning model may be trained to make it more likely to recommend the stored text segment for the input text segment, or text like it, in the future. The text segments may be stored in the text similarity storage 123 as a positive example where the text segments are labeled as similar. When a rejection is received, the value of the association between the text segments may be decreased. In some embodiments, the two text segments may be stored in the text similarity storage 123 as a negative example where the text segments are labeled as not similar.

The user interface presented to the user may also allow the user to request new reference documents to be used. For example, the user may request that a new combination of references and text segments be used. In that case, the machine learning model may be trained that the set of references that it had returned was rejected and learn from this as a negative example.

Figure 11A:
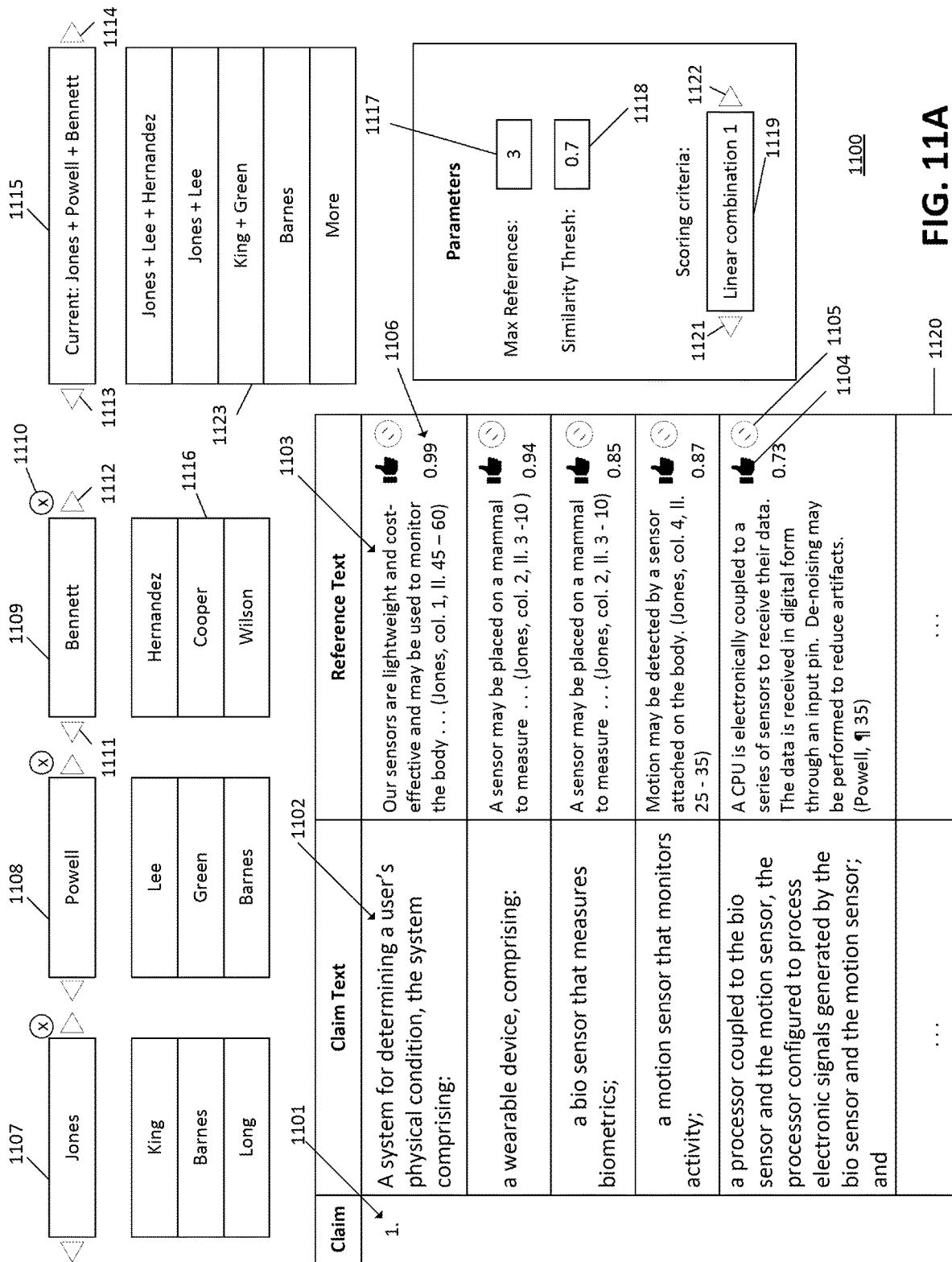
FIG. 11A illustrates an exemplary output user interface that may be generated.

FIG. 11A illustrates an exemplary output user interface 1100 that may be generated by the search engine to display the input text segments and the generated combination of stored text segments and reference documents.

Claim chart 1120 displays the text of one or more patent claims that were input to the system, such as in step 302, and the corresponding stored text segments in one of the combinations identified by the search engine. In some embodiments, the search engine may identify a plurality of combinations in step 305, which may be selected based on user interactions and causing the current combination in the claim chart to be replaced. The current combination of reference documents is displayed in reference display fields 1107, 1108, 1109, which identify three references used in the combination currently displayed in the claim chart 1120.

In claim chart 1120, a claim number 1101 may be displayed to identify the number of the claim being displayed. In some embodiments, a plurality of claims are displayed, and the claim numbers may be used to identify them. Claim text 1102 displays a text segment from the input patent claim. Reference text 1103 displays a text segment from a reference document that was identified by the search engine to disclose all or part of the claim text 1102. The reference text field may also include an identifier of the reference document and a citation to the location in the reference document where the reference text segment may be found. A similarity score 1106 generated by the search engine may be displayed to score the match between the claim text and reference text.

User feedback buttons 1104, 1105 may be provided to allow for user feedback on the quality of the match between the claim text and reference text. Positive feedback button 1104 may indicate approval of the match by the user. Upon activation of positive feedback button 1104, the system may store data to update the text similarity model 505 and combination generation model 1033 to make this match and the combination more likely. For example, a new positive training example may be generated and added to the training set with the claim text segment and reference text segment, or the similarity score of an existing training example with these two text segments may be increased.

Negative feedback button 1105 may indicate disapproval of the match by the user. Upon activation of negative feedback button 1105, the system may store data to update the text similarity model 505 and combination generation model 1033 to make this match and the combination less likely. For example, a new negative training example may be generated and added to the training set with the claim text segment and reference text segment, or the similarity score of an existing training example with these two text segments may be decreased.

Parameters of the current combination may also be adjusted. Max references field 1117 allows for specifying a max reference criteria, which may comprise the maximum number of references that may be used in a combination. In response to a user edit to the field, the search engine may change the current combination to satisfy the max references criteria, by increasing or decreasing the number of references in the currently displayed combination. The similarity threshold field 1118 allows specifying the minimum threshold similarity score that a stored text segment must have to a claim text segment to be considered to disclose the claim text segment and thereby appear in the claim chart 1120 for that claim text segment. This setting applies to all of the claim text segments. Other user interface elements may be provided to set individual similarity threshold scores per claim text segment. Scoring criteria field 1119 may allow specifying the scoring criteria to be used in scoring and ranking combinations. Buttons 1121, 1122 may allow cycling to different scoring criteria. In response to user editing of the max reference field 1117, similarity threshold field 1118, or scoring criteria field 1119, the currently displayed combination may change.

Reference display fields 1107, 1108, 1109 show the names of the reference documents in the current combination. Buttons 1111, 1112 may be used to change one of the reference documents to a different reference document. In addition, an alternative reference list 1116 may be provided and allow selection of a replacement reference for a given displayed reference 1109. Delete button 1110 may be used to remove the reference from the combination without replacing it with a new reference. In response to changing the reference document or deleting it, the currently displayed combination may be changed. If the reference document is changed or deleted, then any claim chart fields where reference text from that reference document were shown are changed to show reference text segments from other reference documents that are still in the combination, or are left empty if no suitable reference text segment exists.

Combination display field 1115 displays the current combination of references. Buttons 1113, 114 may be used to change the current combination to a different combination of references. Alternative combination list 1123 displays other combinations available for display. Selection of one of the items in the list 1123 causes the current combination to change. Upon changing the combination, the claim chart 1120 may be updated with the new combination.

Figure 11B:
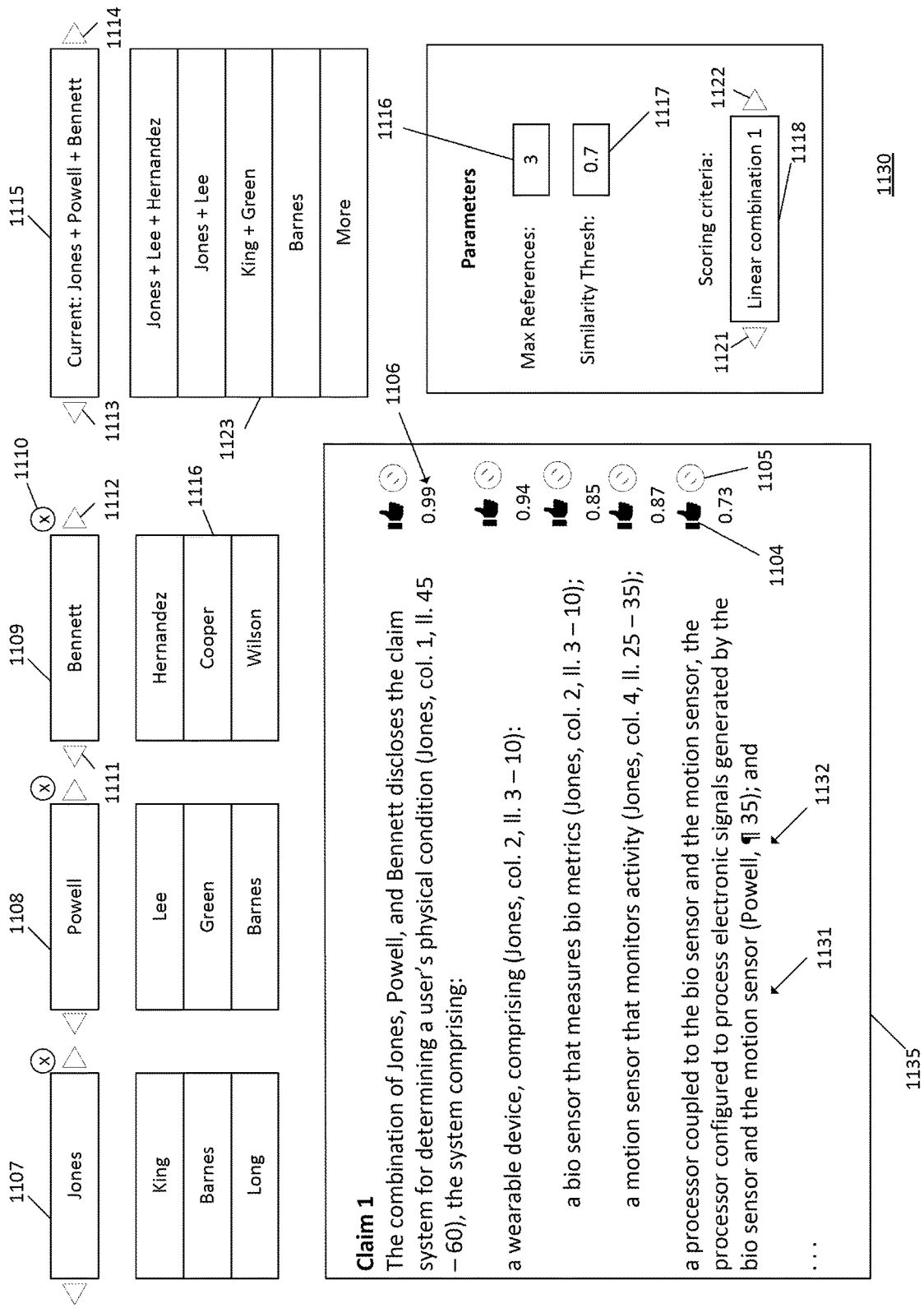
FIG. 11B illustrates an exemplary output user interface that may be generated.

FIG. 11B shows an exemplary user interface 1130 that may be output by the search engine in order to display the generated combination in the form of an office action. The office action field 1135 displays text in the form of an office action. The office action text explains the rejection of the input patent claim based on the current set of reference documents. For each input text segment of the input patent claim a corresponding citation is displayed where the reference document includes a reference text segment disclosing the input text segment. For example, claim text segment 1131 is displayed adjacent to parenthetical citation 1132 to a reference text segment of Powell that discloses the same concepts. In some embodiments, the text of the reference text segment may be included displayed in the parenthetical, in addition to the citation. Interface elements 1104-1120, 1121-1123 may operate in the same way on interface 1130 as on interface 1100. The user interface elements may change the current combination and thereby update the office action text with the new combination, rather than a claim chart.

In some embodiments, the search engine may limit its search to reference documents that are similar based on a classification system. The documents in document storage 124 may be tagged with classification information. For example, patents and patent application publications may be classified with IPC, CPC, USPC, or other codes. In some embodiments, a classification machine learning model may be run on the input text block to predict a classification of the input text block. A set of classifications related to the predicted classification may be identified. In some embodiments, the machine learning model for text similarity performs the text similarity matching only on documents that are in at least one of the related classifications.

Moreover, in some embodiments, a plurality of machine learning models for text similarity may be used rather than one. The machine learning models may be customized for different types of text by being trained on reference documents only in a classification or in a set of classifications. The machine learning models may then be stored with data identifying which classifications they were trained on. In an embodiment, when an input text block is received, the classification machine learning model is run to predict its classification. Based on that classification, a machine learning model may be selected that was trained using reference documents from that classification or related classifications.

Figure 12:
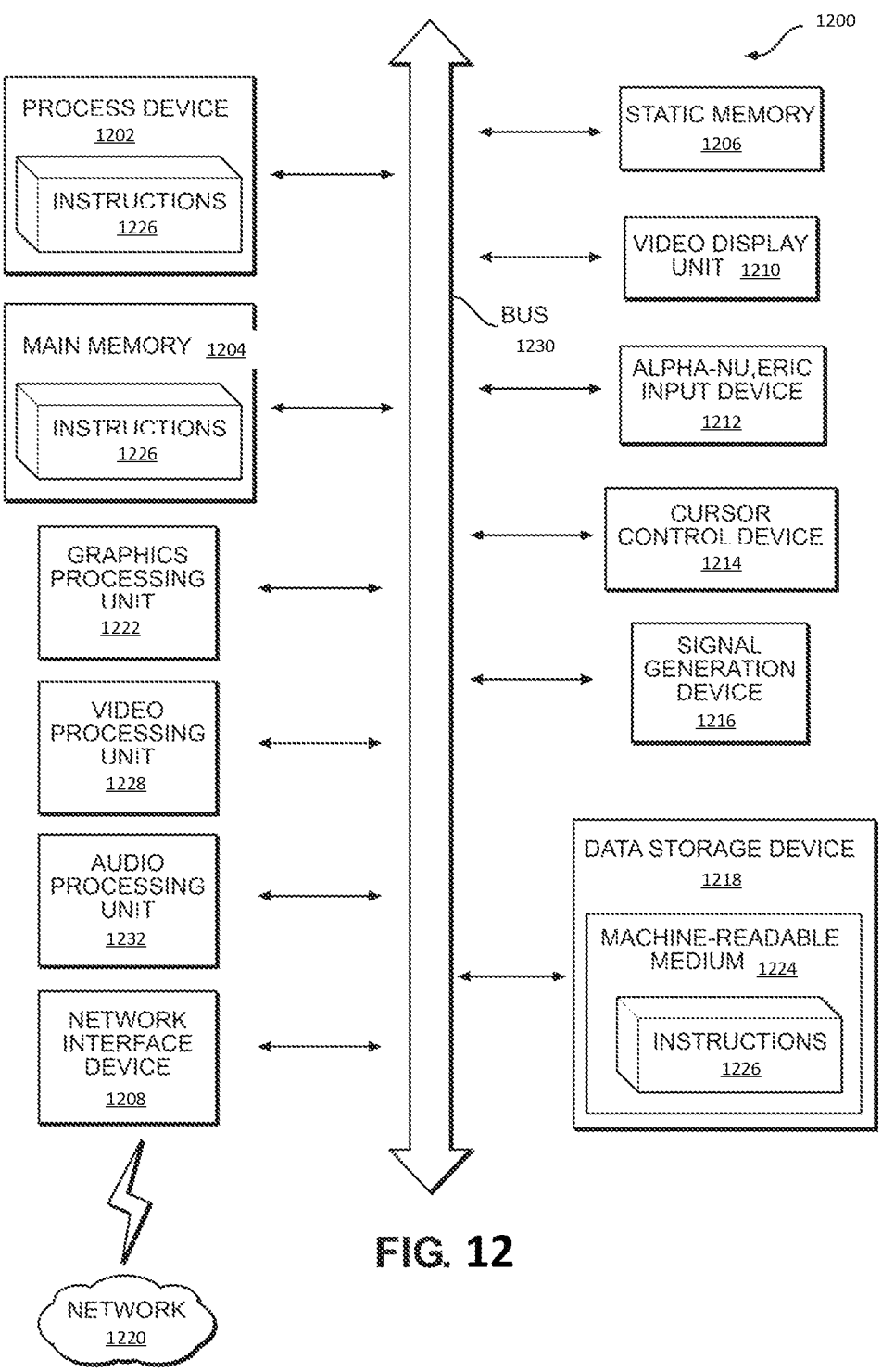
FIG. 12 illustrates an example computer system that may perform any one or more of the methodologies discussed herein.

FIG. 12 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a computer-readable medium) on which is stored one or more sets of instructions or software 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1226 include instructions to implement functionality corresponding to the components of a device to perform the disclosure herein. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Figure 13A:
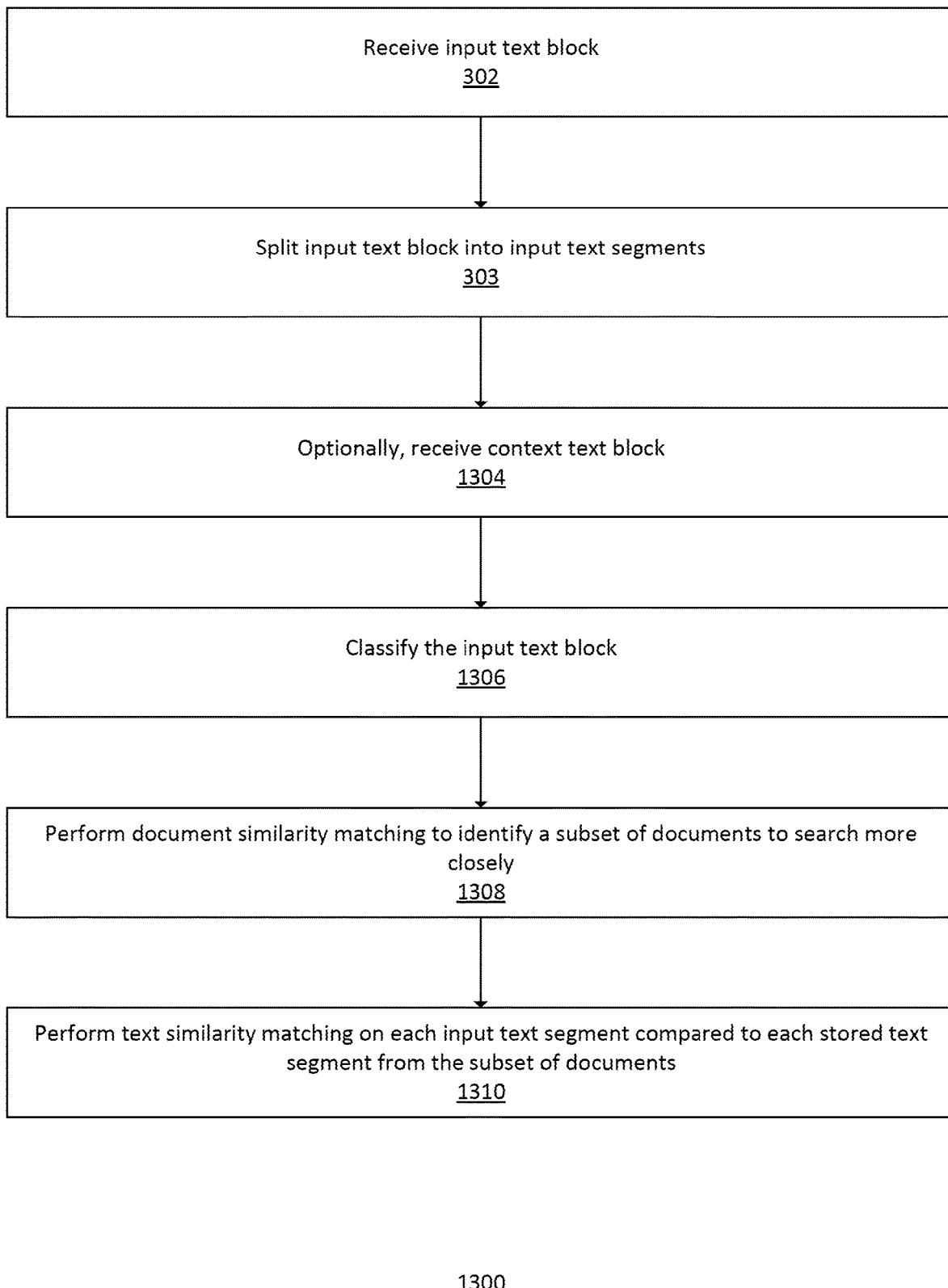
FIG. 13A illustrates an exemplary method that may be performed by a search engine in some embodiments.

FIG. 13A illustrates an exemplary method 1300 that may be performed by a search engine in some embodiments. Method 1300 may include steps 302-303 as described in method 300.

In step 1304, a context text block may be received from a user. The context text block may be any portion of text. No particular length is required for a text portion to be a context text block. Moreover, no particular shape of text is required and the term "block" does not imply that the text must be in the shape of a block. In some embodiments, the context text block may be related to the input text block received in 302. The context text block may describe or summarize background information related to the input text block. For example, the context text block may comprise an abstract or brief description from the same patent as the input text block. In another example, when the input text block is a dependent claim, the context text block may comprise a parent claim of the input text block. In other embodiments, the context text block may be arbitrary text and need not be patent text.

In step 1306, the input text block is classified. The input text block may be classified by a machine learning model. In an embodiment, the input text block may be classified into a patent classification. In some embodiments, when a context text block has been received, the context text block or a combination of the input text block and context text block may be classified instead of the input text block.

In step 1308, document similarity matching is performed on the input text block and a set of reference documents. Document similarity matching selects a subset of the reference documents which are most likely to be related to the input text block or are most likely to contain text segments which are similar to input text segments in the input text block. In an embodiment, the set of reference documents may comprise some or all reference documents stored in document storage 124. In some embodiments, when a context text block has been received, the context text block or a combination of the input text block and context text block may be used for document similarity matching instead of the input text block.

In some embodiments, classification output from step 1306 may be used in document similarity matching. For example, classification output may be used to filter the set of reference documents used for document similarity matching. In another example, the classification output may be used to filter the subset of reference documents returned by document similarity matching. In another example, the classification output may be used as an additional input to document similarity matching.

In some embodiments, document similarity matching may be performed by a machine learning model which is trained to return a similarity score between text blocks and reference documents. For example, a machine learning model may be trained which takes text as input and produces a fixed-length encoding. The fixed-length encoding may be generated such that text with similar semantic meaning are mapped to encodings that are close together in tensor space. The machine learning model may return the distance between a text block encoding and a reference document encoding as the similarity score.

In other embodiments, document similarity matching may be performed with a rules-based system. For example, reference documents with similar patent classifications may be returned. In another example, documents may be returned based on forward or backward citation links. In another example, the input text block may be input to a text search engine and the most relevant results among the reference documents may be returned.

In step 1310, text similarity matching is performed on each input text segment and each stored text segment from the subset of reference documents selected in step 1308. Performing text similarity matching on the subset of reference documents improves performance by reducing waste of computing resources on reference documents which are unlikely to match the input text segments. In some embodiments, text similarity matching may be performed by text similarity model 505.

In some embodiments, the classification output from step 1306 may be used as an input to text similarity matching. For example, when multiple versions of text similarity model 505 are available, the classification output may be used to select which version of text similarity model 505 to use. In another example, when text similarity model 505 includes multiple versions of tokenizer 542 or language model 544, the classification output may be used to select which version of tokenizer 542 or language model 544 to use.

Figure 13B:
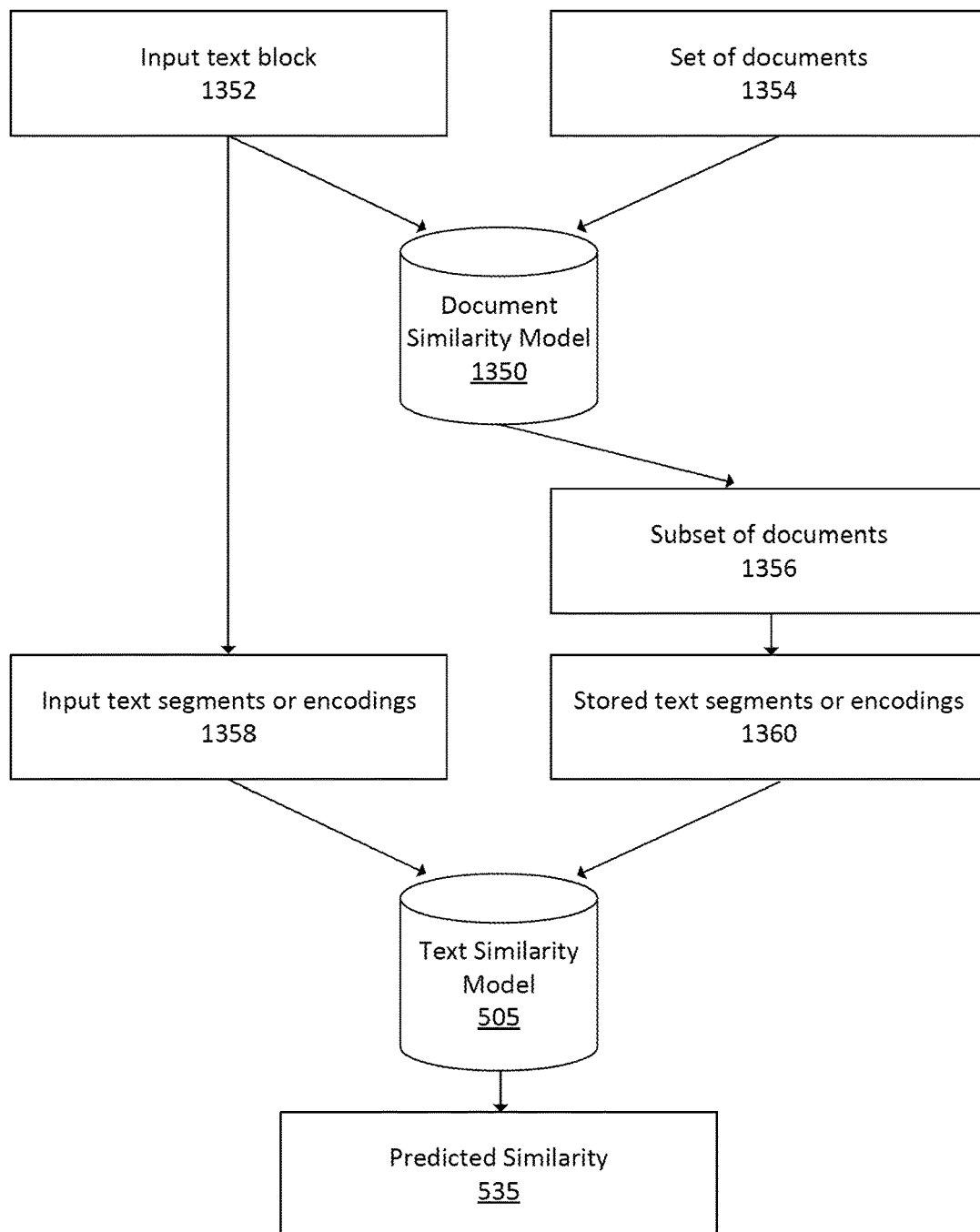
FIG. 13B illustrates an example embodiment of a search engine.

FIG. 13B. illustrates an example embodiment 1320 of a search engine which may perform method 1300. Embodiment 1320 includes two machine learning models, document similarity model 1350 and text similarity model 505. Document similarity model 1320 takes as input an input text block 1352 and a set of documents 1354. Document similarity model 1320 performs document similarity matching, and returns a subset of documents 1356, wherein the subset of documents 1356 is a subset of the set of documents 1354. Input text block 1358 may be processed to produce input text segments or encodings 1358. Subset of documents 1356 may be processed to produce stored text segments or encodings 1360. Text similarity model 505 takes as input text segments or encodings 1358 and stored text segments or encodings 1360, and returns predicted similarity 535.

It will be appreciated that the present disclosure may include anyone and up to all of the following examples.

Example 1: A computer-implemented method for performing text search using machine learning, comprising: receiving a text input, the text input comprising a patent claim; splitting the patent claim into clauses; performing, by a machine learning model, text similarity matching between each clause and a plurality of stored text portions, the stored text portions associated with a plurality of reference documents; automatically determining an anticipation or obviousness rejection or invalidation for the patent claim based on one or more of the reference documents, the rejection or invalidation comprising an identification for each clause a stored portion of text that is similar, where similarity is determined by a similarity score that is above a threshold.

Example 2: A computer-implemented method for performing multi-segment text search using machine learning, comprising: receiving an input text block; splitting the input text block into a plurality of input text segments; retrieving a plurality of stored text segments, each of the stored text segments associated with one of a plurality of reference documents; comparing, by a text similarity machine learning model, each of the plurality of input text segments to each of the plurality of stored text segments to generate a plurality of text similarity scores measuring the similarity between each input text segment and each stored text segment; providing a similarity threshold; generating, by a combination generator, from the plurality of stored text segments and plurality of text similarity scores a set of one or more disclosing text segments and associated one or more disclosing reference documents, wherein for each of the plurality of input text segments the set of disclosing text segments includes at least one stored text segment having a text similarity score to the input text segment that is above the similarity threshold; outputting the one or more disclosing text segments and associated one or more disclosing reference documents.

Example 3: The method of Example 2, wherein the plurality of input text segments and plurality of stored text segments that are compared by the text similarity machine learning model each comprise one or more word embeddings.

Example 4: The method of Example 2, wherein the plurality of input text segments and plurality of stored text segments that are compared by the text similarity machine learning model each comprise a tensor encoding.

Example 5: A computer-implemented method for performing multi-segment text search using machine learning, comprising: providing a document storage containing text of a plurality of reference documents; parsing a set of office action documents to extract a plurality of reference information statements and a plurality claim text segments and corresponding citation statements, each claim text segment and corresponding citation statement comprising a comparison statement; evaluating the citation statements to determine that a plurality of the citation statements include reference document identifiers and text segment locations; retrieving a first plurality of stored text segments from the document storage based on the reference document identifiers and text segment locations; pre-processing the claim text segments and the first plurality of stored text segments to create pre-processed claim text segments and a first plurality of pre-processed stored text segments; generating variable length sequences of word embeddings from the pre-processed claim text segments to create encoded claim text segments; generating variable length sequences of word embeddings from the pre-processed stored text segments to create a first plurality of encoded stored text segments; associating the encoded claim text segments and first plurality of encoded stored text segments based on co-occurrence in at least one of the comparison statements of the office action documents and applying a plurality of training labels to generate a training data set comprising training examples; creating synthetic negative training examples by associating pairs of encoded text segments that do not co-occur in the comparison statements of the office action documents, and adding the synthetic negative training examples to the training data set; training a text similarity machine learning model using the training data set; receiving an input text block; splitting the input text block into a plurality of input text segments; retrieving a second plurality of stored text segments from the document storage, each of the second plurality of stored text segments associated with a reference document, the second plurality of stored text segments comprising a variable length sequence of word embeddings; pre-processing the input text segments to create pre-processed input text segments; generating variable length sequences of word embeddings from the pre-processed input text segments to create encoded input text segments; comparing, by the text similarity machine learning model, each of the plurality of encoded input text segments to each of the second plurality of stored text segments to generate for each pair of encoded input text segment and stored text segment of the second plurality of stored text segments a text similarity score; providing a similarity threshold; generating, by a combination generator, from the second plurality of stored text segments and the text similarity scores a set of one or more disclosing text segments and associated one or more disclosing reference documents, wherein for each of the plurality of input text segments the set of disclosing text segments includes at least one stored text segment where the generated text similarity score to the input text segment is above the similarity threshold; outputting the one or more disclosing text segments and associated one or more disclosing reference documents.

Example 6: The method of Example 5, wherein outputting the one or more disclosing text segments and associated one or more disclosing reference documents comprises outputting a claim chart associating each input text segment to one or more disclosing text segments.

Example 7: The method of Example 5, further comprising: generating synthetic office action text based on the plurality of input text segments, one or more disclosing text segments, and associated one or more disclosing reference documents, the synthetic office action text identifying the disclosure of each of the plurality of input text segments by at least one of the one or more disclosing text segments; displaying the synthetic office action text.

Example 8: The method of Example 5, further comprising: receiving feedback on the quality of the outputted one or more disclosing text segments or outputted one or more reference documents; updating the text similarity machine learning model based on the feedback.

Example 9: A computer-implemented method for performing text search using machine learning, comprising: receiving a text input, the text input comprising a patent claim; splitting the patent claim into clauses; performing, by a first machine learning model, classification of the text input into a class; performing, by a second machine learning model, document similarity matching between the text input and a plurality of reference documents to identify a subset of similar reference documents; selecting a third machine learning model based on the class; performing, by the third machine learning model, text similarity matching between each clause and a plurality of stored text portions, the stored text portions associated with the subset of similar reference documents; automatically determining an anticipation or obviousness rejection or invalidation for the patent claim based on one or more of the similar reference documents, the rejection or invalidation comprising an identification for each clause a stored portion of text that is similar, where similarity is determined by a similarity score that is above a threshold.

Example 10: A computer-implemented method for performing multi-segment text search using machine learning, comprising: receiving an input text block; splitting the input text block into a plurality of input text segments; performing, by a first machine learning model, classification of the text input into a class; performing, by a second machine learning model, document similarity matching between the text input and a plurality of reference documents to identify a subset of similar reference documents; retrieving a plurality of stored text segments, each of the stored text segments associated with one of the similar reference documents; selecting a text similarity machine learning model based on the class; comparing, by the text similarity machine learning model, each of the plurality of input text segments to each of the plurality of stored text segments to generate a plurality of text similarity scores measuring the similarity between each input text segment and each stored text segment; providing a similarity threshold; generating, by a combination generator, from the plurality of stored text segments and plurality of text similarity scores a set of one or more disclosing text segments and associated one or more disclosing reference documents, wherein for each of the plurality of input text segments the set of disclosing text segments includes at least one stored text segment having a text similarity score to the input text segment that is above the similarity threshold; outputting the one or more disclosing text segments and associated one or more disclosing reference documents.

Example 11: A computer-implemented method for performing multi-segment text search using machine learning, comprising: providing a document storage containing text of a plurality of reference documents; parsing a set of office action documents to extract a plurality of reference information statements and a plurality claim text segments and corresponding citation statements, each claim text segment and corresponding citation statement comprising a comparison statement; evaluating the citation statements to determine that a plurality of the citation statements include reference document identifiers and text segment locations; retrieving a first plurality of stored text segments from the document storage based on the reference document identifiers and text segment locations; pre-processing the claim text segments and the first plurality of stored text segments to create pre-processed claim text segments and a first plurality of pre-processed stored text segments; generating variable length sequences of word embeddings from the pre-processed claim text segments to create encoded claim text segments; generating variable length sequences of word embeddings from the pre-processed stored text segments to create a first plurality of encoded stored text segments; associating the encoded claim text segments and first plurality of encoded stored text segments based on co-occurrence in at least one of the comparison statements of the office action documents and applying a plurality of training labels to generate a training data set comprising training examples; creating synthetic negative training examples by associating pairs of encoded text segments that do not co-occur in the comparison statements of the office action documents, and adding the synthetic negative training examples to the training data set; training a text similarity machine learning model using the training data set; receiving an input text block; splitting the input text block into a plurality of input text segments; performing, by a classification machine learning model, classification of the input text block into a class; performing, by a document similarity machine learning model, document similarity matching between the input text block and a plurality of reference documents to identify a subset of similar reference documents; retrieving a second plurality of stored text segments from the document storage, each of the second plurality of stored text segments associated with one of the similar reference documents, the second plurality of stored text segments comprising a variable length sequence of word embeddings; pre-processing the input text segments to create pre-processed input text segments; generating variable length sequences of word embeddings from the pre-processed input text segments to create encoded input text segments; adjusting one or more parameters of the text similarity machine learning model based on the class; comparing, by the text similarity machine learning model, each of the plurality of encoded input text segments to each of the second plurality of stored text segments to generate for each pair of encoded input text segment and stored text segment of the second plurality of stored text segments a text similarity score; providing a similarity threshold; generating, by a combination generator, from the second plurality of stored text segments and the text similarity scores a set of one or more disclosing text segments and associated one or more disclosing reference documents, wherein for each of the plurality of input text segments the set of disclosing text segments includes at least one stored text segment where the generated text similarity score to the input text segment is above the similarity threshold; outputting the one or more disclosing text segments and associated one or more disclosing reference documents.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A computer-implemented method for performing text search using machine learning, comprising:
   receiving an input text block, the input text block comprising a patent claim;
   splitting the patent claim into clauses;
   performing, by a first machine learning model, a document similarity matching between each the input text block and a plurality of reference documents;
   identifying, based on the document similarity matching, a first subset of documents;
   performing, by a second machine learning model, a text similarity matching between each clause and a plurality of stored text portions for each document in the identified subset of document;
   generating, for each clause, a clause subset of documents from the first subset of documents;
   generating, for each clause, a ranked list of text segments from the clause subset, wherein the ranking is based on text similarity between the clause and the stored text portions of the documents in the clause subset;
   identifying, based at least partly on the ranked list of text segments for each clause and one or more combination criteria, a combination of final documents and text segments of said final documents; and
   displaying, for each clause, one or more text segments from one or more final documents based at least partly on the ranking of the text segments and the one or more combination criteria.

2. The computer-implemented method of claim 1, wherein the method further comprises determining an anticipation or obviousness rejection or invalidation for the patent claim based on the identified combination of final documents and text segments of said final documents.

3. The computer-implemented method of claim 1, wherein the clauses and plurality of stored text portions for each document in the identified subset of document are encoded as fixed length encodings.

4. The computer-implemented method of claim 1, wherein the clauses and plurality of stored text portions for each document in the identified subset of document are encoded as variable length encodings.

5. The computer-implemented method of claim 1, wherein the one or more combination criteria used in the identifying of the combination of final documents and text segments of said final documents comprises:
 a similarity threshold that must be met or exceeded for a clause and text segment to be considered similar;
 a maximum number of final documents; and
 a type of document that may be used in the combination.

6. The computer-implemented method of claim 5, wherein the similarity threshold for each of the clauses is the same.

7. The computer-implemented method of claim 5, wherein the similarity threshold comprises:
 a first similarity threshold for a first set of one or more clauses; and
 a second similarity threshold for a second set of one or more clauses; and
 wherein the first set of clauses and the second set of clauses are unique and there is no intersection between the first set of clauses and the second set of clauses.

8. The computer-implemented method of claim 6, wherein the first similarity threshold and the second similarity threshold are received as input from a user.

9. The computer-implemented method of claim 8, wherein the generating of the ranked list of text segments from the clause subset further comprises weighting the text similarity of some clauses more than others.

10. A system comprising one or more processors, and a non-transitory computer-readable medium including one or more sequences of instructions that, when executed by the one or more processors, cause the system to perform operations comprising:
 receiving an input text block, the input text block comprising a patent claim;
 splitting the patent claim into clauses;
 performing, by a first machine learning model, a document similarity matching between each the input text block and a plurality of reference documents;
 identifying, based on the document similarity matching, a first subset of documents;
 performing, by a second machine learning model, a text similarity matching between each clause and a plurality of stored text portions for each document in the identified subset of document;
 generating, for each clause, a clause subset of documents from the first subset of documents;
 generating, for each clause, a ranked list of text segments from the clause subset, wherein the ranking is based on text similarity between the clause and the stored text portions of the documents in the clause subset;
 identifying, based at least partly on the ranked list of text segments for each clause and one or more combination criteria, a combination of final documents and text segments of said final documents; and
 displaying, for each clause, one or more text segments from one or more final documents based at least partly on the ranking of the text segments and the one or more combination criteria.

11. The computer-implemented method of claim 10, wherein the method further comprises determining an anticipation or obviousness rejection or invalidation for the patent claim based on the identified combination of final documents and text segments of said final documents.

12. The computer-implemented method of claim 10, wherein the clauses and plurality of stored text portions for each document in the identified subset of document are encoded as fixed length encodings.

13. The computer-implemented method of claim 10, wherein the clauses and plurality of stored text portions for each document in the identified subset of document are encoded as variable length encodings.

14. The computer-implemented method of claim 10, wherein the one or more combination criteria used in the identifying of the combination of final documents and text segments of said final documents comprises:
 a similarity threshold that must be met or exceeded for a clause and text segment to be considered similar;
 a maximum number of final documents; and
 a type of document that may be used in the combination.

15. The computer-implemented method of claim 14, wherein the similarity threshold for each of the clauses is the same.

16. The computer-implemented method of claim 14, wherein the similarity threshold comprises:
 a first similarity threshold for a first set of one or more clauses; and
 a second similarity threshold for a second set of one or more clauses; and
 wherein the first set of clauses and the second set of clauses are unique and there is no intersection between the first set of clauses and the second set of clauses.

17. The computer-implemented method of claim 16, wherein the first similarity threshold and the second similarity threshold are received as input from a user.

18. The computer-implemented method of claim 17, wherein the generating of the ranked list of text segments from the clause subset further comprises weighting the text similarity of some clauses more than others.

\* \* \* \* \*